(12) United States Patent
Gong et al.

(10) Patent No.: US 10,976,518 B2
(45) Date of Patent: Apr. 13, 2021

(54) OPTICAL LENS ASSEMBLY GENERATING A PLURALITY OF NEAR INFRARED LIGHT BEAMS WITH DIFFERENT ANGLES

(71) Applicant: Genius Electronic Optical Co., Ltd., Taichung (TW)

(72) Inventors: Jinhui Gong, Fujian (CN); Fensha Cai, Fujian (CN); Xue Li, Fujian (CN)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 355 days.

(21) Appl. No.: 15/856,088

(22) Filed: Dec. 28, 2017

(65) Prior Publication Data
US 2019/0137734 A1   May 9, 2019

(30) Foreign Application Priority Data
Nov. 3, 2017   (CN) .......................... 201711071718.X

(51) Int. Cl.
| | |
|---|---|
| *G02B 9/36* | (2006.01) |
| *G02B 13/00* | (2006.01) |
| *G02B 13/14* | (2006.01) |
| *G02B 13/16* | (2006.01) |
| *G01B 11/25* | (2006.01) |
| *G02B 27/20* | (2006.01) |

(52) U.S. Cl.
CPC ................ *G02B 9/36* (2013.01); *G01B 11/25* (2013.01); *G02B 13/0035* (2013.01); *G02B 13/14* (2013.01); *G02B 13/16* (2013.01); *G02B 27/20* (2013.01); *G02B 13/004* (2013.01); *G02B 13/005* (2013.01)

(58) Field of Classification Search
CPC ......... G01B 11/25; G01S 7/4814; G02B 9/14; G02B 9/36; G02B 13/0035; G02B 13/004; G02B 13/005; G02B 13/14; G02B 13/16; G02B 27/20
USPC ....... 359/355, 356, 357, 771, 772, 784, 785, 359/791, 792
See application file for complete search history.

(56) References Cited

U.S. PATENT DOCUMENTS

| | | | |
|---|---|---|---|
| 2017/0068098 A1* | 3/2017 | Chern | G02B 27/0927 |
| 2019/0101724 A1* | 4/2019 | Chen | H04N 13/225 |

* cited by examiner

*Primary Examiner* — Ryan S Dunning
(74) *Attorney, Agent, or Firm* — JCIPRNET

(57) ABSTRACT

An optical lens assembly is provided. The optical lens assembly includes first, second, third and fourth lens elements having refracting power arranged along an optical axis in a sequence from a light output side to a light input side. The first lens element is arranged to be a lens element in a fourth order from the light input side to the light output side. The second lens element is arranged to be a lens element in a third order from the light input side to the light output side. The third lens element is arranged to be a lens element in a second order from the light input side to the light output side. The fourth lens element is arranged to be a lens element in a first order from the light input side to the light output side.

20 Claims, 60 Drawing Sheets

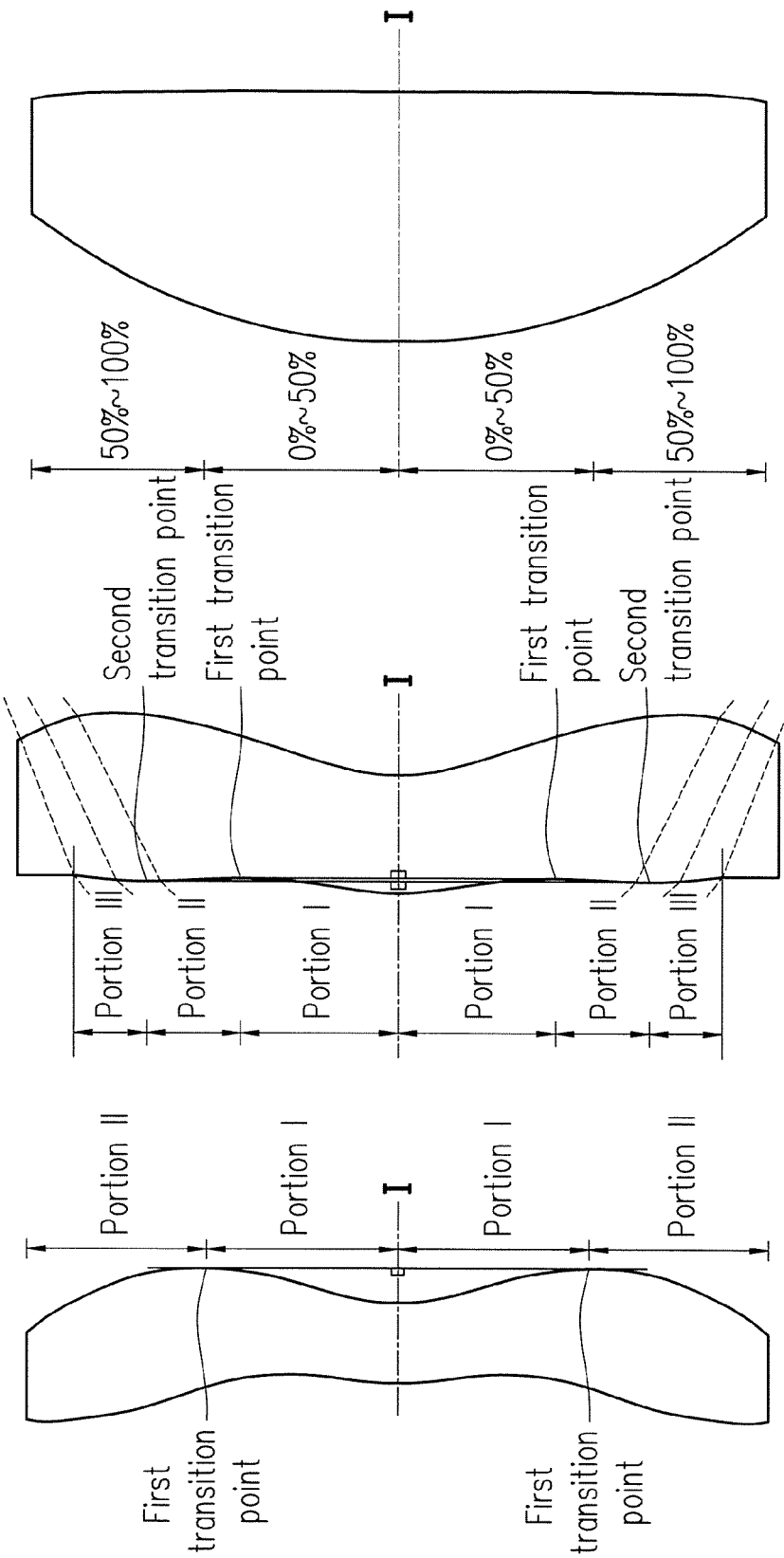

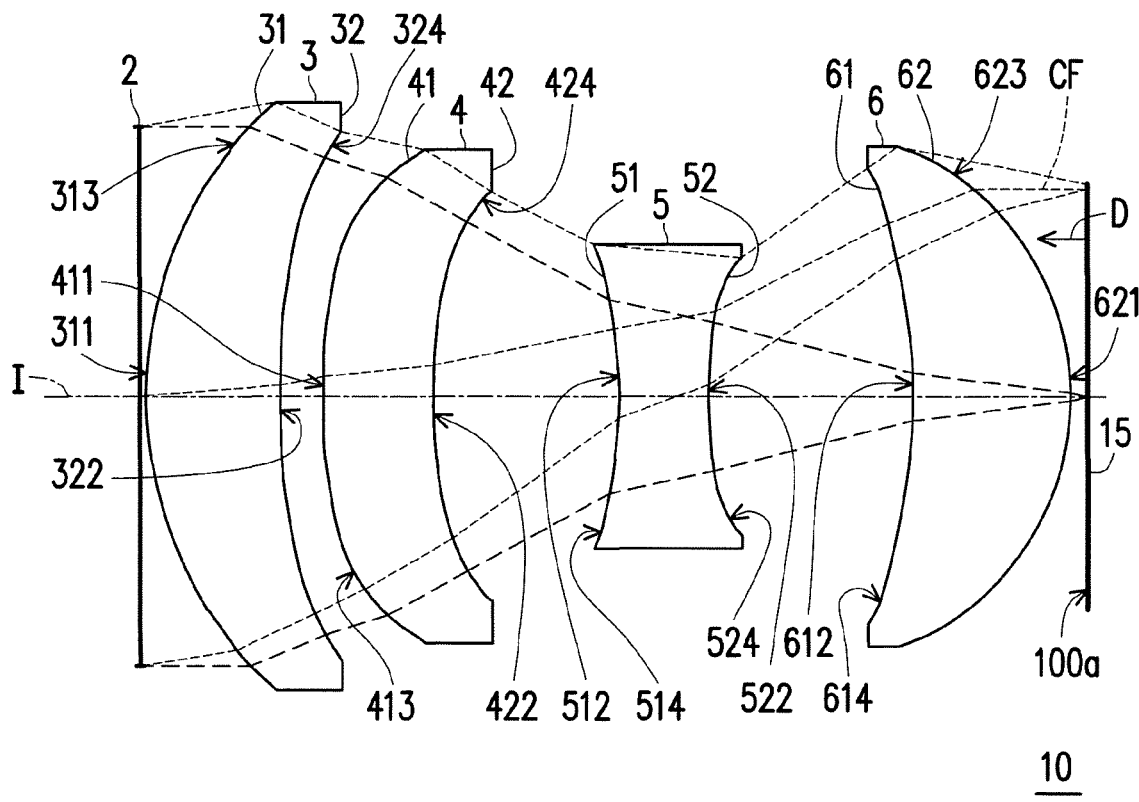
FIG. 7
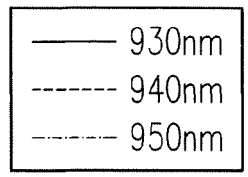
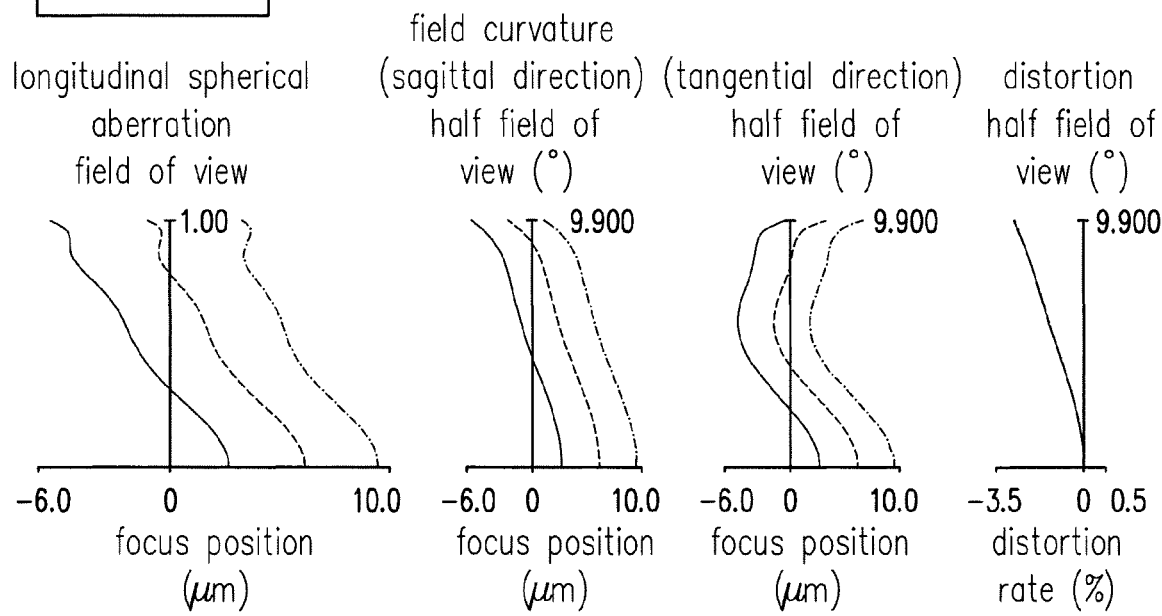
FIG. 8A  FIG. 8B  FIG. 8C  FIG. 8D

| First embodiment |||||||
|---|---|---|---|---|---|---|
| Effective Focal Length= 3.562 mm , Half Field of View= 9.905°, System length=2.738 mm, Fno= 2.273, LCR= 0.603 mm |||||||
| Element | Surface | Radius of curvature (mm) | Thickness (mm) | Refractive index | Abbe number | Focal length (mm) |
| Object |  | Infinity | Infinity |  |  |  |
| Aperture stop2 |  | Infinity | 0.015 |  |  |  |
| First lens element 3 | Light output surface 31 | 1.148 | 0.388 | 2.002 | 19.325 | 1.939 |
|  | Light input surface 32 | 2.511 | 0.125 |  |  |  |
| Second lens element 4 | Light output surface 41 | 2.166 | 0.322 | 1.642 | 22.409 | -144.554 |
|  | Light input surface 42 | 2.046 | 0.540 |  |  |  |
| Third lens element 5 | Light output surface 51 | -1.284 | 0.262 | 1.642 | 22.409 | -1.331 |
|  | Light input surface 52 | 3.062 | 0.593 |  |  |  |
| Fourth lens element 6 | Light output surface 61 | -1.391 | 0.459 | 1.642 | 22.409 | 2.053 |
|  | Light input surface 62 | -0.748 | 0.050 |  |  |  |
| Structured light generating unit 15 | Light emitting surface 100a | Infinity |  |  |  |  |

FIG. 9

| Surface | K | $a_2$ | $a_4$ | $a_6$ | $a_8$ |
|---|---|---|---|---|---|
| 31 | -2.838534E-01 | 0.000000E+00 | 0.000000E+00 | -6.555889E-03 | 3.389396E-02 |
| 32 | 1.023597E-05 | 4.802327E-04 | 6.175560E-02 | 7.569291E-02 | 2.926550E-01 |
| 41 | 1.528029E-06 | 1.627820E-03 | 3.444608E-01 | 3.017102E-01 | 6.577770E-01 |
| 42 | -2.639272E-08 | 8.057469E-03 | 3.743232E-01 | 3.947898E-01 | 3.899607E-01 |
| 51 | 8.291146E-07 | -3.975230E-02 | 1.302423E+00 | -4.860915E+00 | -1.091292E+00 |
| 52 | -2.614845E-08 | 0.000000E+00 | 2.471603E+00 | 2.802772E-01 | -5.789916E+00 |
| 61 | 5.172289E-06 | 0.000000E+00 | 6.399853E-01 | -1.823830E+00 | 4.675656E+00 |
| 62 | -5.008818E-04 | 0.000000E+00 | 1.577242E-01 | -2.096998E-02 | -1.671601E-01 |
| Surface | $a_{10}$ | $a_{12}$ | $a_{14}$ | $a_{16}$ | |
| 31 | 9.448793E-02 | -2.271982E-02 | 0.000000E+00 | 0.000000E+00 | |
| 32 | 1.946855E-01 | -9.648773E-01 | 5.906392E-01 | -5.198213E-02 | |
| 41 | 6.186021E-02 | -2.469284E-03 | -2.215933E+00 | 4.171968E+00 | |
| 42 | 1.669629E+00 | -8.624072E-01 | 7.642753E+00 | -3.298737E+01 | |
| 51 | 2.191266E+01 | -1.128343E+02 | -3.104524E+02 | 2.054172E+03 | |
| 52 | 8.153388E+01 | -1.471041E+02 | -2.900557E+03 | 1.640531E+04 | |
| 61 | -6.664865E+00 | 0.000000E+00 | 0.000000E+00 | 0.000000E+00 | |
| 62 | 7.169296E-01 | 0.000000E+00 | 0.000000E+00 | 0.000000E+00 | |

FIG. 10

| Second embodiment ||||||
|---|---|---|---|---|---|
| Effective Focal Length= 2.785mm , Half Field of View= 9.906°, System length=2.845 mm, Fno= 2.273 ,LCR= 0.471 mm ||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.835 | 0.383 | 2.002 | 19.325 | 1.293 |
| | Light input surface 32 | -15.901 | 0.079 | | | |
| Second lens element 4 | Light output surface 41 | -2.347 | 0.330 | 1.642 | 22.409 | -2.108 |
| | Light input surface 42 | -14.262 | 0.603 | | | |
| Third lens element 5 | Light output surface 51 | 0.873 | 0.250 | 1.642 | 22.409 | -8.643 |
| | Light input surface 52 | 0.431 | 0.635 | | | |
| Fourth lens element 6 | Light output surface 61 | -1.391 | 0.516 | 1.642 | 22.409 | 1.999 |
| | Light input surface 62 | -0.748 | 0.050 | | | |
| Structured light generating unit 15 | Light emitting surface 100a | Infinity | 0.000 | | | |

FIG. 13

| Surface | K | $a_2$ | $a_4$ | $a_6$ | $a_8$ |
|---|---|---|---|---|---|
| 31 | -1.862396E+00 | 0.000000E+00 | 0.000000E+00 | -1.883098E-02 | -7.573978E-03 |
| 32 | 7.240600E-11 | -1.140932E-01 | 1.764992E-01 | 1.783878E-01 | 2.155049E-01 |
| 41 | -3.548085E-08 | -1.478244E-01 | 5.694580E-01 | -3.590573E-02 | 5.644264E-01 |
| 42 | 1.166820E-10 | 5.527999E-02 | -1.662094E-01 | 3.731451E-01 | -9.989530E-01 |
| 51 | 2.509639E-07 | 3.005876E-01 | -2.225535E-01 | -1.079909E+00 | 4.991301E+00 |
| 52 | -1.090974E-06 | 0.000000E+00 | -2.573992E-01 | -5.692715E+00 | 4.759864E+01 |
| 61 | 2.157930E-09 | 0.000000E+00 | 1.077924E-01 | 3.419758E+00 | -1.982604E+01 |
| 62 | 8.784329E-08 | 0.000000E+00 | 1.907505E+00 | -1.148130E+01 | 2.640609E+01 |
| Surface | $a_{10}$ | $a_{12}$ | $a_{14}$ | $a_{16}$ | |
| 31 | -1.997587E-01 | -3.662728E-01 | 0.000000E+00 | 0.000000E+00 | |
| 32 | -3.675730E-01 | -1.709352E+00 | 9.141333E-02 | 1.306264E+00 | |
| 41 | -1.140387E-00 | 1.772235E+00 | -1.488236E+00 | -1.760152E+00 | |
| 42 | 1.225182E-00 | -3.311203E-01 | 7.540078E+00 | -1.165063E+01 | |
| 51 | -3.756824E+01 | 1.953518E+01 | 4.424279E+02 | -6.680953E+02 | |
| 52 | -5.840515E+02 | 1.455718E+03 | 4.646715E+03 | -2.901596E+04 | |
| 61 | 2.935381E+01 | 0.000000E+00 | 0.000000E+00 | 0.000000E+00 | |
| 62 | -2.267333E+01 | 0.000000E+00 | 0.000000E+00 | 0.000000E+00 | |

FIG. 14

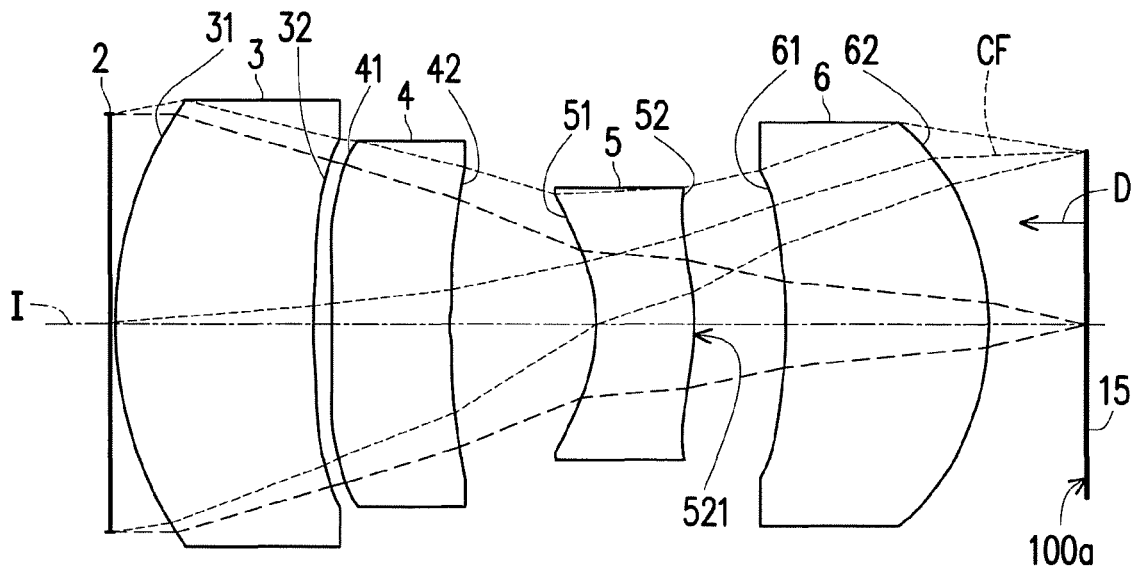
FIG. 15
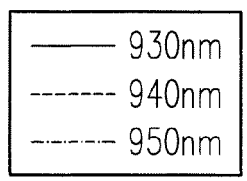
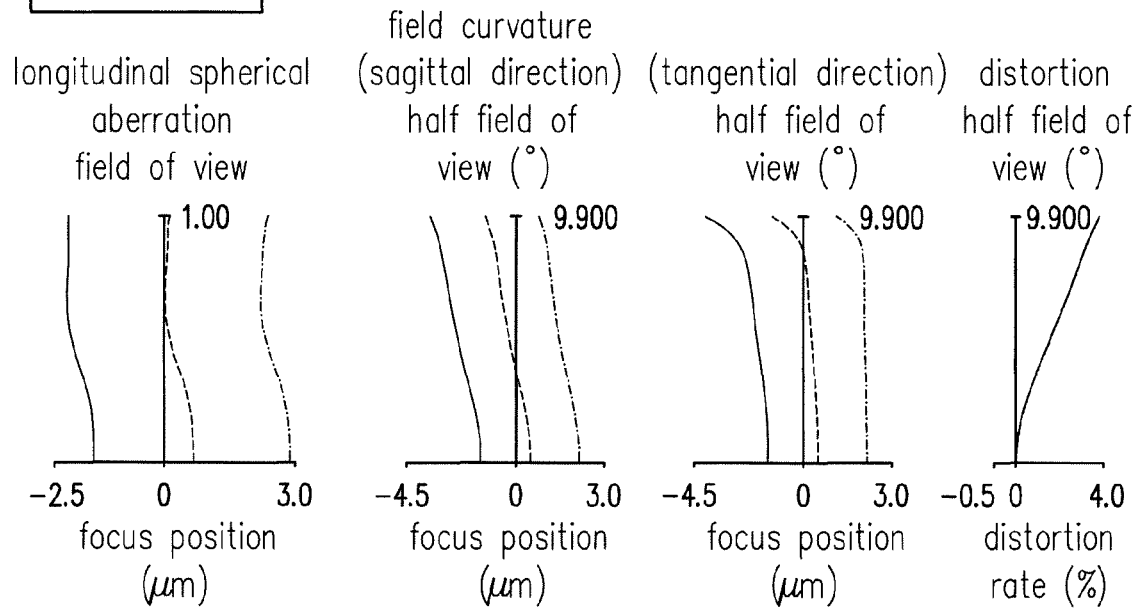
FIG. 16A  FIG. 16B  FIG. 16C  FIG. 16D

| Third embodiment |||||||
|---|---|---|---|---|---|---|
| Effective Focal Length= 2.738 mm , Half Field of View=9.900 °, System length=2.796 mm, Fno=2.273 ,LCR= 0.496 mm |||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.132 | 0.572 | 2.002 | 19.325 | 1.324 |
| | Light input surface 32 | 3.157 | 0.050 | | | |
| Second lens element 4 | Light output surface 41 | 14.062 | 0.342 | 1.642 | 22.409 | -3.349 |
| | Light input surface 42 | 2.748 | 0.419 | | | |
| Third lens element 5 | Light output surface 51 | -0.627 | 0.279 | 1.642 | 22.409 | -2.503 |
| | Light input surface 52 | -0.851 | 0.266 | | | |
| Fourth lens element 6 | Light output surface 61 | -1.391 | 0.582 | 1.642 | 22.409 | 1.941 |
| | Light input surface 62 | -0.748 | 0.285 | | | |
| Structured light generating unit 15 | Light emitting surface 100a | Infinity | | | | |

FIG. 17

| Surface | K | $a_2$ | $a_4$ | $a_6$ | $a_8$ |
|---|---|---|---|---|---|
| 31 | 2.176792E-02 | 0.000000E+00 | 0.000000E+00 | 3.451259E-02 | -3.852655E-02 |
| 32 | -6.494383E-09 | -9.451208E-02 | 5.538469E-01 | 9.731088E-01 | -1.296032E+00 |
| 41 | 7.436700E-11 | -1.016984E-01 | 1.284848E+00 | 5.328980E-02 | -2.412032E-01 |
| 42 | -5.437818E-09 | -1.003121E-02 | 5.282031E-01 | -1.942180E+00 | -2.447571E+00 |
| 51 | 4.322275E-07 | -2.438596E-01 | 2.952700E+00 | -1.024421E+01 | -4.171990E+00 |
| 52 | 1.169217E-09 | 0.000000E+00 | 3.412650E+00 | -3.504962E+00 | -2.519401E+01 |
| 61 | 8.819310E-09 | 0.000000E+00 | 1.200893E+00 | -8.364553E+00 | 1.591073E+01 |
| 62 | 3.446002E-07 | 0.000000E+00 | 8.015093E-01 | -3.666629E+00 | 7.366534E+00 |
| Surface | $a_{10}$ | $a_{12}$ | $a_{14}$ | $a_{16}$ | |
| 31 | 1.853465E-01 | -2.609665E-01 | 0.000000E+00 | 0.000000E+00 | |
| 32 | -2.189923E+00 | -1.515157E+00 | 5.968009E+00 | 1.108888E+01 | |
| 41 | -4.046227E+00 | -3.926562E+00 | 1.132322E+00 | 5.694174E+01 | |
| 42 | 7.764519E+00 | 1.469401E+01 | -3.692753E+01 | 1.056632E+02 | |
| 51 | 1.902827E+02 | -3.924768E+01 | -9.955287E+02 | -1.819402E+03 | |
| 52 | 1.589930E+02 | 6.479851E+02 | -5.959123E+03 | 1.810779E+04 | |
| 61 | -2.720623E+01 | 0.000000E+00 | 0.000000E+00 | 0.000000E+00 | |
| 62 | -6.913631E+00 | 0.000000E+00 | 0.000000E+00 | 0.000000E+00 | |

FIG. 18

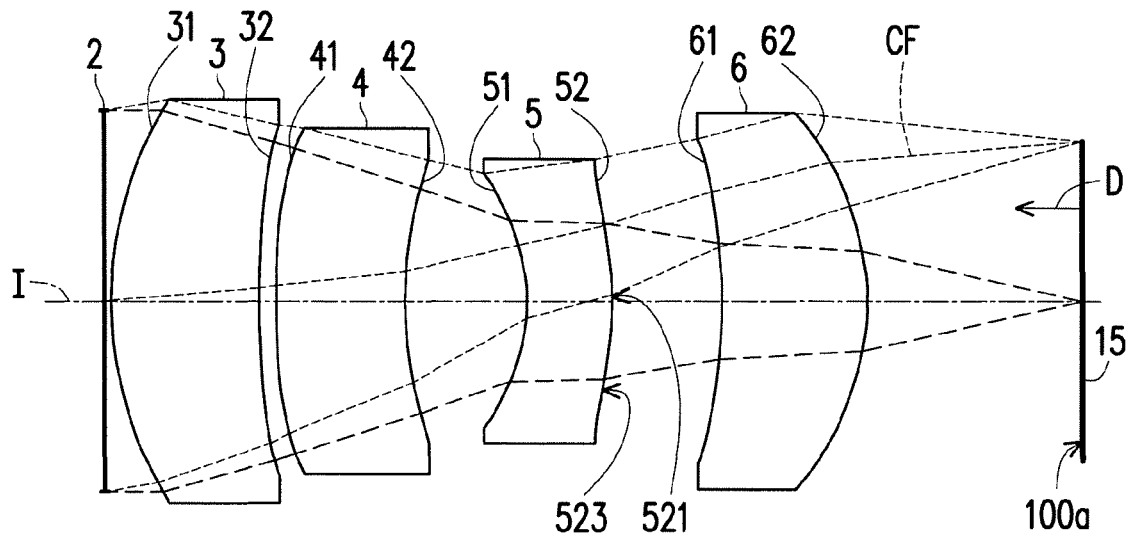
FIG. 19
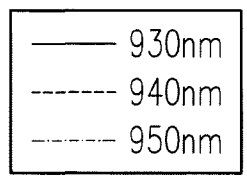
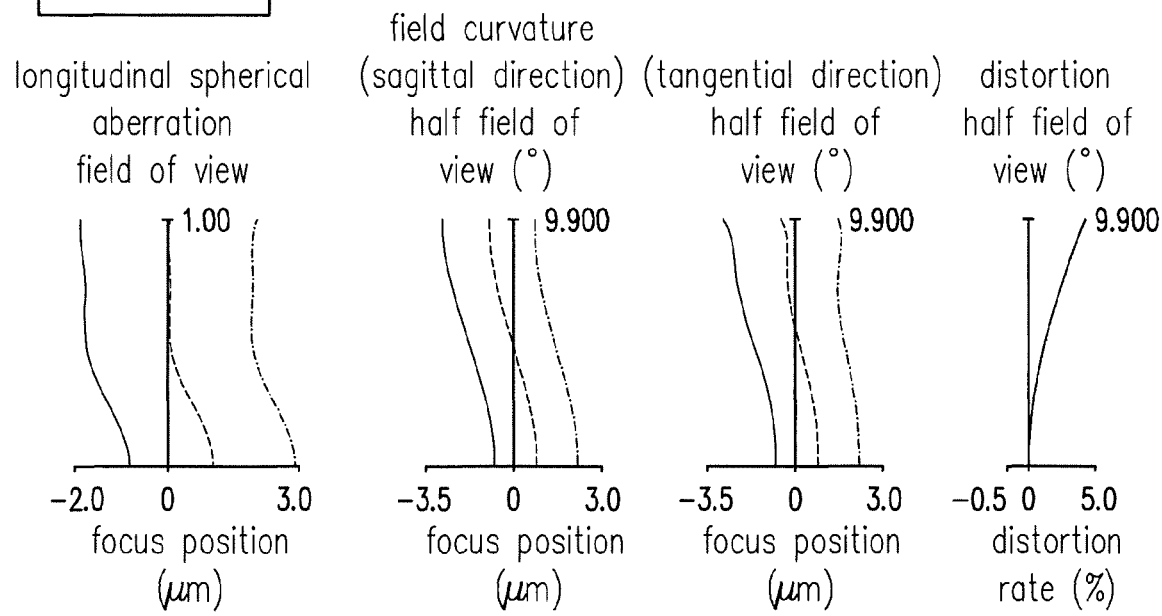
FIG. 20A  FIG. 20B  FIG. 20C  FIG. 20D

| Fourth embodiment |||||||
|---|---|---|---|---|---|---|
| Effective Focal Length= 2.544 mm , Half Field of View= 9.900 °, System length= 2.857 mm, Fno= 2.273 ,LCR= 0.467 mm |||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.131 | 0.436 | 2.002 | 19.325 | 1.492 |
| | Light input surface 32 | 2.917 | 0.050 | | | |
| Second lens element 4 | Light output surface 41 | 2.491 | 0.377 | 1.642 | 22.409 | -3.416 |
| | Light input surface 42 | 1.642 | 0.358 | | | |
| Third lens element 5 | Light output surface 51 | -0.632 | 0.250 | 1.642 | 22.409 | -2.921 |
| | Light input surface 52 | -0.846 | 0.325 | | | |
| Fourth lens element 6 | Light output surface 61 | -1.391 | 0.427 | 1.642 | 22.409 | 2.084 |
| | Light input surface 62 | -0.748 | 0.634 | | | |
| Structured light generating unit 15 | Light emitting surface 100a | Infinity | | | | |

FIG. 21

| Surface | K | $a_2$ | $a_4$ | $a_6$ | $a_8$ |
|---|---|---|---|---|---|
| 31 | 1.250710E-01 | 0.000000E+00 | 0.000000E+00 | 2.341439E-02 | 7.625342E-02 |
| 32 | 6.507963E-09 | -5.680870E-02 | 3.281617E-01 | 2.876243E-01 | 1.463974E-02 |
| 41 | 2.955631E-09 | -5.861031E-02 | 6.465122E-01 | 3.078368E-01 | -5.255511E-01 |
| 42 | -4.607900E-10 | 9.001576E-02 | 3.088000E-01 | -3.858788E-01 | -7.339532E+00 |
| 51 | -1.385448E-08 | -1.865586E-01 | 2.412670E+00 | -8.279051E+00 | -1.710677E+01 |
| 52 | -7.196753E-09 | 0.000000E+00 | 2.739973E+00 | -2.419366E+00 | -3.122044E+01 |
| 61 | -9.117100E-10 | 0.000000E+00 | 1.133456E+00 | -4.716098E+00 | 6.489269E+00 |
| 62 | 8.909152E-07 | 0.000000E+00 | 6.133593E-01 | -9.209926E-01 | 5.591001E-01 |
| Surface | $a_{10}$ | $a_{12}$ | $a_{14}$ | $a_{16}$ | |
| 31 | 2.263210E-01 | -6.612623E-01 | 0.000000E+00 | 0.000000E+00 | |
| 32 | -9.783648E-01 | -3.385721E+00 | -6.928097E-01 | 1.004775E+01 | |
| 41 | -2.250619E+00 | -8.321135E-01 | 4.203905E+00 | 1.199934E+01 | |
| 42 | -6.230204E+00 | 4.469813E+01 | 6.678213E+01 | 5.308346E+01 | |
| 51 | 2.626636E+01 | 5.117962E+02 | 2.443578E+03 | -1.274447E+04 | |
| 52 | 9.153285E+01 | 4.441535E+02 | -2.074992E+03 | 2.898927E+03 | |
| 61 | -1.300826E+01 | 0.000000E+00 | 0.000000E+00 | 0.000000E+00 | |
| 62 | -1.058285E+00 | 0.000000E+00 | 0.000000E+00 | 0.000000E+00 | |

FIG. 22

| Fifth embodiment | | | | | | |
|---|---|---|---|---|---|---|
| Effective Focal Length= 2.616 mm , Half Field of View= 9.893°, System length=2.940 mm, Fno= 2.273 ,LCR=0.476 mm | | | | | | |
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.120 | 0.488 | 2.002 | 19.325 | 1.462 |
| | Light input surface 32 | 2.902 | 0.061 | | | |
| Second lens element 4 | Light output surface 41 | 2.315 | 0.285 | 1.642 | 22.409 | -3.444 |
| | Light input surface 42 | 1.576 | 0.338 | | | |
| Third lens element 5 | Light output surface 51 | -0.684 | 0.250 | 1.642 | 22.409 | -2.685 |
| | Light input surface 52 | -0.966 | 0.354 | | | |
| Fourth lens element 6 | Light output surface 61 | -1.391 | 0.538 | 1.642 | 22.409 | 1.981 |
| | Light input surface 62 | -0.748 | 0.626 | | | |
| Structured light generating unit 15 | Light emitting surface 100a | Infinity | | | | |

FIG. 25

| Surface | K | $a_2$ | $a_4$ | $a_6$ | $a_8$ |
|---|---|---|---|---|---|
| 31 | 8.929228E-02 | 0.000000E+00 | 0.000000E+00 | 2.419232E-02 | 6.887142E-02 |
| 32 | 5.452569E-09 | -5.850442E-02 | 2.816481E-01 | 2.659370E-01 | 6.861410E-02 |
| 41 | 3.584333E-09 | -5.513018E-02 | 6.342657E-01 | 2.321174E-01 | -6.129465E-01 |
| 42 | 1.491510E-09 | 9.246923E-02 | 3.731451E-01 | -3.430891E-01 | -7.271647E+00 |
| 51 | -2.326511E-08 | -1.769913E-01 | 2.481672E+00 | -7.400763E+00 | -1.210226E+01 |
| 52 | -1.672518E-09 | 0.000000E+00 | 2.655489E+00 | -1.296152E+00 | -2.764680E+01 |
| 61 | 3.098900E-10 | 0.000000E+00 | 6.392100E-01 | -3.407312E+00 | 3.019157E+00 |
| 62 | 1.428445E-06 | 0.000000E+00 | 4.109885E-01 | -6.876746E-01 | 4.980287E-01 |
| Surface | $a_{10}$ | $a_{12}$ | $a_{14}$ | $a_{16}$ | |
| 31 | 1.748182E-01 | -4.441431E-01 | 0.000000E+00 | 0.000000E+00 | |
| 32 | -9.125733E-01 | -3.394463E+00 | -1.055176E+00 | 1.017761E+01 | |
| 41 | -2.332669E+00 | -1.833091E+00 | 2.655687E+00 | 2.119853E+01 | |
| 42 | -1.101623E+01 | 3.206755E+01 | 1.356030E+02 | 2.537801E+02 | |
| 51 | 1.887648E+01 | 3.811393E+02 | 1.996274E+03 | -9.972918E+03 | |
| 52 | 8.744388E+01 | 4.277158E+02 | -2.305994E+03 | 5.165136E+03 | |
| 61 | -7.597021E+00 | 0.000000E+00 | 0.000000E+00 | 0.000000E+00 | |
| 62 | -1.589909E-01 | 0.000000E+00 | 0.000000E+00 | 0.000000E+00 | |

FIG. 26

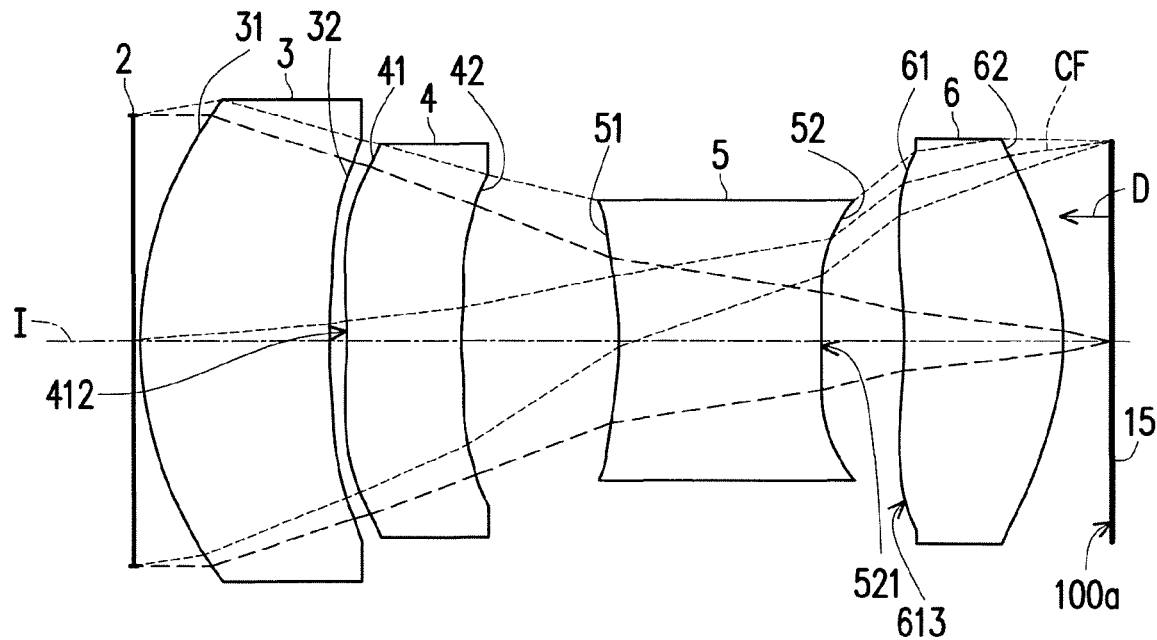
FIG. 27
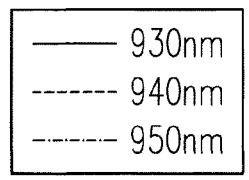
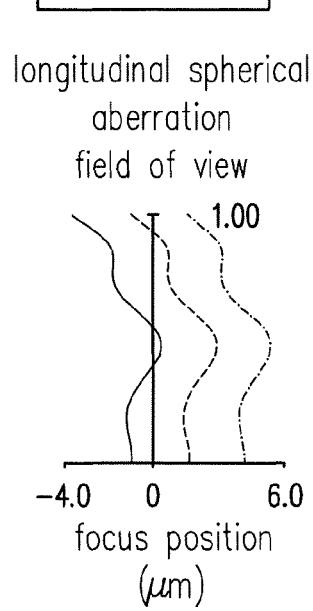
FIG. 28A
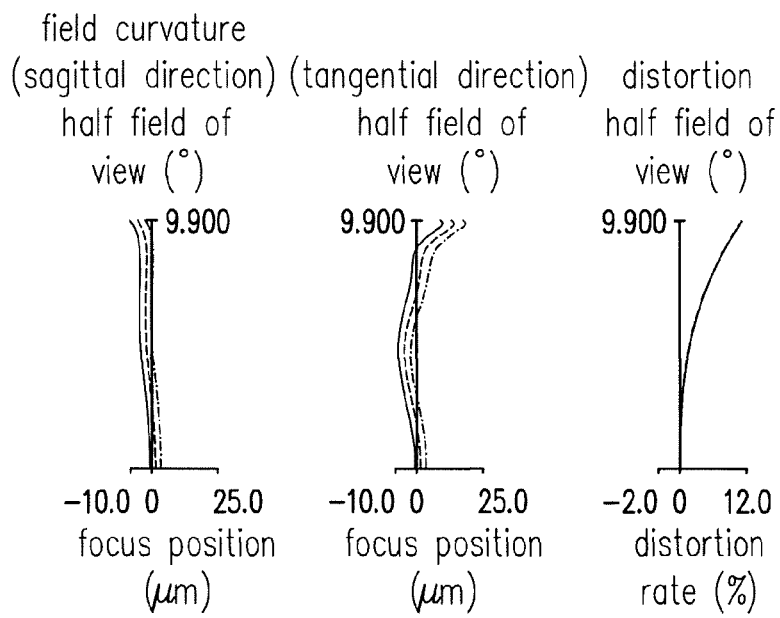
FIG. 28B  FIG. 28C  FIG. 28D

| Sixth embodiment |||||||
|---|---|---|---|---|---|---|
| Effective Focal Length= 3.022 mm , Half Field of View= 9.895°, System length= 2.861 mm, Fno= 2.273 ,LCR= 0.587 mm |||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.155 | 0.558 | 2.002 | 19.325 | 1.433 |
| | Light input surface 32 | 3.039 | 0.047 | | | |
| Second lens element 4 | Light output surface 41 | -240.249 | 0.341 | 1.642 | 22.409 | -5.042 |
| | Light input surface 42 | 4.419 | 0.462 | | | |
| Third lens element 5 | Light output surface 51 | -1.182 | 0.596 | 1.642 | 22.409 | -1.643 |
| | Light input surface 52 | -76.435 | 0.244 | | | |
| Fourth lens element 6 | Light output surface 61 | -1.391 | 0.468 | 1.642 | 22.409 | 2.044 |
| | Light input surface 62 | -0.748 | 0.146 | | | |
| Structured light generating unit 15 | Light emitting surface 100a | Infinity | | | | |

FIG. 29

| Surface | K | $a_2$ | $a_4$ | $a_6$ | $a_8$ |
|---|---|---|---|---|---|
| 31 | -9.025770E-02 | 0.000000E+00 | 0.000000E+00 | -1.843392E-02 | 6.492866E-02 |
| 32 | -1.731304E-06 | -7.418303E-02 | 5.212872E-01 | 1.070594E+00 | -2.889344E+00 |
| 41 | 6.559100E-11 | -1.006225E-01 | 1.651670E+00 | -2.538582E-01 | -1.323514E+00 |
| 42 | -4.582207E-08 | -5.725381E-02 | 1.517099E+00 | -9.067276E-01 | -9.286327E+00 |
| 51 | -1.495565E-07 | -7.645038E-02 | 2.484418E+00 | -9.733052E+00 | -5.392501E+01 |
| 52 | 4.345000E-12 | 0.000000E+00 | 4.213149E+00 | -1.334329E+00 | 3.090971E+01 |
| 61 | 1.566460E-08 | 0.000000E+00 | 2.846853E+00 | -8.111578E+00 | 1.767807E+01 |
| 62 | -8.859591E-05 | 0.000000E+00 | 1.280416E+00 | -9.124598E-01 | -5.651447E+00 |
| Surface | $a_{10}$ | $a_{12}$ | $a_{14}$ | $a_{16}$ | |
| 31 | 4.280291E-02 | -4.057957E-02 | 0.000000E+00 | 0.000000E+00 | |
| 32 | -3.336756E+00 | 4.522459E+00 | 1.689508E+01 | -3.123189E+01 | |
| 41 | -4.124259E+00 | 3.349948E-01 | 1.142668E+01 | -6.121126E+01 | |
| 42 | 6.227086E+01 | -1.224563E+02 | 1.986536E+03 | 3.519473E+03 | |
| 51 | 1.501495E+03 | -1.425843E+04 | 6.363355E+04 | -1.140602E+05 | |
| 52 | -1.217638E+03 | -1.133458E+04 | 4.838574E+04 | 7.855611E+04 | |
| 61 | -1.562251E+01 | 0.000000E+00 | 0.000000E+00 | 0.000000E+00 | |
| 62 | 1.496690E+01 | 0.000000E+00 | 0.000000E+00 | 0.000000E+00 | |

FIG. 30

| Seventh embodiment |||||||
|---|---|---|---|---|---|---|
| Effective Focal Length= 2.696 mm , Half Field of View=10.490 °, System length= 2.697 mm, Fno= 2.273,LCR= 0.500 mm |||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.213 | 0.472 | 2.002 | 19.325 | 1.942 |
| | Light input surface 32 | 2.819 | 0.101 | | | |
| Second lens element 4 | Light output surface 41 | 2.366 | 0.361 | 1.661 | 20.374 | 45.956 |
| | Light input surface 42 | 2.422 | 0.361 | | | |
| Third lens element 5 | Light output surface 51 | -1.784 | 0.300 | 1.661 | 20.374 | -2.081 |
| | Light input surface 52 | 5.411 | 0.400 | | | |
| Fourth lens element 6 | Light output surface 61 | -1.454 | 0.502 | 1.661 | 20.374 | 1.881 |
| | Light input surface 62 | -0.743 | 0.200 | | | |
| Structured light generating unit 15 | Light emitting surface 100a | Infinity | | | | |

FIG. 33

| Surface | K | $a_2$ | $a_4$ | $a_6$ | $a_8$ |
|---|---|---|---|---|---|
| 31 | -1.014812E+00 | 0.000000E+00 | 0.000000E+00 | 0.000000E+00 | 0.000000E+00 |
| 41 | 0.000000E+00 | 0.000000E+00 | 5.320162E-01 | -5.604626E-01 | 6.290185E-01 |
| 42 | 0.000000E+00 | 0.000000E+00 | 6.682960E-01 | -2.237081E+00 | 1.318795E+00 |
| 51 | 0.000000E+00 | 0.000000E+00 | 7.198306E-01 | -4.854166E+00 | 1.572529E+00 |
| 52 | 0.000000E+00 | 0.000000E+00 | 1.780266E+00 | -7.233081E-01 | 1.658349E+01 |
| 61 | 0.000000E+00 | 0.000000E+00 | -4.502402E-02 | -7.361564E-02 | -6.712371E-01 |
| 62 | 0.000000E+00 | 0.000000E+00 | -4.300128E-02 | 1.317702E-01 | -6.166163E-01 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 34

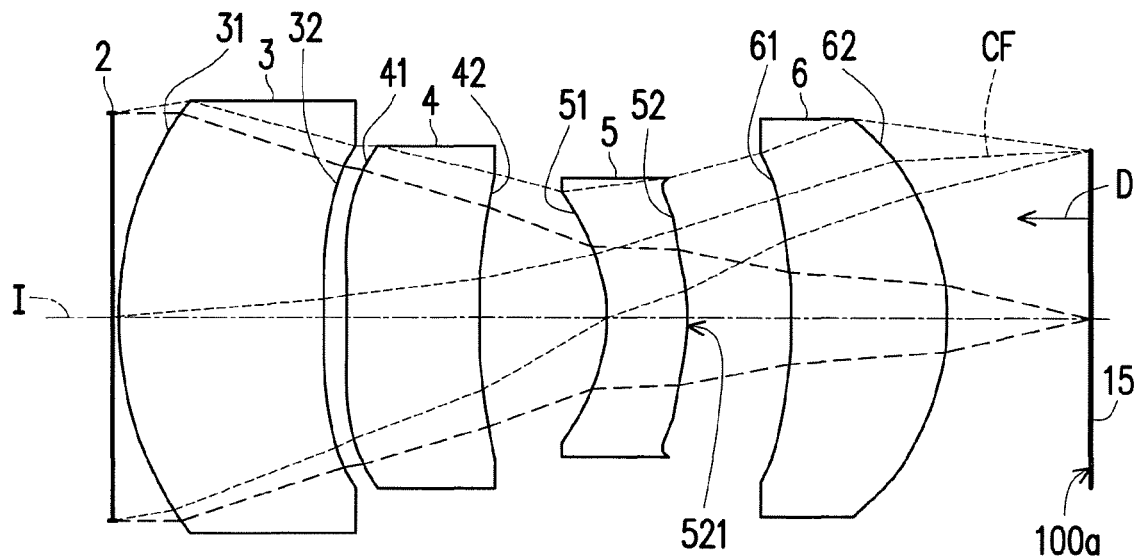
FIG. 35
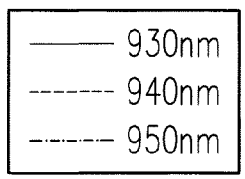
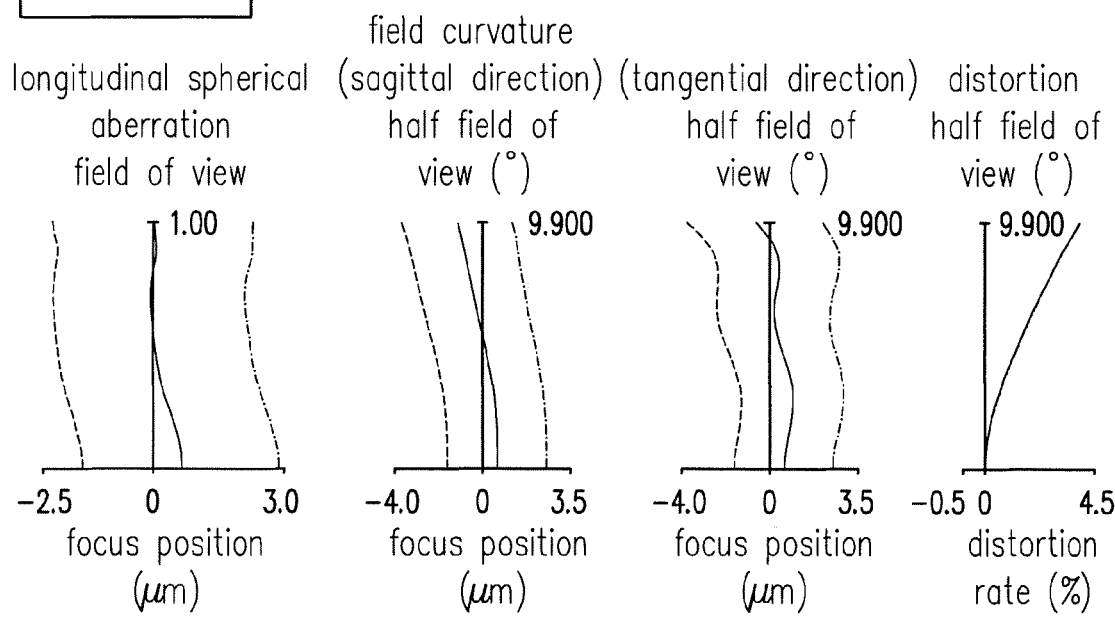
FIG. 36A   FIG. 36B   FIG. 36C   FIG. 36D

| Eighth embodiment | | | | | | |
|---|---|---|---|---|---|---|
| Effective Focal Length=2.883 mm, Half Field of View= 9.898°, System length= 3.039 mm, Fno= 2.273, LCR= 0.525 mm | | | | | | |
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| First lens element 3 | Light output surface 31 | 1.169 | 0.639 | 2.002 | 19.325 | 1.517 |
| | Light input surface 32 | 3.052 | 0.073 | | | |
| Second lens element 4 | Light output surface 41 | 11.744 | 0.414 | 1.642 | 22.409 | -3.245 |
| | Light input surface 42 | 2.668 | 0.398 | | | |
| Third lens element 5 | Light output surface 51 | -0.614 | 0.250 | 1.642 | 22.409 | -2.977 |
| | Light input surface 52 | -0.812 | 0.329 | | | |
| Fourth lens element 6 | Light output surface 61 | -1.391 | 0.485 | 1.642 | 22.409 | 2.029 |
| | Light input surface 62 | -0.748 | 0.451 | | | |
| Structured light generating unit 15 | Light emitting surface 100a | Infinity | | | | |

FIG. 37

| Surface | K | $a_2$ | $a_4$ | $a_6$ | $a_8$ |
|---|---|---|---|---|---|
| 31 | 2.490674E-01 | 0.000000E+00 | 0.000000E+00 | 3.957980E-02 | -7.338548E-02 |
| 32 | 1.334247E-08 | -4.938687E-02 | 7.020300E-01 | 1.198830E+00 | -2.686464E+00 |
| 41 | -1.523580E-10 | -1.002192E-01 | 1.621829E+00 | -4.231272E-01 | -1.208928E+00 |
| 42 | 6.907028E-09 | 3.691848E-04 | 8.579197E-01 | -2.623862E+00 | -5.935891E+00 |
| 51 | 3.521787E-07 | -1.910789E-01 | 2.456464E+00 | -1.124988E+01 | 2.478335E-02 |
| 52 | -5.707895E-08 | 0.000000E+00 | 2.608622E+00 | -5.086036E+00 | -4.135022E+00 |
| 61 | 5.174850E-09 | 0.000000E+00 | 9.339527E-01 | -5.718114E+00 | 1.148473E+01 |
| 62 | 1.111525E-06 | 0.000000E+00 | 6.173176E-01 | -1.829443E+00 | 3.021756E+00 |
| Surface | $a_{10}$ | $a_{12}$ | $a_{14}$ | $a_{16}$ | |
| 31 | 4.321627E-02 | -2.620183E-02 | 0.000000E+00 | 0.000000E+00 | |
| 32 | -2.845125E+00 | 5.429062E+00 | 1.958141E+01 | -1.802708E+01 | |
| 41 | -3.047967E+00 | 3.389047E+00 | 2.002618E+01 | -2.317048E+00 | |
| 42 | 3.308449E+01 | -1.181983E+01 | -3.509748E+02 | 8.930386E+02 | |
| 51 | 2.078230E+02 | -2.814893E+00 | -1.627866E+03 | 4.449899E+03 | |
| 52 | 3.572644E+01 | 8.322798E+02 | -4.974318E+03 | 9.440901E+03 | |
| 61 | -1.296263E+01 | 0.000000E+00 | 0.000000E+00 | 0.000000E+00 | |
| 62 | -2.139528E+00 | 0.000000E+00 | 0.000000E+00 | 0.000000E+00 | |

FIG. 38

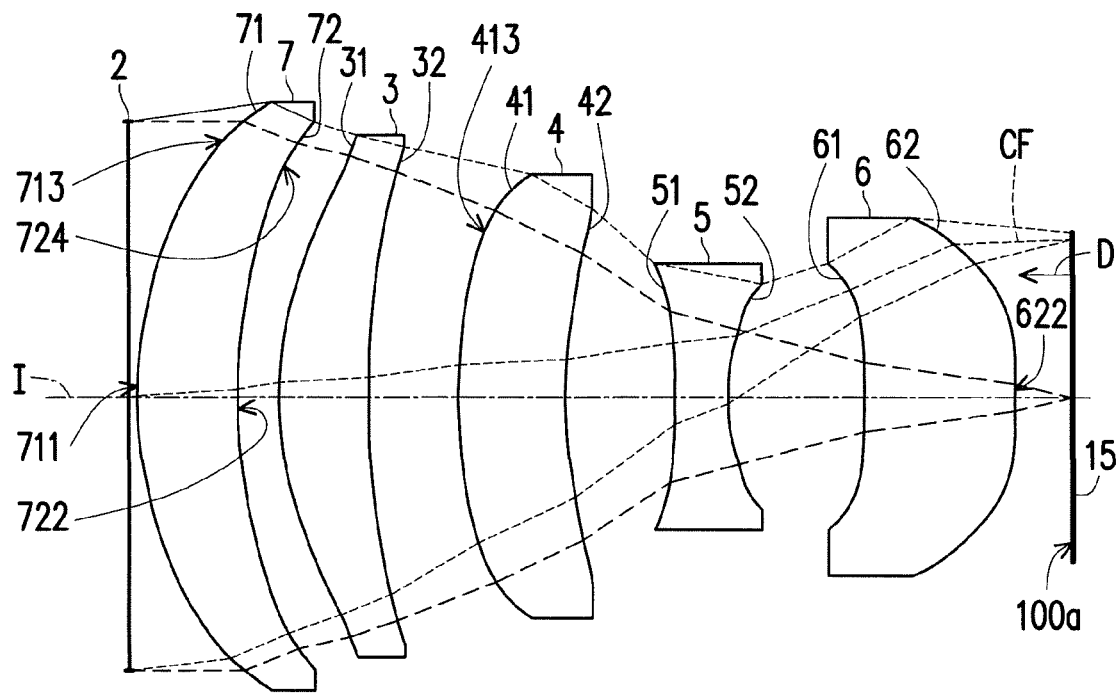
FIG. 39
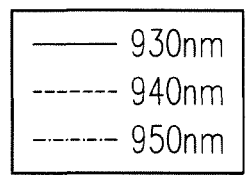
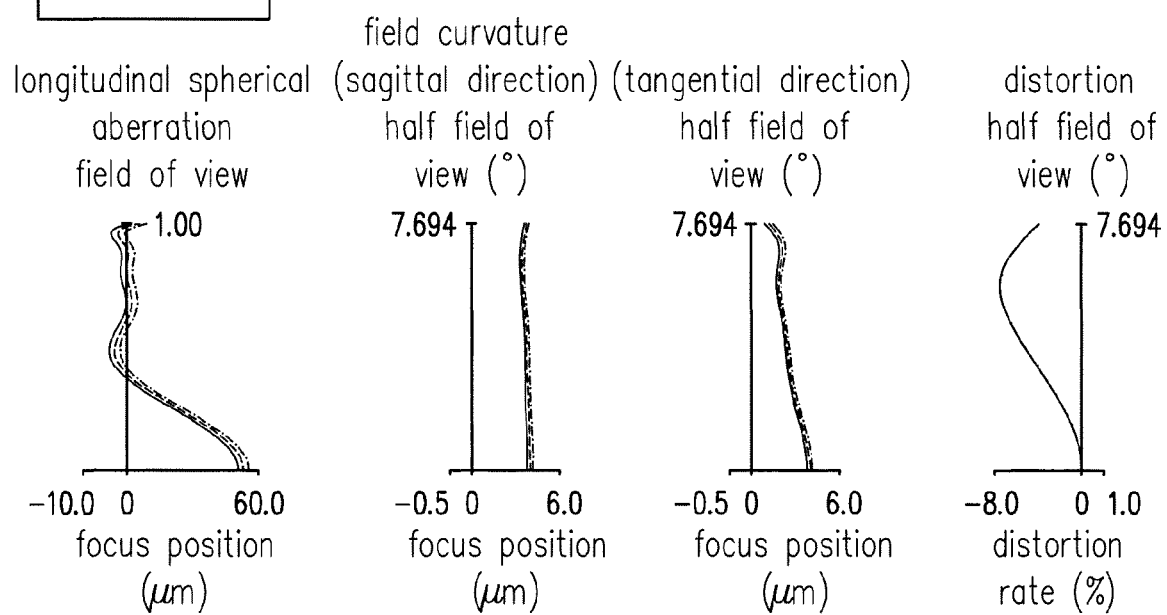
FIG. 40A    FIG. 40B    FIG. 40C    FIG. 40D

| Ninth embodiment ||||||
|---|---|---|---|---|---|
| Effective Focal Length= 3.930 mm , Half Field of View= 7.694 °, System length= 2.948 mm, Fno= 2.273 ,LCR= 0.500 mm ||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.374 | 0.315 | 1.642 | 22.409 | 10.304 |
| | Light input surface 72 | 1.597 | 0.133 | | | |
| First lens element 3 | Light output surface 31 | 1.140 | 0.281 | 1.851 | 40.104 | 2.129 |
| | Light input surface 32 | 2.847 | 0.283 | | | |
| Second lens element 4 | Light output surface 41 | 1.926 | 0.337 | 1.642 | 22.409 | -29.656 |
| | Light input surface 42 | 1.627 | 0.348 | | | |
| Third lens element 5 | Light output surface 51 | -2.641 | 0.167 | 1.642 | 22.409 | -0.943 |
| | Light input surface 52 | 0.768 | 0.428 | | | |
| Fourth lens element 6 | Light output surface 61 | -3.774 | 0.472 | 1.642 | 22.409 | -5.700 |
| | Light input surface 62 | 57.010 | 0.184 | | | |
| Structured light generating unit 15 | Light emitting surface 100a | Infinity | | | | |

FIG. 41

| Surface | K | $a_2$ | $a_4$ | $a_6$ | $a_8$ |
|---|---|---|---|---|---|
| 71 | 0.000000E+00 | 0.000000E+00 | -1.558274E-02 | -7.352989E-03 | -1.318979E-05 |
| 72 | 0.000000E+00 | 0.000000E+00 | -2.143992E-01 | 1.499460E-01 | 3.249626E-01 |
| 31 | -2.124640E+00 | 0.000000E+00 | 4.047650E-03 | 1.852374E-02 | 6.864948E-02 |
| 41 | 0.000000E+00 | 0.000000E+00 | 1.211722E-01 | -7.176108E-02 | 1.308057E+00 |
| 42 | 0.000000E+00 | 0.000000E+00 | -1.797234E-01 | -3.124200E-02 | -1.030147E-01 |
| 51 | 0.000000E+00 | 0.000000E+00 | -1.343789E+00 | 2.724300E+00 | -3.946756E+00 |
| 52 | 0.000000E+00 | 0.000000E+00 | -1.799127E-01 | 4.531966E-01 | 7.606690E+01 |
| 61 | 0.000000E+00 | 0.000000E+00 | -1.741490E+00 | -8.512048E+00 | 1.272576E+01 |
| 62 | 0.000000E+00 | 0.000000E+00 | -6.441054E+00 | 1.824678E+01 | -2.569895E+01 |
| Surface | $a_{10}$ | $a_{12}$ | $a_{14}$ | $a_{16}$ | |
| 71 | 2.669190E-01 | -3.505316E-01 | 4.745367E-01 | -2.152845E-01 | |
| 72 | -4.735924E-01 | -2.423920E-01 | 2.336884E+00 | -2.086177E+00 | |
| 31 | 2.289116E-03 | -4.199534E-01 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 42

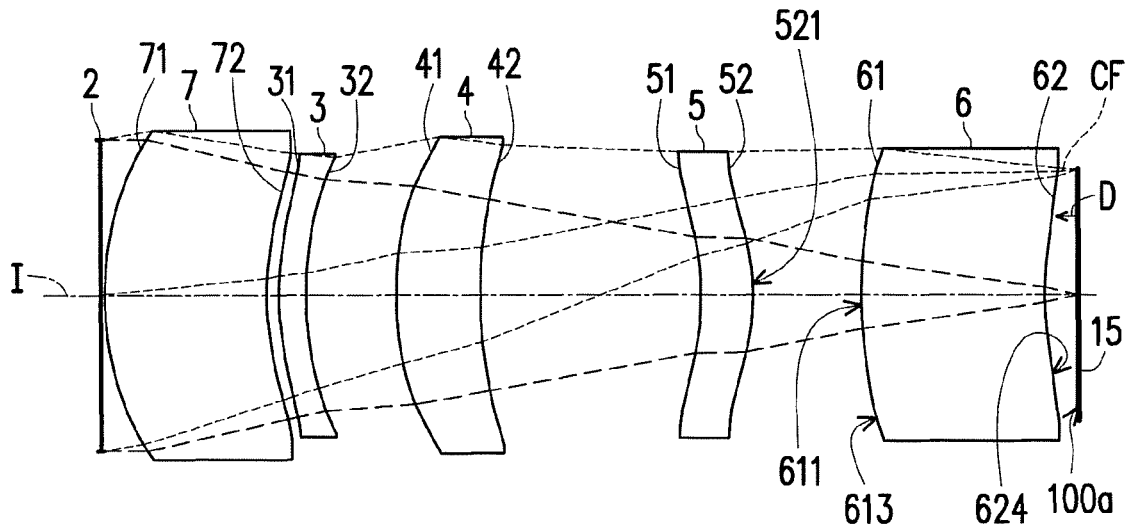
FIG. 43
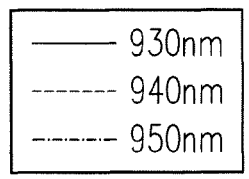
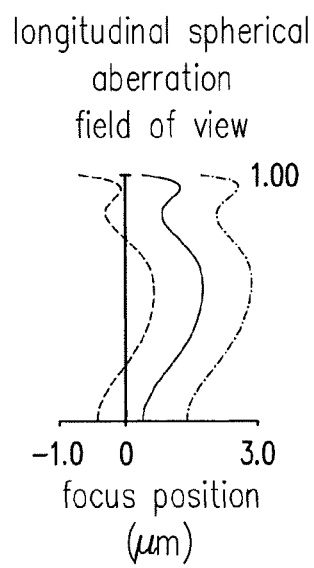
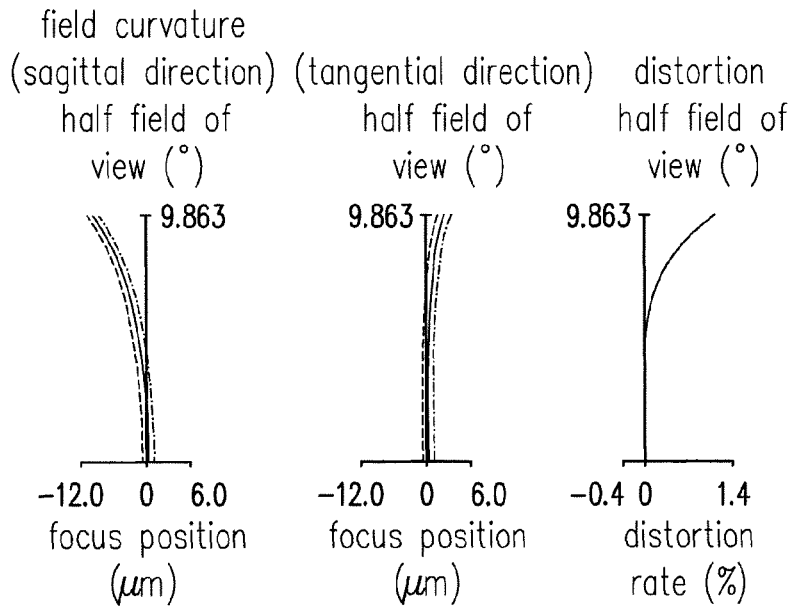
FIG. 44A   FIG. 44B   FIG. 44C   FIG. 44D

| Tenth embodiment ||||||
|---|---|---|---|---|---|
| Effective Focal Length= 2.825 mm , Half Field of View= 9.863 °, System length= 3.881 mm, Fno= 2.273 ,LCR= 0.500 mm ||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.308 | 0.644 | 1.642 | 22.409 | 18.303 |
| | Light input surface 72 | 1.200 | 0.048 | | | |
| First lens element 3 | Light output surface 31 | 1.198 | 0.107 | 1.851 | 40.104 | 8.383 |
| | Light input surface 32 | 1.387 | 0.360 | | | |
| Second lens element 4 | Light output surface 41 | 1.302 | 0.333 | 1.642 | 22.409 | 5.478 |
| | Light input surface 42 | 1.906 | 0.881 | | | |
| Third lens element 5 | Light output surface 51 | -1.007 | 0.205 | 1.642 | 22.409 | 8.007 |
| | Light input surface 52 | -0.902 | 0.436 | | | |
| Fourth lens element 6 | Light output surface 61 | 2.236 | 0.731 | 1.642 | 22.409 | -12.122 |
| | Light input surface 62 | 1.508 | 0.134 | | | |
| Structured light generating unit 15 | Light emitting surface 100a | Infinity | | | | |

FIG. 45

| Surface | K | $a_2$ | $a_4$ | $a_6$ | $a_8$ |
|---|---|---|---|---|---|
| 71 | 1.259823E-02 | 0.000000E+00 | 4.060935E-02 | 3.817202E-02 | -1.047399E-02 |
| 72 | -2.044120E+00 | 0.000000E+00 | -2.613834E-01 | 2.745676E-03 | -9.650442E-02 |
| 31 | -4.613023E+00 | 0.000000E+00 | -1.698677E-01 | -4.274042E-01 | 9.602266E-02 |
| 41 | 0.000000E+00 | 0.000000E+00 | 1.416814E-01 | 6.350042E-02 | -2.392015E-01 |
| 42 | 0.000000E+00 | 0.000000E+00 | 7.081863E-02 | -3.748756E-02 | -2.423453E-01 |
| 51 | 0.000000E+00 | 0.000000E+00 | 6.271096E-01 | 9.522767E-01 | -1.100954E+00 |
| 52 | 0.000000E+00 | 0.000000E+00 | 7.243209E-01 | 8.594389E-01 | 1.567491E-01 |
| 61 | 0.000000E+00 | 0.000000E+00 | 4.964510E-02 | -2.597482E-03 | 2.001692E-01 |
| 62 | 0.000000E+00 | 0.000000E+00 | -4.099323E-01 | 3.719534E-01 | -3.660884E-01 |
| Surface | $a_{10}$ | $a_{12}$ | $a_{14}$ | $a_{16}$ | |
| 71 | 2.133470E-01 | -4.008415E-01 | 3.888058E-01 | -1.951278E-02 | |
| 72 | -4.032650E-01 | -7.893007E-01 | -2.734547E+00 | 2.536007E+00 | |
| 31 | -1.264085E-01 | -1.940336E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 46

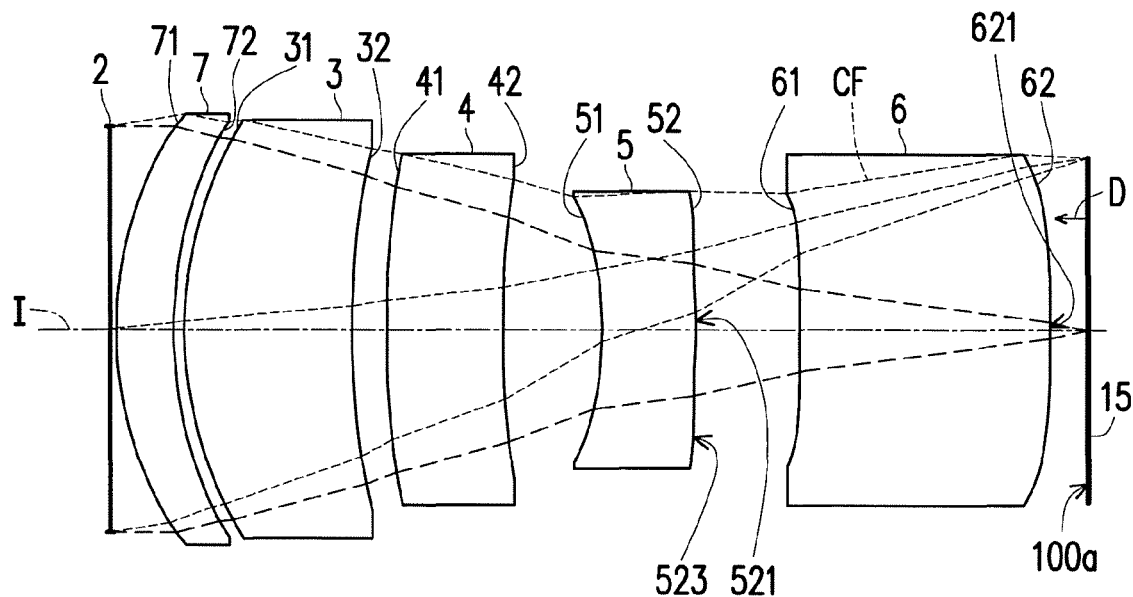
FIG. 47
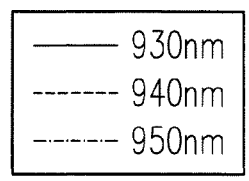
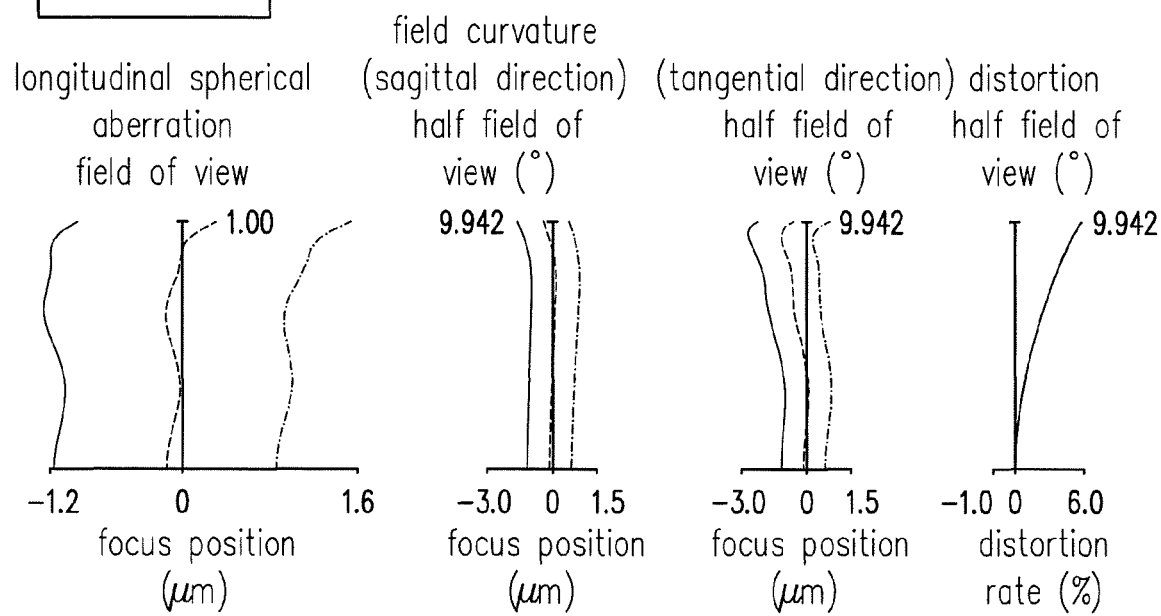
FIG. 48A  FIG. 48B  FIG. 48C  FIG. 48D

| Eleventh embodiment | | | | | | |
|---|---|---|---|---|---|---|
| Effective Focal Length= 2.672 mm , Half Field of View= 9.942 °, System length= 2.814 mm, Fno= 2.273, LCR= 0.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.158 | 0.164 | 1.642 | 22.409 | 18.151 |
| | Light input surface 72 | 1.221 | 0.030 | | | |
| First lens element 3 | Light output surface 31 | 1.072 | 0.487 | 1.851 | 40.104 | 1.933 |
| | Light input surface 32 | 2.555 | 0.099 | | | |
| Second lens element 4 | Light output surface 41 | 3.187 | 0.337 | 1.642 | 22.409 | -262.121 |
| | Light input surface 42 | 2.999 | 0.287 | | | |
| Third lens element 5 | Light output surface 51 | -1.107 | 0.269 | 1.642 | 22.409 | -1.951 |
| | Light input surface 52 | -14.425 | 0.305 | | | |
| Fourth lens element 6 | Light output surface 61 | -36.710 | 0.725 | 1.642 | 22.409 | 8.854 |
| | Light input surface 62 | -4.808 | 0.111 | | | |
| Structured light generating unit 15 | Light emitting surface 100a | Infinity | | | | |

FIG. 49

| Surface | K | $a_2$ | $a_4$ | $a_6$ | $a_8$ |
|---|---|---|---|---|---|
| 71 | 0.000000E+00 | 0.000000E+00 | 4.716258E-02 | 2.266320E-02 | 1.195874E-01 |
| 72 | 0.000000E+00 | 0.000000E+00 | -1.281477E-01 | 1.396191E-01 | 4.127614E-01 |
| 31 | -1.803435E+00 | 0.000000E+00 | 2.129356E-02 | 6.771248E-02 | 1.700087E-01 |
| 41 | 0.000000E+00 | 0.000000E+00 | 7.749256E-02 | -7.798214E-03 | 3.786760E-01 |
| 42 | 0.000000E+00 | 0.000000E+00 | 7.489814E-02 | -5.200940E-01 | 3.891828E-01 |
| 51 | 0.000000E+00 | 0.000000E+00 | -2.771622E-01 | -2.288237E+00 | 4.851692E+00 |
| 52 | 0.000000E+00 | 0.000000E+00 | -1.852428E-01 | -1.765960E+00 | 3.609518E+00 |
| 61 | 0.000000E+00 | 0.000000E+00 | -9.523074E-01 | -1.515023E+00 | -9.324519E+00 |
| 62 | 0.000000E+00 | 0.000000E+00 | -3.587105E-01 | -2.802818E+00 | 5.302282E+00 |
| Surface | $a_{10}$ | $a_{12}$ | $a_{14}$ | $a_{16}$ | |
| 71 | 3.044242E-01 | -4.504850E-02 | 1.694850E+00 | -1.213220E+00 | |
| 72 | 3.977864E-01 | 1.361172E+00 | 2.278146E-01 | 3.197594E+00 | |
| 31 | 1.949342E-02 | 7.049348E-01 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 50

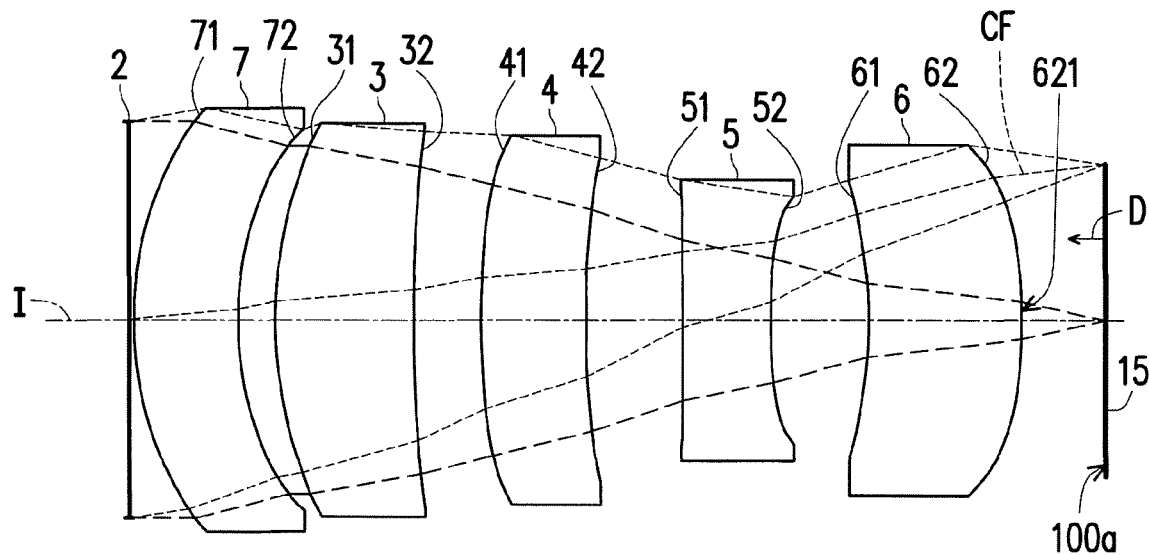
FIG. 51
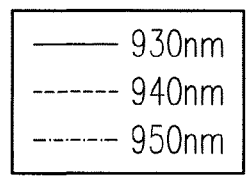
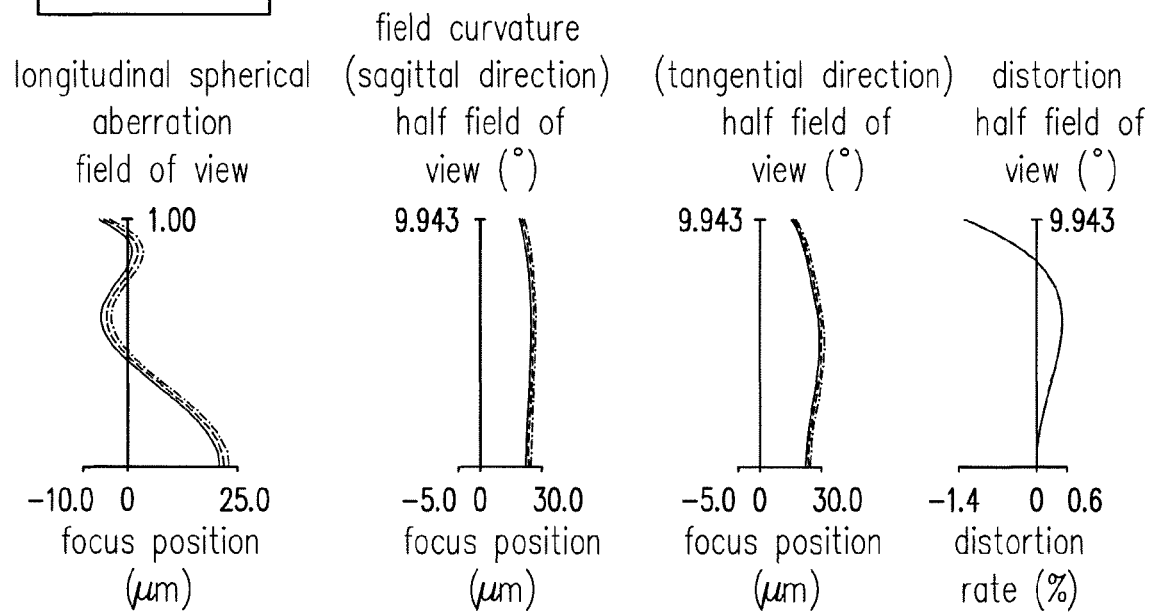
FIG. 52A  FIG. 52B  FIG. 52C  FIG. 52D

| Twelfth embodiment |||||||
|---|---|---|---|---|---|---|
| Effective Focal Length= 2.899 mm , Half Field of View= 9.943 °, System length= 3.113 mm, Fno= 2.273 ,LCR= 0.500 mm |||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.175 | 0.332 | 1.642 | 22.409 | 41.003 |
| | Light input surface 72 | 1.099 | 0.120 | | | |
| First lens element 3 | Light output surface 31 | 1.356 | 0.442 | 1.851 | 40.104 | 2.103 |
| | Light input surface 32 | 5.132 | 0.217 | | | |
| Second lens element 4 | Light output surface 41 | 3.011 | 0.335 | 1.642 | 22.409 | -131.268 |
| | Light input surface 42 | 2.780 | 0.310 | | | |
| Third lens element 5 | Light output surface 51 | -12.943 | 0.283 | 1.642 | 22.409 | -4.607 |
| | Light input surface 52 | 3.692 | 0.314 | | | |
| Fourth lens element 6 | Light output surface 61 | -1.412 | 0.490 | 1.642 | 22.409 | -52.572 |
| | Light input surface 62 | -1.672 | 0.269 | | | |
| Structured light generating unit 15 | Light emitting surface 100a | Infinity | | | | |

FIG. 53

| Surface | K | $a_2$ | $a_4$ | $a_6$ | $a_8$ |
|---|---|---|---|---|---|
| 71 | 0.000000E+00 | 0.000000E+00 | 4.195687E-03 | 7.129394E-02 | 7.470925E-02 |
| 72 | 0.000000E+00 | 0.000000E+00 | -6.674056E-02 | 3.013630E-01 | 6.004021E-01 |
| 31 | -1.757836E+00 | 0.000000E+00 | -1.116710E-03 | 8.738942E-03 | 6.910133E-02 |
| 41 | 0.000000E+00 | 0.000000E+00 | 1.438841E-01 | 3.073238E-01 | 6.064638E-01 |
| 42 | 0.000000E+00 | 0.000000E+00 | -1.360912E-01 | 7.775648E-02 | 5.243081E-01 |
| 51 | 0.000000E+00 | 0.000000E+00 | 2.238926E-01 | 1.440977E-01 | -5.170116E+00 |
| 52 | 0.000000E+00 | 0.000000E+00 | 1.461001E+00 | 1.299501E+00 | 1.639760E+01 |
| 61 | 0.000000E+00 | 0.000000E+00 | 1.557613E-01 | 1.247361E+00 | -4.963764E+00 |
| 62 | 0.000000E+00 | 0.000000E+00 | -3.797876E-01 | -6.054421E-01 | -1.576617E+00 |
| Surface | $a_{10}$ | $a_{12}$ | $a_{14}$ | $a_{16}$ | |
| 71 | 2.728495E-01 | -4.062182E-01 | 4.618048E-01 | -4.133206E-01 | |
| 72 | 4.885645E-02 | 5.551913E-01 | 3.098144E+00 | -1.191498E+00 | |
| 31 | 1.451158E-01 | 5.949110E-01 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 54

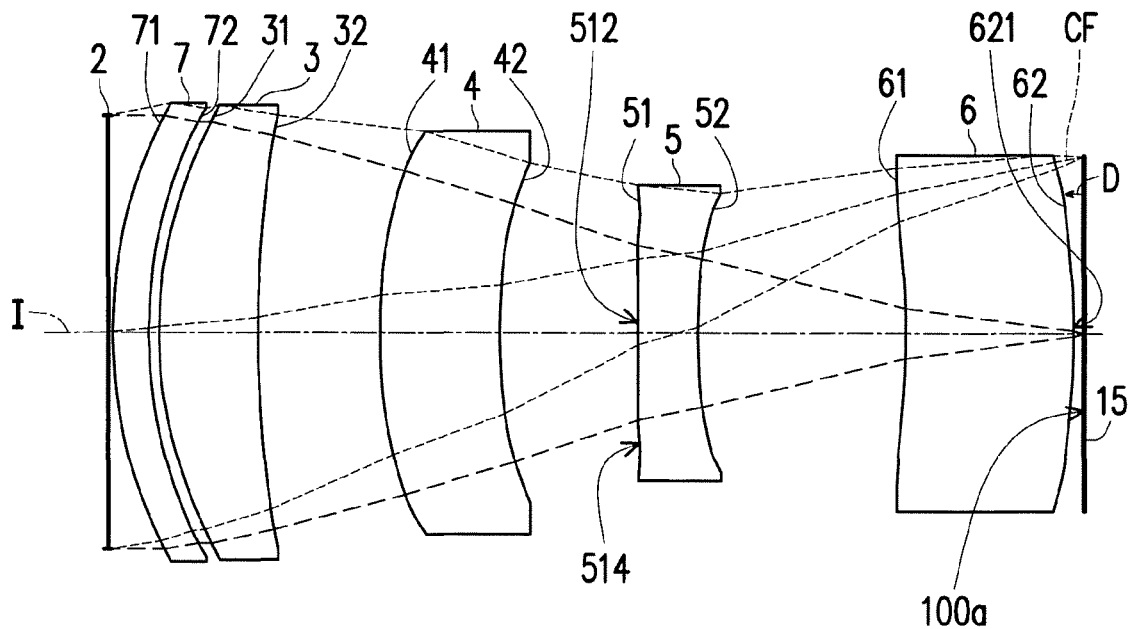
FIG. 55
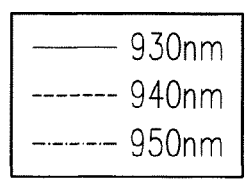
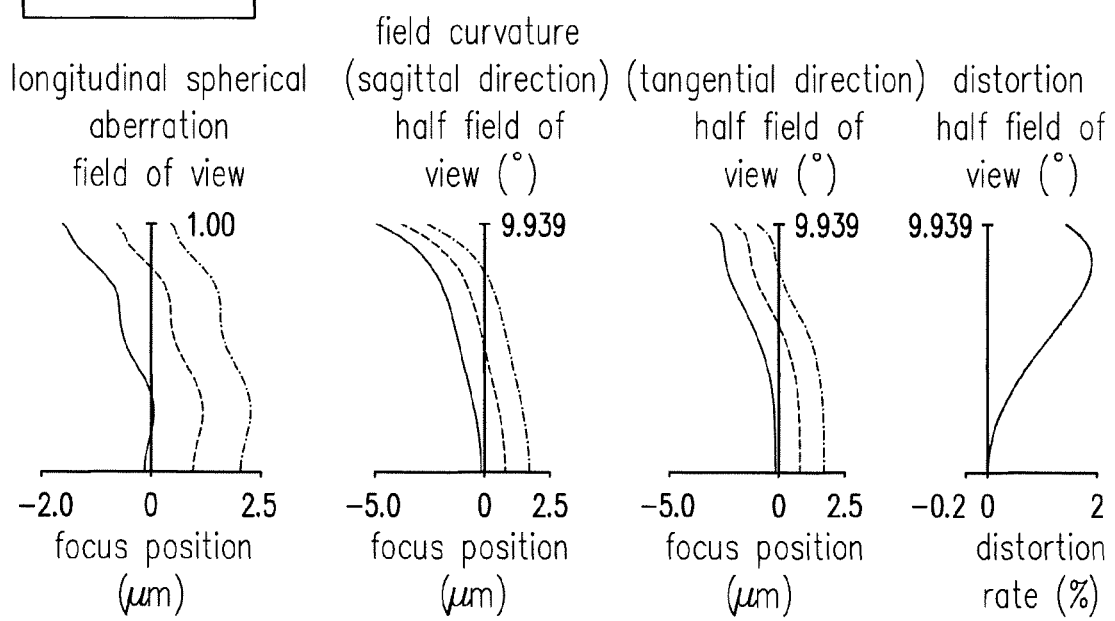
FIG. 56A    FIG. 56B    FIG. 56C    FIG. 56D

| Thirteenth embodiment ||||||
|---|---|---|---|---|---|
| Effective Focal Length= 2.797 mm , Half Field of View= 9.939 °, System length= 2.748 mm, Fno= 2.273 ,LCR= 0.500 mm ||||||
| Element | Surface | Radius of curvature(mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.385 | 0.100 | 1.642 | 22.409 | -218.679 |
| | Light input surface 72 | 1.334 | 0.030 | | | |
| First lens element 3 | Light output surface 31 | 1.241 | 0.279 | 1.851 | 40.104 | 2.207 |
| | Light input surface 32 | 3.445 | 0.345 | | | |
| Second lens element 4 | Light output surface 41 | 1.685 | 0.339 | 1.642 | 22.409 | 80.036 |
| | Light input surface 42 | 1.610 | 0.393 | | | |
| Third lens element 5 | Light output surface 51 | -1719.029 | 0.168 | 1.642 | 22.409 | -3.635 |
| | Light input surface 52 | 2.255 | 0.587 | | | |
| Fourth lens element 6 | Light output surface 61 | -2.172 | 0.477 | 1.642 | 22.409 | 15.615 |
| | Light input surface 62 | -1.923 | 0.030 | | | |
| Structured light generating unit 15 | Light emitting surface 100a | Infinity | | | | |

FIG. 57

| Surface | K | $a_2$ | $a_4$ | $a_6$ | $a_8$ |
|---|---|---|---|---|---|
| 71 | 0.000000E+00 | 0.000000E+00 | -5.702628E-02 | 1.092237E-01 | 8.635139E-02 |
| 72 | 0.000000E+00 | 0.000000E+00 | -1.064917E-01 | 1.743706E-01 | 4.079218E-01 |
| 31 | -1.554469E+00 | 0.000000E+00 | 4.334009E-02 | 2.938950E-02 | 5.012864E-02 |
| 41 | 0.000000E+00 | 0.000000E+00 | 8.269282E-02 | 3.893629E-01 | 5.054045E-01 |
| 42 | 0.000000E+00 | 0.000000E+00 | 2.027230E-02 | 6.483200E-01 | 1.135186E+00 |
| 51 | 0.000000E+00 | 0.000000E+00 | 1.894892E-01 | 4.731153E-02 | -6.499779E+00 |
| 52 | 0.000000E+00 | 0.000000E+00 | 1.057446E+00 | 1.534054E+00 | -4.494106E+00 |
| 61 | 0.000000E+00 | 0.000000E+00 | 2.906392E-01 | 1.409764E+00 | -2.266472E+00 |
| 62 | 0.000000E+00 | 0.000000E+00 | 6.156159E-01 | -1.732450E+00 | -7.951177E-01 |
| Surface | $a_{10}$ | $a_{12}$ | $a_{14}$ | $a_{16}$ | |
| 71 | 2.699156E-01 | -4.166020E-01 | 4.302721E-01 | -1.110459E+00 | |
| 72 | -2.523314E-01 | -9.284280E-02 | 1.735686E+00 | -4.006786E+00 | |
| 31 | 4.609574E-02 | -2.136989E-01 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 58

| Fourteenth embodiment ||||||
|---|---|---|---|---|---|
| Effective Focal Length= 2.765 mm, Half Field of View= 9.941 °, System length= 3.157 mm, Fno= 2.273 ,LCR= 0.500 mm ||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.155 | 0.321 | 1.642 | 22.409 | 30.966 |
| | Light input surface 72 | 1.099 | 0.176 | | | |
| First lens element 3 | Light output surface 31 | 1.347 | 0.631 | 1.851 | 40.104 | 2.026 |
| | Light input surface 32 | 5.288 | 0.078 | | | |
| Second lens element 4 | Light output surface 41 | 3.581 | 0.330 | 1.642 | 22.409 | 1342.453 |
| | Light input surface 42 | 3.470 | 0.356 | | | |
| Third lens element 5 | Light output surface 51 | -6.935 | 0.295 | 1.642 | 22.409 | -4.491 |
| | Light input surface 52 | 4.720 | 0.204 | | | |
| Fourth lens element 6 | Light output surface 61 | -1.423 | 0.555 | 1.642 | 22.409 | -10.907 |
| | Light input surface 62 | -2.072 | 0.209 | | | |
| Structured light generating unit 15 | Light emitting surface 100a | Infinity | | | | |

FIG. 61

| Surface | K | $a_2$ | $a_4$ | $a_6$ | $a_8$ |
|---|---|---|---|---|---|
| 71 | 0.000000E+00 | 0.000000E+00 | -2.981978E-03 | 8.003733E-02 | 8.401038E-02 |
| 72 | 0.000000E+00 | 0.000000E+00 | -7.214946E-02 | 2.445475E-01 | 5.218710E-01 |
| 31 | -2.236496E+00 | 0.000000E+00 | -6.510730E-05 | 7.801764E-03 | 8.696500E-03 |
| 41 | 0.000000E+00 | 0.000000E+00 | 1.394145E-01 | 2.937316E-01 | 4.612120E-01 |
| 42 | 0.000000E+00 | 0.000000E+00 | -1.561796E-01 | 5.263813E-02 | 1.682712E-01 |
| 51 | 0.000000E+00 | 0.000000E+00 | 1.564815E-01 | -7.687107E-01 | -6.015568E+00 |
| 52 | 0.000000E+00 | 0.000000E+00 | 1.434931E+00 | 1.840163E+00 | 1.767580E-01 |
| 61 | 0.000000E+00 | 0.000000E+00 | 2.621392E-01 | 6.612657E-01 | -3.781531E-01 |
| 62 | 0.000000E+00 | 0.000000E+00 | -3.252894E-01 | -3.239313E-01 | -8.993117E-01 |
| Surface | $a_{10}$ | $a_{12}$ | $a_{14}$ | $a_{16}$ | |
| 71 | 2.696506E-01 | -4.253828E-01 | 4.806432E-01 | -8.986937E-02 | |
| 72 | -2.433435E-02 | 4.838710E-01 | 3.096216E+00 | -1.065822E+00 | |
| 31 | 3.400431E-02 | 2.351850E-01 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 62

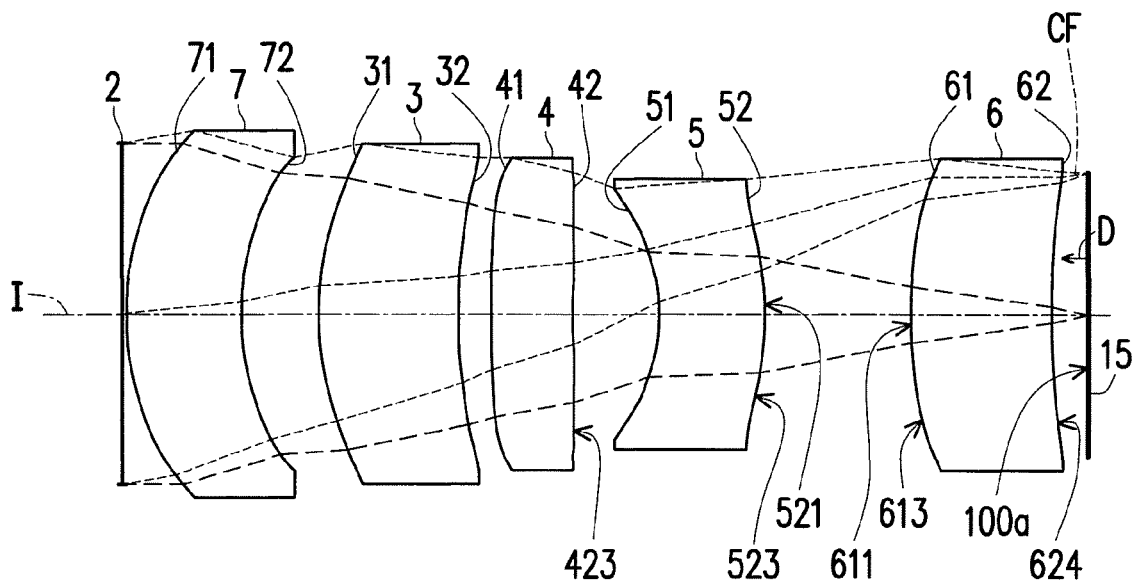
FIG. 63
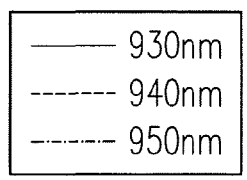
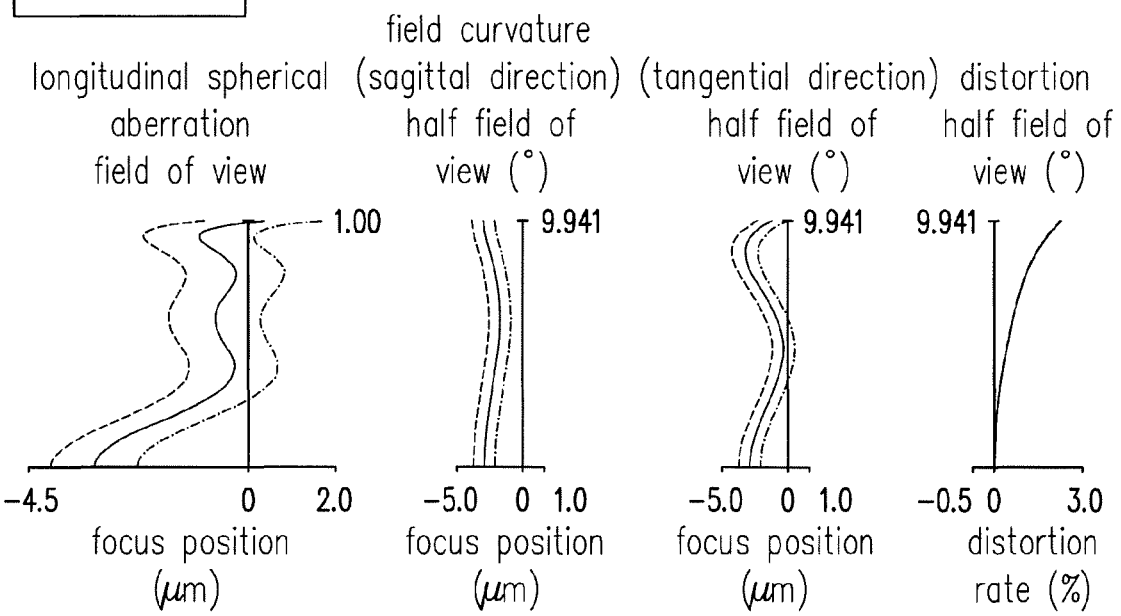
FIG. 64A    FIG. 64B    FIG. 64C    FIG. 64D

| Fifteenth embodiment ||||||
|---|---|---|---|---|---|
| Effective Focal Length= 2.754 mm , Half Field of View= 9.941 °, System length= 3.433mm, Fno= 2.273 ,LCR= 0.500 mm ||||||
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.057 | 0.411 | 1.642 | 22.409 | 21.911 |
| | Light input surface 72 | 0.976 | 0.276 | | | |
| First lens element 3 | Light output surface 31 | 1.028 | 0.499 | 1.851 | 40.104 | 1.967 |
| | Light input surface 32 | 2.161 | 0.117 | | | |
| Second lens element 4 | Light output surface 41 | 12.434 | 0.292 | 1.642 | 22.409 | -23.196 |
| | Light input surface 42 | 6.604 | 0.307 | | | |
| Third lens element 5 | Light output surface 51 | -0.649 | 0.377 | 1.642 | 22.409 | -4.806 |
| | Light input surface 52 | -1.015 | 0.521 | | | |
| Fourth lens element 6 | Light output surface 61 | 1.849 | 0.499 | 1.642 | 22.409 | 8.571 |
| | Light input surface 62 | 2.546 | 0.134 | | | |
| Structured light generating unit 15 | Light emitting surface 100a | Infinity | | | | |

FIG. 65

| Surface | K | $a_2$ | $a_4$ | $a_6$ | $a_8$ |
|---|---|---|---|---|---|
| 71 | 0.000000E+00 | 0.000000E+00 | 1.323683E-02 | 1.415505E-01 | -1.901279E-03 |
| 72 | 0.000000E+00 | 0.000000E+00 | -1.504384E-01 | 2.801747E-01 | 1.244861E+00 |
| 31 | -2.117860E+00 | 0.000000E+00 | -9.847273E-03 | -1.920331E-01 | -3.426741E-01 |
| 41 | 0.000000E+00 | 0.000000E+00 | 3.371267E-01 | 9.510202E-01 | 1.726258E-01 |
| 42 | 0.000000E+00 | 0.000000E+00 | -3.294763E-01 | -6.103524E-01 | 2.985943E+00 |
| 51 | 0.000000E+00 | 0.000000E+00 | 3.099369E-01 | -3.629411E-02 | 5.524460E+00 |
| 52 | 0.000000E+00 | 0.000000E+00 | 8.047678E-01 | 4.114206E-01 | 2.098681E+00 |
| 61 | 0.000000E+00 | 0.000000E+00 | 2.301436E-01 | -3.167906E-02 | -5.716889E-02 |
| 62 | 0.000000E+00 | 0.000000E+00 | -2.041044E-01 | -2.058155E-01 | 1.361678E+00 |
| Surface | $a_{10}$ | $a_{12}$ | $a_{14}$ | $a_{16}$ | |
| 71 | 7.027783E-01 | -9.106184E-01 | 2.592696E+00 | -2.291875E+00 | |
| 72 | 1.002177E+00 | -2.394935E-01 | 1.587102E+01 | 2.057729E+01 | |
| 31 | 1.711165E+00 | -1.799430E-01 | 0.000000E+00 | 0.000000E+00 | |
| 41 | 0.000000E-00 | 0.000000E+00 | 0.000000E+00 | 0.000000E+00 | |
| 42 | 0.000000E-00 | 0.000000E+00 | 0.000000E+00 | 0.000000E+00 | |
| 51 | 0.000000E-00 | 0.000000E+00 | 0.000000E+00 | 0.000000E+00 | |
| 52 | 0.000000E-00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 66

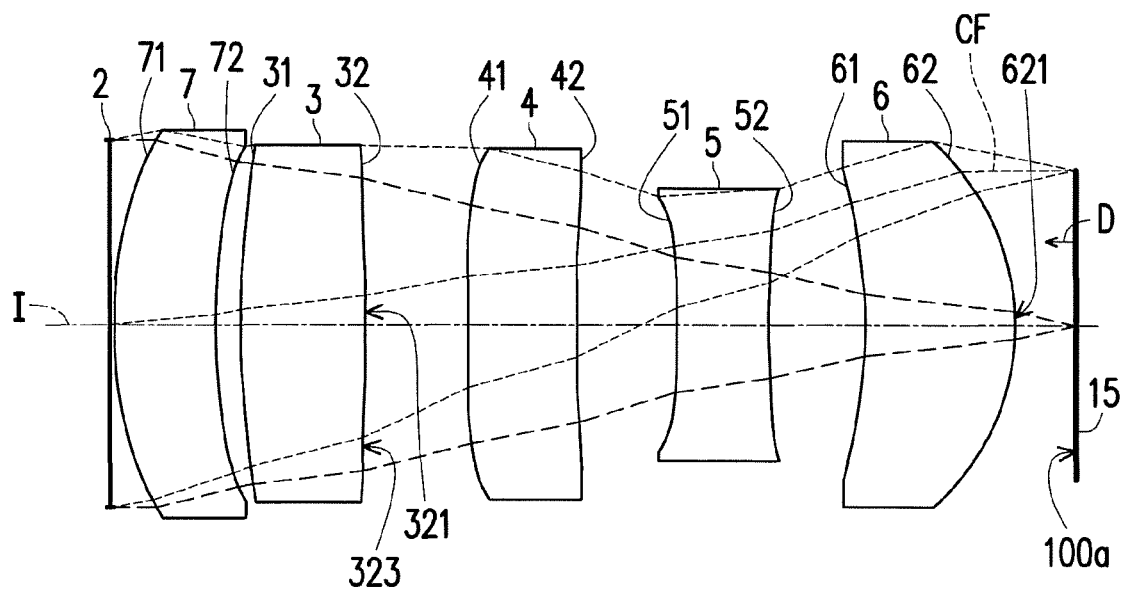
FIG. 67
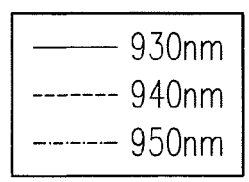
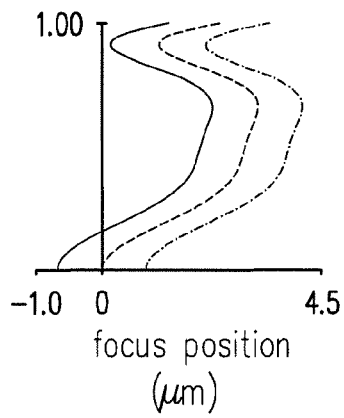
FIG. 68A
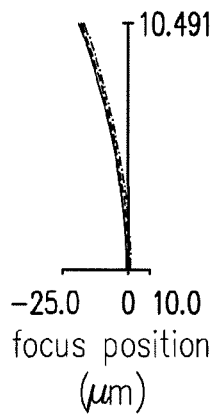
FIG. 68B
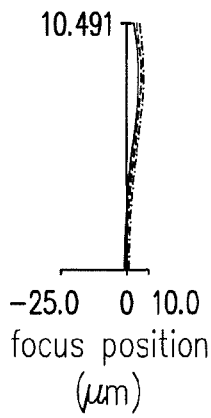
FIG. 68C
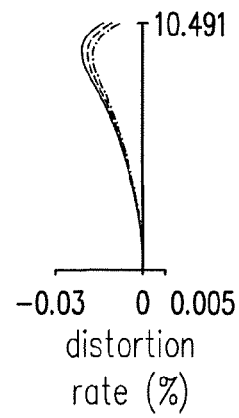
FIG. 68D

| Sixteenth embodiment | | | | | | |
|---|---|---|---|---|---|---|
| Effective Focal Length= 2.700 mm , Half Field of View= 10.491°, System length= 3.110 mm, Fno= 2.273, LCR= 0.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.490 | 0.330 | 1.851 | 40.104 | 4.101 |
| | Light input surface 72 | 2.379 | 0.080 | | | |
| First lens element 3 | Light output surface 31 | 2.668 | 0.402 | 1.642 | 22.409 | 3.555 |
| | Light input surface 32 | -11.894 | 0.331 | | | |
| Second lens element 4 | Light output surface 41 | 27.469 | 0.351 | 1.642 | 22.409 | -8.100 |
| | Light input surface 42 | 4.222 | 0.323 | | | |
| Third lens element 5 | Light output surface 51 | -26.380 | 0.300 | 1.642 | 22.409 | -6.172 |
| | Light input surface 52 | 4.491 | 0.311 | | | |
| Fourth lens element 6 | Light output surface 61 | -1.552 | 0.482 | 1.642 | 22.409 | 2.101 |
| | Light input surface 62 | -0.792 | 0.200 | | | |
| Structured light generating unit 15 | Light emitting surface 100a | Infinity | | | | |

FIG. 69

| Surface | K | $a_2$ | $a_4$ | $a_6$ | $a_8$ |
|---|---|---|---|---|---|
| 71 | 0.000000E+00 | 0.000000E+00 | 3.644982E-02 | 1.422057E-01 | 1.670680E-01 |
| 72 | 0.000000E+00 | 0.000000E+00 | -1.108833E-02 | 5.264686E-01 | 4.408496E-01 |
| 31 | -3.433189E+01 | 0.000000E+00 | 0.000000E+00 | 0.000000E+00 | 0.000000E+00 |
| 41 | 0.000000E+00 | 0.000000E+00 | 3.987991E-01 | 1.099023E-01 | 1.633135E+00 |
| 42 | 0.000000E+00 | 0.000000E+00 | -2.508653E-01 | -1.021686E+00 | 4.825551E+00 |
| 51 | 0.000000E+00 | 0.000000E+00 | -1.244664E+00 | -4.736590E+00 | 6.441493E+00 |
| 52 | 0.000000E+00 | 0.000000E+00 | 1.207860E-01 | -1.412392E+00 | 1.235231E+01 |
| 61 | 0.000000E+00 | 0.000000E+00 | 1.265042E-01 | -7.916912E-02 | 1.332657E+00 |
| 62 | 0.000000E+00 | 0.000000E+00 | 9.300627E-03 | -1.091420E-02 | 8.882009E-02 |
| Surface | $a_{10}$ | $a_{12}$ | $a_{14}$ | $a_{16}$ | |
| 71 | 2.803975E-01 | -2.523518E-01 | 5.007022E-01 | 0.000000E+00 | |
| 72 | -6.322855E-01 | 1.406711E+00 | 8.707296E+00 | -6.058373E+00 | |
| 31 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 70

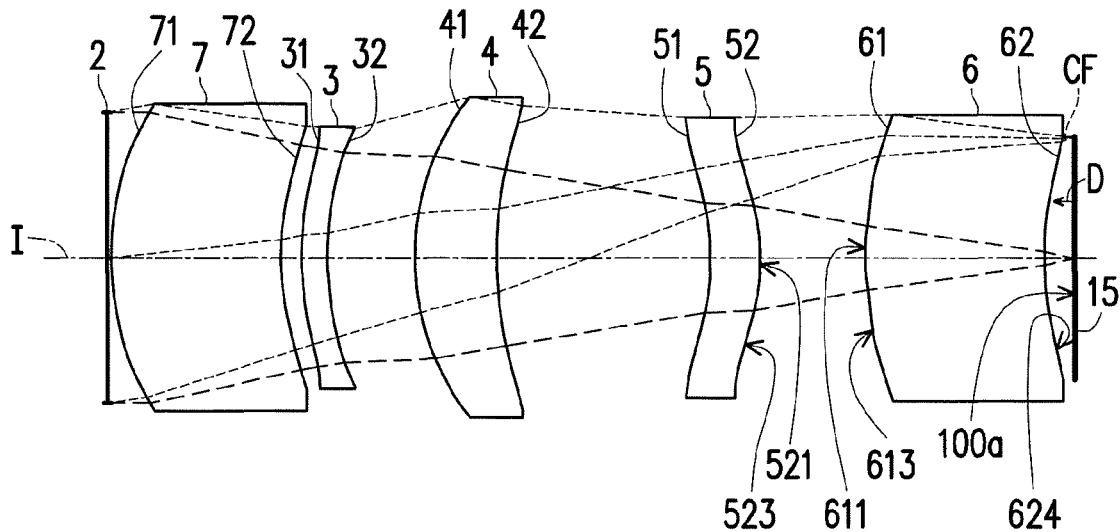
FIG. 71
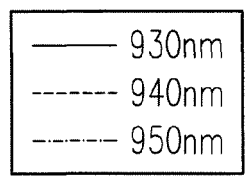
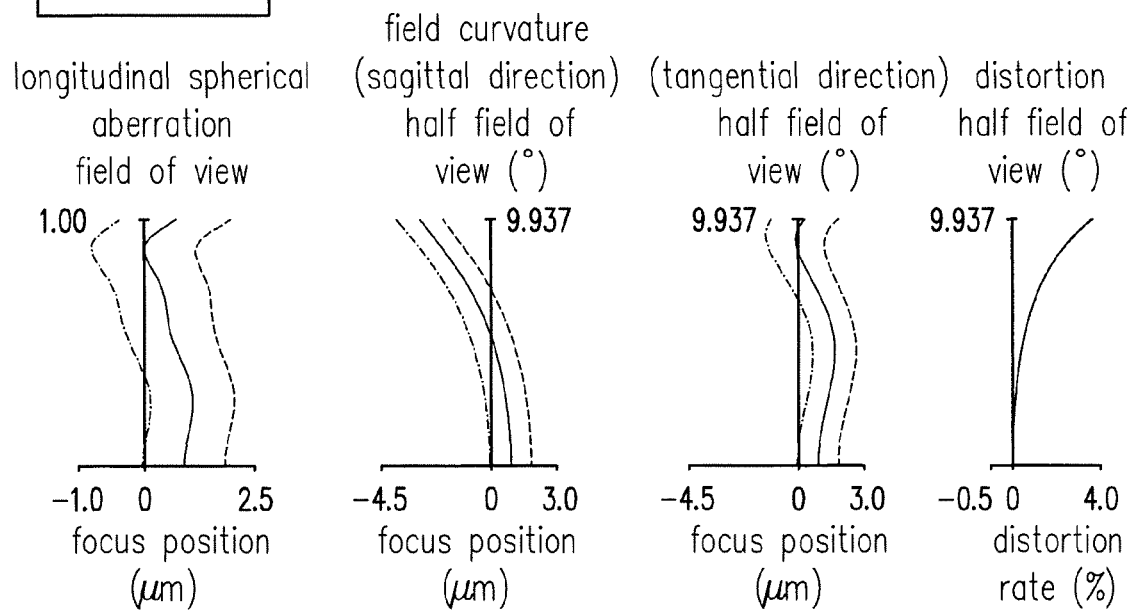
FIG. 72A    FIG. 72B    FIG. 72C    FIG. 72D

| Seventeenth embodiment | | | | | | |
|---|---|---|---|---|---|---|
| Effective Focal Length= 2.742 mm , Half Field of View= 9.937 °, System length= 3.978 mm, Fno= 2.273 ,LCR= 0.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop2 | | Infinity | 0.015 | | | |
| Fifth lens element 7 | Light output surface 71 | 1.313 | 0.700 | 1.642 | 22.409 | 18.690 |
| | Light input surface 72 | 1.179 | 0.084 | | | |
| First lens element 3 | Light output surface 31 | 1.203 | 0.108 | 1.851 | 40.104 | 9.923 |
| | Light input surface 32 | 1.352 | 0.361 | | | |
| Second lens element 4 | Light output surface 41 | 1.189 | 0.335 | 1.642 | 22.409 | 5.476 |
| | Light input surface 42 | 1.633 | 0.884 | | | |
| Third lens element 5 | Light output surface 51 | -0.974 | 0.206 | 1.545 | 55.987 | 7.163 |
| | Light input surface 52 | -0.834 | 0.436 | | | |
| Fourth lens element 6 | Light output surface 61 | 1.582 | 0.736 | 1.642 | 22.409 | -24.682 |
| | Light input surface 62 | 1.178 | 0.128 | | | |
| Structured light generating unit 15 | Light emitting surface 100a | Infinity | | | | |

FIG. 73

| Surface | K | $a_2$ | $a_4$ | $a_6$ | $a_8$ |
|---|---|---|---|---|---|
| 71 | 1.627951E-01 | 0.000000E+00 | 5.143597E-02 | 1.516738E-02 | 7.858999E-03 |
| 72 | -1.840885E+00 | 0.000000E+00 | -2.101065E-01 | 6.610323E-02 | 1.037978E-01 |
| 31 | -4.665676E+00 | 0.000000E+00 | -1.769470E-01 | -5.105413E-01 | -3.381629E-02 |
| 41 | 0.000000E+00 | 0.000000E+00 | 1.534393E-01 | 5.707875E-02 | -2.537789E-01 |
| 42 | 0.000000E+00 | 0.000000E+00 | -4.673596E-02 | -1.221580E-01 | -9.550852E-02 |
| 51 | 0.000000E+00 | 0.000000E+00 | 6.291052E-01 | 1.023029E+00 | -1.680518E+00 |
| 52 | 0.000000E+00 | 0.000000E+00 | 7.849783E-01 | 9.696981E-01 | -1.650415E-02 |
| 61 | 0.000000E+00 | 0.000000E+00 | -9.662956E-03 | -5.881474E-02 | -1.051497E-02 |
| 62 | 0.000000E+00 | 0.000000E+00 | -6.531705E-01 | 1.883001E-01 | 1.404725E-01 |
| Surface | $a_{10}$ | $a_{12}$ | $a_{14}$ | $a_{16}$ | |
| 71 | 3.269428E-01 | -4.837706E-01 | -2.572103E-01 | 9.227667E-01 | |
| 72 | -2.877604E-01 | -5.866629E-02 | -4.631767E+00 | 9.623542E+00 | |
| 31 | 6.228716E-02 | -6.924162E-01 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 74

| Condition | First embodiment | Second embodiment | Third embodiment | Fourth embodiment | Fifth embodiment | Sixth embodiment |
|---|---|---|---|---|---|---|
| EFL | 3.562 | 2.785 | 2.738 | 2.544 | 2.616 | 3.022 |
| T5 | | | | | | |
| G51 | | | | | | |
| T1 | 0.388 | 0.383 | 0.572 | 0.436 | 0.488 | 0.558 |
| G12 | 0.125 | 0.079 | 0.050 | 0.050 | 0.061 | 0.047 |
| T2 | 0.322 | 0.330 | 0.342 | 0.377 | 0.285 | 0.341 |
| G23 | 0.540 | 0.603 | 0.419 | 0.358 | 0.338 | 0.462 |
| T3 | 0.262 | 0.250 | 0.279 | 0.250 | 0.250 | 0.596 |
| G34 | 0.593 | 0.635 | 0.266 | 0.325 | 0.354 | 0.244 |
| T4 | 0.459 | 0.516 | 0.582 | 0.427 | 0.538 | 0.468 |
| BFL | 0.050 | 0.050 | 0.285 | 0.634 | 0.626 | 0.146 |
| ALT | 1.430 | 1.479 | 1.775 | 1.490 | 1.561 | 1.962 |
| AAG | 1.259 | 1.316 | 0.736 | 0.733 | 0.754 | 0.753 |
| TL | 2.688 | 2.795 | 2.510 | 2.223 | 2.315 | 2.715 |
| TTL | 2.738 | 2.845 | 2.796 | 2.857 | 2.940 | 2.861 |

FIG. 75

| Condition | First embodiment | Second embodiment | Third embodiment | Fourth embodiment | Fifth embodiment | Sixth embodiment |
|---|---|---|---|---|---|---|
| (n1+n2+n3+n4)-4 | 2.928 | 2.928 | 2.928 | 2.928 | 2.928 | 2.928 |
| V1+V2+V3+V4 | 86.6 | 86.6 | 86.6 | 86.6 | 86.6 | 86.6 |
| EFL/ALT | 2.491 | 1.884 | 1.543 | 1.707 | 1.676 | 1.540 |
| (G23+G34+T4)/(T2+T3) | 2.730 | 3.027 | 2.041 | 1.768 | 2.300 | 1.252 |
| (T1+G23+G34+T4)/(T2+T3) | 3.394 | 3.688 | 2.961 | 2.463 | 3.212 | 1.848 |
| (ImgH+T1)/(T3+T4) | 1.375 | 1.115 | 1.239 | 1.335 | 1.224 | 1.076 |
| (AAG+BFL)/(T2+T4) | 1.677 | 1.615 | 1.105 | 1.700 | 1.677 | 1.112 |
| ImgH/T2 | 1.874 | 1.429 | 1.452 | 1.237 | 1.671 | 1.722 |
| TTL/(T2+T3) | 4.695 | 4.911 | 4.501 | 4.553 | 5.496 | 3.054 |
| TL/ALT | 1.881 | 1.890 | 1.415 | 1.492 | 1.483 | 1.384 |
| (T1+G23)/(G12+G34) | 1.290 | 1.382 | 3.131 | 2.119 | 1.988 | 3.500 |
| (T1+G23)/T2 | 2.883 | 2.990 | 2.900 | 2.103 | 2.900 | 2.990 |
| (T1+G34)/(G12+T2) | 2.194 | 2.490 | 2.138 | 1.779 | 2.432 | 2.066 |
| (T1+G34)/T2 | 3.050 | 3.086 | 2.452 | 2.015 | 2.956 | 2.352 |
| (T1+T4)/(G12+T3) | 2.187 | 2.737 | 3.500 | 2.875 | 3.294 | 1.594 |
| (T1+T4)/T2 | 2.631 | 2.728 | 3.377 | 2.285 | 3.600 | 3.008 |
| (T1+T4)/T3 | 3.235 | 3.604 | 4.129 | 3.451 | 4.103 | 1.720 |
| (G34+T4)/(T1+G12) | 2.051 | 2.490 | 1.364 | 1.546 | 1.624 | 1.177 |
| (G34+T4)/T2 | 3.271 | 3.490 | 2.483 | 1.990 | 3.131 | 2.088 |

FIG. 76

| Condition | Seventh embod-iment | Eighth embod-iment | Ninth embod-iment | Tenth embod-iment | Eleventh embod-iment | Twelfth embod-iment |
|---|---|---|---|---|---|---|
| EFL | 2.696 | 2.883 | 3.930 | 2.825 | 2.672 | 2.899 |
| T5 | | | 0.315 | 0.644 | 0.164 | 0.332 |
| G51 | | | 0.133 | 0.048 | 0.030 | 0.120 |
| T1 | 0.472 | 0.639 | 0.281 | 0.107 | 0.487 | 0.442 |
| G12 | 0.101 | 0.073 | 0.283 | 0.360 | 0.099 | 0.217 |
| T2 | 0.361 | 0.414 | 0.337 | 0.333 | 0.337 | 0.335 |
| G23 | 0.361 | 0.398 | 0.348 | 0.881 | 0.287 | 0.310 |
| T3 | 0.300 | 0.250 | 0.167 | 0.205 | 0.269 | 0.283 |
| G34 | 0.400 | 0.329 | 0.428 | 0.436 | 0.305 | 0.314 |
| T4 | 0.502 | 0.485 | 0.472 | 0.731 | 0.725 | 0.490 |
| BFL | 0.200 | 0.451 | 0.184 | 0.134 | 0.111 | 0.269 |
| ALT | 1.635 | 1.789 | 1.573 | 2.021 | 1.981 | 1.883 |
| AAG | 0.862 | 0.800 | 1.192 | 1.725 | 0.721 | 0.961 |
| TL | 2.497 | 2.588 | 2.316 | 3.054 | 2.509 | 2.391 |
| TTL | 2.697 | 3.039 | 2.948 | 3.881 | 2.814 | 3.113 |

FIG. 77

| Condition | Seventh embodiment | Eighth embodiment | Ninth embodiment | Tenth embodiment | Eleventh embodiment | Twelfth embodiment |
|---|---|---|---|---|---|---|
| (n1+n2+n3+n4)-4 | 2.986 | 2.928 | 2.778 | 2.778 | 2.778 | 2.778 |
| V1+V2+V3+V4 | 80.4 | 86.6 | 107.3 | 107.3 | 107.3 | 107.3 |
| EFL/ALT | 1.649 | 1.612 | 2.499 | 1.398 | 1.349 | 1.540 |
| (G23+G34+T4)/(T2+T3) | 1.912 | 1.825 | 2.475 | 3.800 | 2.174 | 1.803 |
| (T1+G23+G34+T4)/(T2+T3) | 2.626 | 2.788 | 3.033 | 3.999 | 2.977 | 2.519 |
| (ImgH+T1)/(T3+T4) | 1.212 | 1.584 | 1.220 | 0.649 | 0.992 | 1.219 |
| (AAG+BFL)/(T2+T4) | 1.229 | 1.391 | 1.700 | 1.747 | 0.784 | 1.492 |
| ImgH/T2 | 1.384 | 1.268 | 1.485 | 1.499 | 1.486 | 1.493 |
| TTL/(T2+T3) | 4.081 | 4.577 | 5.847 | 7.200 | 4.645 | 5.037 |
| TL/ALT | 1.527 | 1.447 | 1.473 | 1.511 | 1.266 | 1.270 |
| (T1+G23)/(G12+G34) | 1.664 | 2.581 | 0.885 | 1.242 | 1.914 | 1.416 |
| (T1+G23)/T2 | 2.307 | 2.505 | 1.866 | 2.963 | 2.299 | 2.246 |
| (T1+G34)/(G12+T2) | 1.887 | 1.987 | 1.145 | 0.784 | 1.815 | 1.372 |
| (T1+G34)/T2 | 2.414 | 2.338 | 2.105 | 1.630 | 2.352 | 2.260 |
| (T1+T4)/(G12+T3) | 2.434 | 3.480 | 1.674 | 1.483 | 3.286 | 1.865 |
| (T1+T4)/T2 | 2.698 | 2.716 | 2.237 | 2.514 | 3.600 | 2.785 |
| (T1+T4)/T3 | 3.252 | 4.498 | 4.500 | 4.079 | 4.500 | 3.293 |
| (G34+T4)/(T1+G12) | 1.575 | 1.143 | 1.598 | 2.500 | 1.757 | 1.221 |
| (G34+T4)/T2 | 2.498 | 1.966 | 2.674 | 3.500 | 3.060 | 2.403 |

FIG. 78

| Condition | Thirteenth embodiment | Fourteenth embodiment | Fifteenth embodiment | Sixteenth embodiment | Seventeenth embodiment |
|---|---|---|---|---|---|
| EFL | 2.797 | 2.765 | 2.754 | 2.700 | 2.742 |
| T5 | 0.100 | 0.321 | 0.411 | 0.330 | 0.700 |
| G51 | 0.030 | 0.176 | 0.276 | 0.080 | 0.084 |
| T1 | 0.279 | 0.631 | 0.499 | 0.402 | 0.108 |
| G12 | 0.345 | 0.078 | 0.117 | 0.331 | 0.361 |
| T2 | 0.339 | 0.330 | 0.292 | 0.351 | 0.335 |
| G23 | 0.393 | 0.356 | 0.307 | 0.323 | 0.884 |
| T3 | 0.168 | 0.295 | 0.377 | 0.300 | 0.206 |
| G34 | 0.587 | 0.204 | 0.521 | 0.311 | 0.436 |
| T4 | 0.477 | 0.555 | 0.499 | 0.482 | 0.736 |
| BFL | 0.030 | 0.209 | 0.134 | 0.200 | 0.128 |
| ALT | 1.362 | 2.133 | 2.078 | 1.865 | 2.084 |
| AAG | 1.356 | 0.815 | 1.221 | 1.045 | 1.765 |
| TL | 2.588 | 2.450 | 2.612 | 2.500 | 3.065 |
| TTL | 2.748 | 3.157 | 3.433 | 3.110 | 3.978 |

FIG. 79

| Condition | Thirteenth embodiment | Fourteenth embodiment | Fifteenth embodiment | Sixteenth embodiment | Seventeenth embodiment |
|---|---|---|---|---|---|
| (n1+n2+n3+n4)-4 | 2.778 | 2.778 | 2.778 | 2.569 | 2.680 |
| V1+V2+V3+V4 | 107.3 | 107.3 | 107.3 | 89.6 | 140.9 |
| EFL/ALT | 2.053 | 1.296 | 1.325 | 1.447 | 1.315 |
| (G23+G34+T4)/(T2+T3) | 2.875 | 1.785 | 1.984 | 1.713 | 3.800 |
| (T1+G23+G34+T4)/(T2+T3) | 3.425 | 2.795 | 2.730 | 2.330 | 3.999 |
| (ImgH+T1)/(T3+T4) | 1.207 | 1.329 | 1.140 | 1.154 | 0.645 |
| (AAG+BFL)/(T2+T4) | 1.700 | 1.157 | 1.715 | 1.494 | 1.769 |
| ImgH/T2 | 1.477 | 1.517 | 1.715 | 1.423 | 1.494 |
| TTL/(T2+T3) | 5.422 | 5.051 | 5.133 | 4.774 | 7.353 |
| TL/ALT | 1.900 | 1.149 | 1.257 | 1.340 | 1.471 |
| (T1+G23)/(G12+G34) | 0.720 | 3.500 | 1.263 | 1.131 | 1.246 |
| (T1+G23)/T2 | 1.984 | 2.996 | 2.764 | 2.064 | 2.964 |
| (T1+G34)/(G12+T2) | 1.267 | 2.046 | 2.500 | 1.045 | 0.781 |
| (T1+G34)/T2 | 2.558 | 2.533 | 3.500 | 2.028 | 1.623 |
| (T1+T4)/(G12+T3) | 1.471 | 3.174 | 2.020 | 1.401 | 1.487 |

FIG. 80

OPTICAL LENS ASSEMBLY GENERATING A PLURALITY OF NEAR INFRARED LIGHT BEAMS WITH DIFFERENT ANGLES

CROSS-REFERENCE TO RELATED APPLICATION

This application claims the priority benefit of Chinese application serial no. 201711071718.X, filed on Nov. 3, 2017. The entirety of the above-mentioned patent application is hereby incorporated by reference herein and made a part of this specification.

BACKGROUND OF THE INVENTION

1. Field of the Invention

The invention provides an optical lens assembly.

2. Description of Related Art

As a critical part in portable electronic products with ever-changing specifications, an optical lens assembly shows diversified developments for not only capturing images or recording video, but also application for a three-dimensional (3D) sensing technology with advancement of technology.

In the existing 3D sensing technology, multiple near infrared light beam emitting units generate a plurality of light beams respectively by multiple collimating lenses to be projected to a front environment, so an image shown by near infrared light beams projected to the front environment can be captured by a camera to create a 3D surrounding space. More specifically, a light beam is generated from one near infrared light beam emitted by one near infrared light beam emitting unit passed through one corresponding collimating lens. In the existing 3D sensing technology, the design of the collimating lenses is used to detect a larger-range environment. However, a manufacturing process for the collimating lenses accompanied with the near infrared light beam emitting units has a high cost and a low yield rate. For instance, because each near infrared light beam emitting unit is extremely small, it is required to form the corresponding collimator lens by adopting a wafer level optical lens manufacturing process. In such manufacturing process, the yield rate cannot be high and yet the manufacturing cost is higher.

Therefore, designing a lens capable of cooperating with the near infrared light beam emitting units to generate light beams in different angles while satisfying specifications for small volume, high yield rate and thermal stability is an issue to be addressed by persons skilled in the art.

SUMMARY OF THE INVENTION

The invention is directed to an optical lens assembly for allowing a structured light generating unit having a plurality of light sources to generate a plurality of light beams in different angles through the optical lens assembly such that a cost of an transmitter lens in the 3D sensing technology may be substantially reduced to reduce the manufacturing bottleneck.

An embodiment of the invention provides an optical lens assembly for generating a plurality of light beams from a plurality of near infrared light beams emitted by a structured light generating unit having a plurality of light sources and passed through the optical lens assembly. A side facing the structured light generating unit having the light sources is a light input side, and another side opposite thereto is a light output side. The optical lens assembly comprising a first lens element, a second lens element, a third lens element and a fourth lens element arranged along an optical axis in a sequence from the light output side to the light input side. Each of the first lens element, the second lens element, the third lens element and the fourth lens element comprising a light output surface facing the light output side and a light input surface facing the light input side. The first lens element is arranged to be a lens element having refracting power in a fourth order from the light input side to the light output side. The second lens element is arranged to be a lens element having refracting power in a third order from the light input side to the light output side. The third lens element is arranged to be a lens element having refracting power in a second order from the light input side to the light output side. The fourth lens element is arranged to be a lens element having refracting power in a first order from the light input side to the light output side.

Based on the above, the optical lens assembly according to the embodiments of the invention can provide the following advantageous effects. With an arrangement of the lens elements having refracting power disposed between the light input side and the light output side for corresponding to the structured light generating unit having the light sources, the cost of the transmitter lens in the 3D sensing technology may be substantially reduced to reduce the manufacturing bottleneck.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a schematic view illustrating a surface structure of a lens element according to a first example.

FIG. 5 is a schematic view illustrating a surface structure of a lens element according to a second example.

FIG. 6 is a schematic view illustrating a surface structure of a lens element according to a third example.

FIG. 7 is a schematic view illustrating an optical lens assembly according to a first embodiment of the invention.

FIG. 8A to FIG. 8D are graphs showing a longitudinal spherical aberration and other aberrations of the optical lens assembly according to the first embodiment.

FIG. 9 shows detailed optical data of the optical lens assembly according to the first embodiment of the invention.

FIG. 10 shows aspheric parameters of the optical lens assembly according to the first embodiment of the invention.

FIG. 13 shows detailed optical data of the optical lens assembly according to the second embodiment of the invention.

FIG. 14 shows aspheric parameters of the optical lens assembly according to the second embodiment of the invention.

FIG. 15 is a schematic view illustrating an optical lens assembly according to a third embodiment of the invention.

FIG. 16A to FIG. 16D are graphs showing a longitudinal spherical aberration and other aberrations of the optical lens assembly according to the third embodiment.

FIG. 17 shows detailed optical data of the optical lens assembly according to the third embodiment of the invention.

FIG. 18 shows aspheric parameters of the optical lens assembly according to the third embodiment of the invention.

FIG. 19 is a schematic view illustrating an optical lens assembly according to a fourth embodiment of the invention.

FIG. 20A to FIG. 20D are graphs showing a longitudinal spherical aberration and other aberrations of the optical lens assembly according to the fourth embodiment.

FIG. 21 shows detailed optical data of the optical lens assembly according to the fourth embodiment of the invention.

FIG. 22 shows aspheric parameters of the optical lens assembly according to the fourth embodiment of the invention.

FIG. 25 shows detailed optical data of the optical lens assembly according to the fifth embodiment of the invention.

FIG. 26 shows aspheric parameters of the optical lens assembly according to the fifth embodiment of the invention.

FIG. 27 is a schematic view illustrating an optical lens assembly according to a sixth embodiment of the invention.

FIG. 28A to FIG. 28D are graphs showing a longitudinal spherical aberration and other aberrations of the optical lens assembly according to the sixth embodiment.

FIG. 29 shows detailed optical data of the optical lens assembly according to the sixth embodiment of the invention.

FIG. 30 shows aspheric parameters of the optical lens assembly according to the sixth embodiment of the invention.

FIG. 33 shows detailed optical data of the optical lens assembly according to the seventh embodiment of the invention.

FIG. 34 shows aspheric parameters of the optical lens assembly according to the seventh embodiment of the invention.

FIG. 35 is a schematic view illustrating an optical lens assembly according to an eighth embodiment of the invention.

FIG. 36A to FIG. 36D are graphs showing a longitudinal spherical aberration and other aberrations of the optical lens assembly according to the eighth embodiment.

FIG. 37 shows detailed optical data of the optical lens assembly according to the eighth embodiment of the invention.

FIG. 38 shows aspheric parameters of the optical lens assembly according to the eighth embodiment of the invention.

FIG. 39 is a schematic view illustrating an optical lens assembly according to a ninth embodiment of the invention.

FIG. 40A to FIG. 40D are graphs showing a longitudinal spherical aberration and other aberrations of the optical lens assembly according to the ninth embodiment.

FIG. 41 shows detailed optical data of the optical lens assembly according to the ninth embodiment of the invention.

FIG. 42 shows aspheric parameters of the optical lens assembly according to the ninth embodiment of the invention.

FIG. 43 is a schematic view illustrating an optical lens assembly according to a tenth embodiment of the invention.

FIG. 44A to FIG. 44D are graphs showing a longitudinal spherical aberration and other aberrations of the optical lens assembly according to the tenth embodiment.

FIG. 45 shows detailed optical data of the optical lens assembly according to the tenth embodiment of the invention.

FIG. 46 shows aspheric parameters of the optical lens assembly according to the tenth embodiment of the invention.

FIG. 47 is a schematic view illustrating an optical lens assembly according to an eleventh embodiment of the invention.

FIG. 48A to FIG. 48D are graphs showing a longitudinal spherical aberration and other aberrations of the optical lens assembly according to the eleventh embodiment.

FIG. 49 shows detailed optical data of the optical lens assembly according to the eleventh embodiment of the invention.

FIG. 50 shows aspheric parameters of the optical lens assembly according to the eleventh embodiment of the invention.

FIG. 51 is a schematic view illustrating an optical lens assembly according to a twelfth embodiment of the invention.

FIG. 52A to FIG. 52D are graphs showing a longitudinal spherical aberration and other aberrations of the optical lens assembly according to the twelfth embodiment.

FIG. 53 shows detailed optical data of the optical lens assembly according to the twelfth embodiment of the invention.

FIG. 54 shows aspheric parameters of the optical lens assembly according to the twelfth embodiment of the invention.

FIG. 55 is a schematic view illustrating an optical lens assembly according to a thirteenth embodiment of the invention.

FIG. 56A to FIG. 56D are graphs showing a longitudinal spherical aberration and other aberrations of the optical lens assembly according to the thirteenth embodiment.

FIG. 57 shows detailed optical data of the optical lens assembly according to the thirteenth embodiment of the invention.

FIG. 58 shows aspheric parameters of the optical lens assembly according to the thirteenth embodiment of the invention.

FIG. 61 shows detailed optical data of the optical lens assembly according to the fourteenth embodiment of the invention, FIG. 62 shows aspheric parameters of the optical lens assembly according to the fourteenth embodiment of the invention.

FIG. 63 is a schematic view illustrating an optical lens assembly according to a fifteenth embodiment of the invention.

FIG. 64A to FIG. 64D are graphs showing a longitudinal spherical aberration and other aberrations of the optical lens assembly according to the fifteenth embodiment.

FIG. 65 shows detailed optical data of the optical lens assembly according to the fifteenth embodiment of the invention.

FIG. 66 shows aspheric parameters of the optical lens assembly according to the fifteenth embodiment of the invention.

FIG. 67 is a schematic view illustrating an optical lens assembly according to a sixteenth embodiment of the invention.

FIG. 68A to FIG. 68D are graphs showing a longitudinal spherical aberration and other aberrations of the optical lens assembly according to the sixteenth embodiment.

FIG. 69 shows detailed optical data of the optical lens assembly according to the sixteenth embodiment of the invention.

FIG. 70 shows aspheric parameters of the optical lens assembly according to the sixteenth embodiment of the invention.

FIG. 71 is a schematic view illustrating an optical lens assembly according to a seventeenth embodiment of the invention.

FIG. 72A to FIG. 72D are graphs showing a longitudinal spherical aberration and other aberrations of the optical lens assembly according to the seventeenth embodiment.

FIG. 73 shows detailed optical data of the optical lens assembly according to the seventeenth embodiment of the invention.

FIG. 74 shows aspheric parameters of the optical lens assembly according to the seventeenth embodiment of the invention.

FIG. 75 and FIG. 76 show important parameters and values in related relational expressions of the optical lens assembly according to the first to the sixth embodiments of the invention.

FIG. 77 and FIG. 78 show important parameters and values in related relational expressions of the optical lens assembly according to the seventh to the twelfth embodiments of the invention.

FIG. 79 and FIG. 80 show important parameters and values in related relational expressions of the optical lens assembly according to the thirteenth to the seventeenth embodiments of the invention.

DESCRIPTION OF THE EMBODIMENTS

Figure 1A:
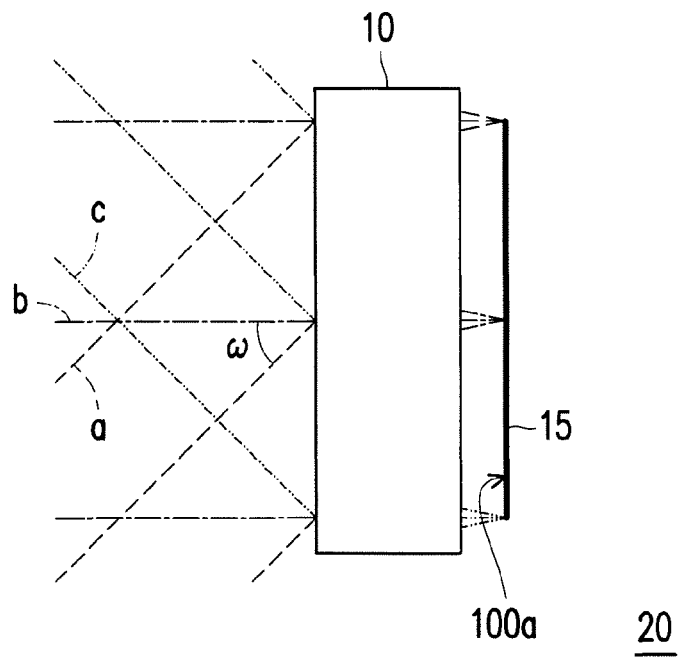
FIG. 1A is a schematic diagram illustrating an optical lens assembly of the invention applied as a 3D sensing transmitter lens.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
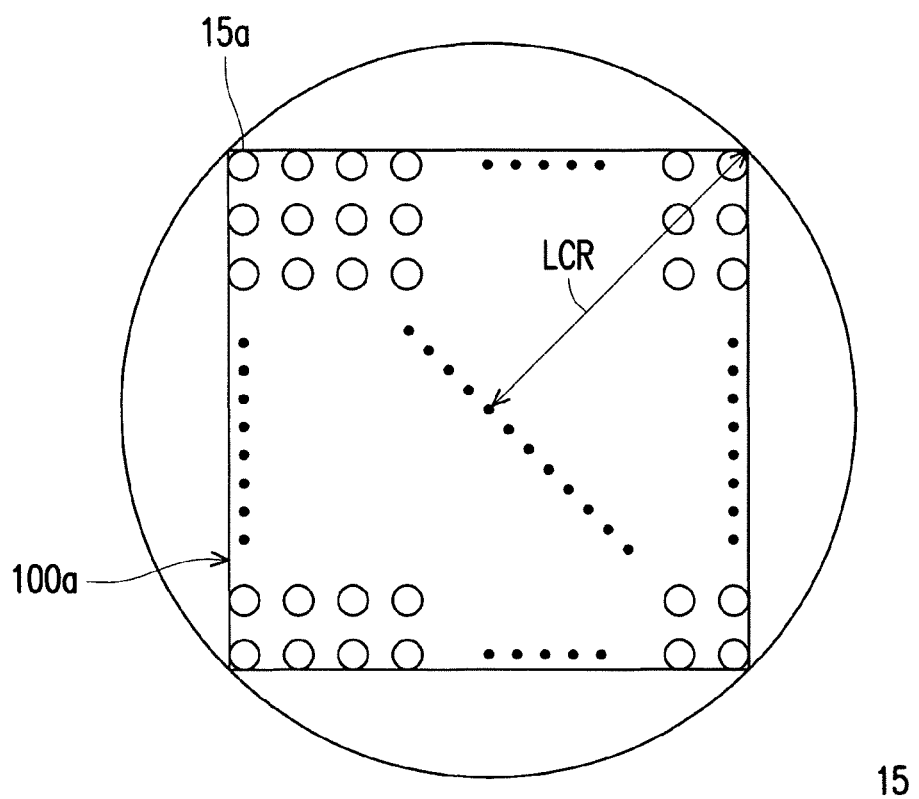
FIG. 1B is a front view of an embodiment of a structured light generating unit having a plurality of light sources in FIG. 1A.

Referring to FIG. 1A in which ray directions of a three-dimensional (3D) sensing transmitter lens 20 are illustrated, a plurality of near infrared light beams are emitted by a structured light generating unit 15 having a plurality of light sources, and then pass through an optical lens assembly 10 according to embodiments of the invention to generate a plurality of light beams a, b and c, which are used to detect an environment in front of the lens. Here, types of the light beam a, b and c are not particularly limited. Travelling directions of the light beams are illustrated by dotted lines. Also, the number of the light beams a, b and c are not limited to be exactly three but may be other numbers not equal to three and one. In FIG. 1A, the light beams a, b and c are illustrated as an example. Referring to FIG. 1B, in an embodiment, the structured light generating unit 15 having the light sources includes a plurality of near infrared light beam light sources 15a arranged in an array. In other embodiments, the near infrared light beam light sources 15a may also be arranged in a ring arrangement or other arrangements, which are not particularly limited in the invention. The near infrared light beam light sources 15a may be infrared laser light sources. Light emitting surfaces of the near infrared light beam light sources 15a form a light emitting surface 100a of the structured light generating unit 15 having the light sources.

The following criteria for determining optical specifications in the embodiments of the invention is based on an assumption that a reverse tracking of the ray direction is a parallel imaging ray passing through the optical lens assembly 10 from a light output side and focus on the light emitting surface 100a of the structured light generating unit 15 having the light sources for imaging.

In the present specification, the description "a lens element having positive refracting power (or negative refracting power)" means that the paraxial refracting power of the lens element in Gaussian optics is positive (or negative). The description "A light input surface (or light output surface) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 2:
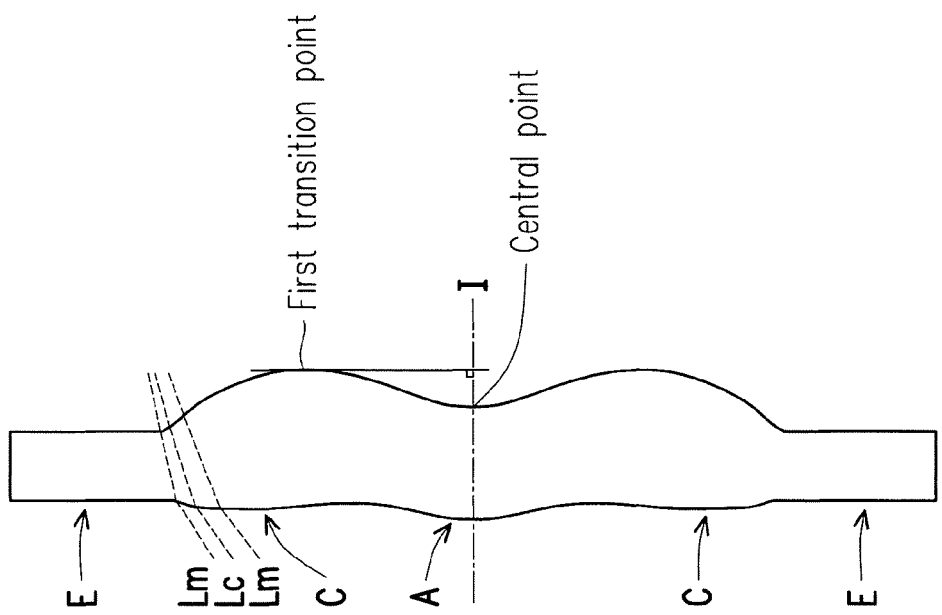
FIG. 2 is a schematic view illustrating a surface structure of a lens element.

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 3:
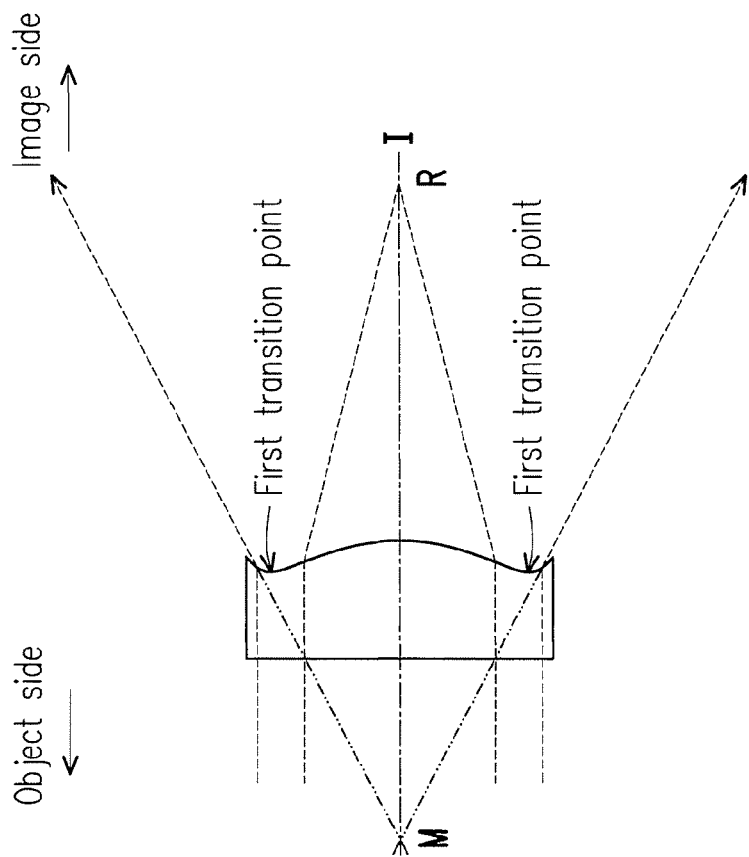
FIG. 3 is a schematic view illustrating a concave and convex surface structure of a lens element and a ray focal point.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at a light input side or a light output side. For instance, if the ray itself intersects the optical axis at the light input side of the lens element after passing through a portion, i.e. the focal point of this ray is at the light input side (see point R in FIG. 3), the portion will be determined as having a convex shape. On the contrary, if the ray diverges after passing through a portion, the extension line of the ray intersects the optical axis at the light output side of the lens element, i.e. the focal point of the ray is at the light output side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For the light output surface, positive R means that the object-side surface is convex, and negative R means that the light output surface is concave. Conversely, for the light input surface, positive R means that the light input surface is concave, and negative R means that the light input surface is convex. The result found by using this method should be consistent as by using the other way mentioned above, which determines surface shapes by referring to whether the focal point of a collimated ray is at the light output side or the light input side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the light input surface of the lens element. Portion I is a portion in a vicinity of the optical axis, and portion II is a portion in a vicinity of a periphery of the lens element. The portion in a vicinity of the optical axis is determined as having a concave surface due to the R value at the light input surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the light output surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the light output surface of the lens element is positive. The portion in a vicinity of a periphery of the lens element (portion III) has a convex shape. What is more, there is another portion having a concave shape existing between the first and second transition point (portion II).

Referring to a third example depicted in FIG. 6, no transition point exists on the light output surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the light output surface of the lens element is determined as having a convex shape due to its positive R value, and the portion in a vicinity of a periphery of the lens element is determined as having a convex shape as well.

FIG. 7 is a schematic view illustrating an optical lens assembly according to a first embodiment of the invention, and FIG. 8A to FIG. 8D are graphs showing a longitudinal spherical aberration and other aberrations of the optical lens assembly according to the first embodiment. With reference to FIG. 7, in the optical lens assembly 10 according to the first embodiment of the invention, an aperture stop 2, a first lens element 3, a second lens element 4, a third lens element 5 and a fourth lens element 6 are arranged in a sequence from the light output side to the light input side along an optical axis I of the optical lens assembly 10. When being emitted by the light emitting surface 100a of the structured light generating unit 15 having the light sources, a plurality of near infrared light beams enter the optical lens assembly 10 and sequentially pass through the fourth lens element 6, the third lens element 5, the second lens element 4, the first lens element 3 and the aperture stop 2 to generate a plurality of light beams to be outputted from the optical lens assembly 10. It is added that, a side facing the structured light generating unit 15 having the light sources is the light input side, and another side opposite thereto is the light output side.

Further, in order to maintain a certain optical quality in a thermal environment for the optical lens assembly 10 according to the embodiments of the invention, the impact on output light beams caused by temperature may be reduced by setting the first lens element 3 having refracting power closest to the aperture stop 2 to be made of a glass with a refractive index greater than 1.8. The second lens element 4 to the fourth lens element 6 are made of a plastic material, but materials of the first lens element 3 to the fourth lens element 7 are not limited thereto.

In the present embodiment, each of the first lens element 3, the second lens element 4, the third lens element 5 and the fourth lens element 6 of the optical lens assembly 10 has a light output surface 31, 41, 51, 61 facing the light output side for allowing the near infrared light beams to pass through, and a light input surface 32, 42, 52, 62 facing the light input side for allowing the near infrared light beams to pass through.

The first lens element 3 is arranged to be a lens element having refracting power in a fourth order from the light input side to the light output side. The first lens element 3 has positive refracting power. The light output surface 31 of the first lens element 3 has a convex portion 331 in a vicinity of the optical axis I and a convex portion 313 in a vicinity of a periphery of the first lens element 3. The light input surface 32 of the first lens element 3 has a concave portion 322 in a vicinity of the optical axis I and a concave portion 324 in a vicinity of a periphery of the first lens element 3. The light output surface 31 and the light input surface 32 of the first lens element 3 are aspheric surfaces.

The second lens element 4 is arranged to be a lens element having refracting power in a third order from the light input side to the light output side. The second lens element has negative refracting power. The light output surface 41 of the second lens element 4 has a convex portion 411 in a vicinity of the optical axis I and a convex portion 413 in a vicinity of a periphery of the second lens element 4. The light input surface 42 of the second lens element 4 has a concave portion 422 in a vicinity of the optical axis I and a concave portion 424 in a vicinity of a periphery of the second lens element 4. The light output surface 41 and the light input surface 42 of the second lens element 4 are aspheric surfaces.

The third lens element 5 is arranged to be a lens element having refracting power in a second order from the light input side to the light output side. The third lens element 5 has negative refracting power. The light output surface 51 of the third lens element 5 has a concave portion 512 in a vicinity of the optical axis I and a concave portion 514 in a vicinity of a periphery of the third lens element 5. The light input surface 52 of the third lens element 5 has a concave portion 522 in a vicinity of the optical axis I and a concave portion 524 in a vicinity of a periphery of the third lens element 5. The light output surface 51 and the light input surface 52 of the third lens element 5 are aspheric surfaces.

The fourth lens element 6 is arranged to be a lens element having refracting power in a first order from the light input side to the light output side. The fourth lens element 6 has positive refracting power. The light output surface 61 of the fourth lens element 6 has a concave portion 612 in a vicinity of the optical axis I and a concave portion 614 in a vicinity of a periphery of the fourth lens element 6. The light input surface 62 of the fourth lens element 6 has a convex portion 621 in a vicinity of the optical axis I and a convex portion 623 in a vicinity of a periphery of the fourth lens element 6. The light output surface 61 and the light input surface 62 of the fourth lens element 6 are aspheric surfaces.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the first embodiment are shown in FIG. 9, in which the optical lens assembly 10 of the first embodiment has an overall effective focal length (EFL) being 3.562 millimeter (mm), a half field of view (HFOV) being 9.905°, an f-number (Fno) being 2.273, a system length being 2.738 mm and a light circle radius being 0.603 mm. Here, the system length refers to a distance from the light input surface 31 of the first lens element 3 to the light emitting surface 100a along the optical axis I. The so-called "Fno" in the present disclosure refers to an f-number obtained by calculation according to the reversibility principle of light with the aperture stop 2 regarded as an entrance pupil.

Further, in the present embodiment, all of the light output surfaces 31, 41, 51 and 61 and the light input surfaces 32, 42, 52 and 62 of the first lens element 3, the second lens element 4, the third lens element 5 and the fourth lens element 6 (8 surfaces in total) are aspheric surfaces. The light output surfaces 31, 41, 51 and 61 and the light input surfaces 32, 42, 52 and 62 are common even asphere surfaces. These aspheric surfaces are defined by the following formula.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Therein,
Y: a distance from a point on an aspheric curve to the optical axis I;
Z: a depth of the aspheric surface (a perpendicular distance between the point on the aspheric surface that is spaced from the optical axis I by the distance Y and a tangent plane tangent to a vertex of the aspheric surface on the optical axis I);
R: a radius of curvature of the surface of the lens element close to the optical axis I;
K: a conic constant;
$a_i$: an $i^{th}$ aspheric coefficient;
The aspheric coefficients of the light output surface 31 of the first lens element 3 to the light input surface 62 of the fourth lens element 6 in Formula (1) are shown in FIG. 10. In FIG. 10, a field number "31" indicates that the respective row includes the aspheric coefficients of the light output surface 31 of the first lens element 3, and the same applies to the rest of fields.

In addition, relationship among the important parameters in the optical lens assembly 10 of the first embodiment is shown in FIG. 75 and FIG. 76, where the unit for each parameter in FIG. 75 is millimeter (mm).

Therein,

T1 is a thickness of the first lens element 3 along the optical axis I;

T2 is a thickness of the second lens element 4 along the optical axis I;

T3 is a thickness of the third lens element 5 along the optical axis I;

T4 is a thickness of the fourth lens element 6 along the optical axis I;

G12 is an air gap from the first lens element 3 to the second lens element 4 along the optical axis I;

G23 is an air gap from the second lens element 4 to the third lens element 5 along the optical axis I;

G34 is an air gap from the third lens element 5 to the fourth lens element 6 along the optical axis I;

AAG is a sum of air gaps among all of the lens elements having refracting power of the optical lens assembly 10 along the optical axis I;

ALT is a sum of thicknesses of all of the lens elements having refracting power of the optical lens assembly 10 along the optical axis I;

TL is a distance from the light output surface 31 of the first lens element 3 to the light input surface 62 of the fourth lens element 6 along the optical axis I;

TTL is a distance from the light output surface of a lens element being a first piece having refracting power counted from the light output side to the structured light generating having the light sources unit along the optical axis I;

BFL is a distance from the light input surface 62 of the fourth lens element 6 to the structured light generating unit having the light sources along the optical axis I;

HFOV is a half field of view (marked by ω, as shown in FIG. 1A) which is a maximum half light output angle of the optical lens assembly 10;

Fno is the f-number, which refers to an f-number obtained by calculating an effective aperture of the light beams emitted by the optical lens assembly 10 according to the reversibility principle of light, namely, the f-number obtained by calculation according to the reversibility principle of light with the aperture stop 2 regarded as the entrance pupil in the embodiments of the invention;

LCR refers to a light circle radius (marked by LCR, as shown in FIG. 1B), which is a radius of a smallest circumcircle of the light emitting surface 100a of the structured light generating unit 15 having the light sources; and EFL is the effective focal length of the optical lens assembly 10.

Besides, it is further defined that:

f1 is a focal length of the first lens element 3;
f2 is a focal length of the second lens element 4;
f3 is a focal length of the third lens element 5;
f4 is a focal length of the fourth lens element 6;
n1 is a refractive index of the first lens element 3;
n2 is a refractive index of the second lens element 4;
n3 is a refractive index of the third lens element 5;
n4 is a refractive index of the fourth lens element 6;
V1 is an Abbe number of the first lens element 3;
V2 is an Abbe number of the second lens element 4;
V3 is an Abbe number of the third lens element 5; and
V4 is an Abbe number of the fourth lens element 6.

With reference to FIG. 8A and FIG. 8B, the graph of FIG. 8A illustrates a longitudinal spherical aberration of the light emitting surface 100a when the pupil radius is 0.7836 mm and wavelengths are 930 nm, 940 nm and 950 nm in the first embodiment. The graphs of FIG. 8B and FIG. 8C respectively illustrate a field curvature aberration in a sagittal direction and a field curvature aberration in a tangential direction on the lights emitting surface 100a when wavelengths are 930 nm, 940 nm and 950 nm in the first embodiment. The graph of FIG. 8D illustrates a distortion aberration on the light emitting surface 100a when wavelengths are 930 nm, 940 nm and 950 nm in the first embodiment. In the graph of FIG. 8A which illustrates the longitudinal spherical aberration in the first embodiment, the curve of each wavelength is close to one another and approaches the center position, which indicates that the off-axis ray of each wavelength at different heights is focused around the imaging point. The skew margin of the curve of each wavelength indicates that the imaging point deviation of the off-axis ray at different heights is controlled within a range of ±10 μm. Hence, it is evident that the spherical aberration of the same wavelength can be significantly improved according to the first embodiment. In addition, the curves of the three representative wavelengths are close to one another, which indicate that the imaging positions of the rays with different wavelengths are rather focused; therefore, the chromatic aberration can be significantly improved as well.

In the two graphs of the field curvature aberrations of FIG. 8B and FIG. 8C, the focal length variation of the three representative wavelengths in the entire field of view falls within a range of ±10 μm, and indicates that aberration of the optical lens assembly provided by the first embodiment can be effectively eliminated. In FIG. 8D, the graph of distortion aberration shows that the distortion aberration in the first embodiment is maintained within a range of ±3.5%, which indicates that the distortion aberration in the first embodiment can comply with the imaging quality requirement of the optical lens assembly. Accordingly, compared to the existing optical lenses, with the system length shortened to approximately 2.738 mm, the first embodiment can still provide a favorable imaging quality. As a result, according to the first embodiment, the length of the optical lens assembly can be shortened without sacrificing the favorable optical properties.

Figure 11:
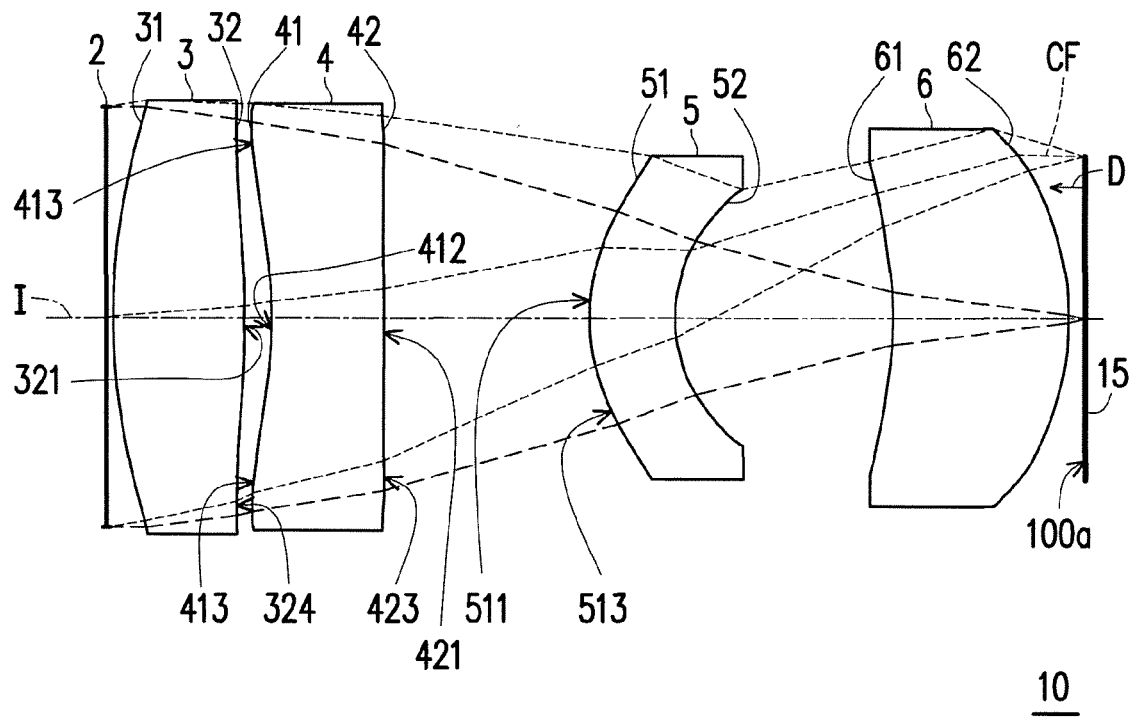
FIG. 11 is a schematic view illustrating an optical lens assembly according to a second embodiment of the invention.

FIG. 11 is a schematic view illustrating an optical lens assembly according to a second embodiment of the invention, and FIG. 12A to FIG. 12D are graphs showing a longitudinal spherical aberration and other aberrations of the optical lens assembly according to the second embodiment. With reference to FIG. 11, the second embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. In addition, the light input surface 32 of the first lens element 3 has a convex portion 321 in a vicinity of the optical axis. The light output surface 41 of the second lens element 4 has a concave portion 412 in a vicinity of the optical axis I. The light input surface 42 of the second lens element 4 has a convex portion 421 in a vicinity of the optical axis I and a convex portion 423 in a vicinity of a periphery of the second lens element 4. The light output surface 51 of the third lens element 5 has a convex portion 511 in a vicinity of the optical axis I and a convex portion 513 in a vicinity of a periphery of the third lens element 5. Further, an included angle between an emission direction of a chief ray CF of the near infrared light beams emitted from the light emitting surface 100a of the structured light generating unit 15 having the light sources and a normal direction D of the light emitting surface 100a is less than 5°. It should be noted that, in order to show the view clearly, the reference numbers of the concave portions and the convex portions identical to those in the first embodiment are omitted in FIG. 11.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the second embodiment of the optical lens assembly 10 are shown in FIG. 13, in which the optical lens assembly 10 of the second embodiment has an overall effective focal length (EFL) being 2.785 millimeter (mm), a half field of view (HFOV) being 9.906°, an f-number (Fno) being 2.273, a system length being 2.845 mm and a light circle radius being 0.471 mm.

FIG. 14 shows the aspheric coefficients of the light output surface 31 of the first lens element 3 to the light input surface 62 of the fourth lens element 6 in Formula (1) according to the second embodiment.

In addition, the relationship among the important parameters in the optical lens assembly 10 of the second embodiment is shown in FIG. 75 and FIG. 76.

Figures 12A, 12B, 12C, 12D:
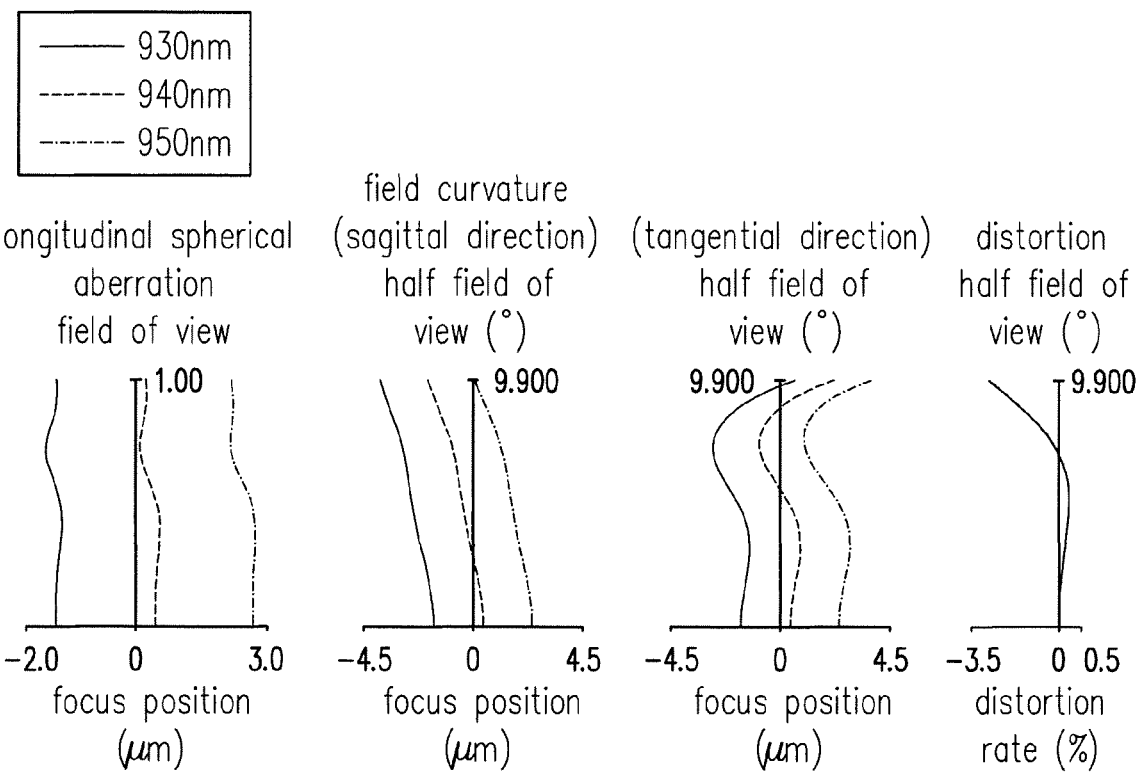
FIG. 12A to FIG. 12D are graphs showing a longitudinal spherical aberration and other aberrations of the optical lens assembly according to the second embodiment.

In the graph of FIG. 12A which illustrates the longitudinal spherical aberration when the pupil radius is 0.6128 mm according to the second embodiment, the imaging point deviation of the off-axis ray at different heights is controlled within a range of ±2.8 μm. In the two graphs of the field curvature aberrations of FIG. 12B and FIG. 12C, the focal length variation of the three representative wavelengths in the entire field of view falls within a range of ±4.5 μm. In FIG. 12D, the graph of distortion aberration shows that the distortion aberration in the second embodiment is maintained within a range of ±3.5%.

In view of the above description, it can be known that the half field of view of the second embodiment is greater than the half field of view of the first embodiment. The longitudinal spherical aberration of the second embodiment is less than the longitudinal spherical aberration of the first embodiment. The field curvature of the second embodiment is less than the field curvature of the first embodiment.

FIG. 15 is a schematic view illustrating an optical lens assembly according to a third embodiment of the invention, and FIG. 16A to FIG. 16D are graphs showing a longitudinal spherical aberration and other aberrations of the optical lens assembly according to the third embodiment. With reference to FIG. 15, the third embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. In addition, the light input surface 52 of the third lens element 5 has a convex portion 521 in a vicinity of the optical axis I. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the first embodiment are omitted in FIG. 15.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the third embodiment of the optical lens assembly 10 are shown in FIG. 17, in which the optical lens assembly 10 of the third embodiment has an overall effective focal length (EFL) being 2.738 millimeter (mm), a half field of view (HFOV) being 9.900°, an f-number (Fno) being 2.273, a system length being 2.796 mm and a light circle radius being 0.496 mm.

FIG. 18 shows the aspheric coefficients of the light output surface 31 of the first lens element 3 to the light input surface 62 of the fourth lens element 6 in Formula (1) according to the third embodiment.

In addition, the relationship among the important parameters in the optical lens assembly 10 of the third embodiment is shown in FIG. 75 and FIG. 76.

In the graph of FIG. 16A which illustrates the longitudinal spherical aberration when the pupil radius is 0.6023 mm according to the third embodiment, the imaging point deviation of the off-axis ray at different heights is controlled within a range of ±3.0 μm. In the two graphs of the field curvature aberrations of FIG. 16B and FIG. 16C, the focal length variation of the three representative wavelengths in the entire field of view falls within a range of ±4.5 μm. In FIG. 16D, the graph of distortion aberration shows that the distortion aberration in the third embodiment is maintained within a range of ±3.9%.

In view of the above description, it can be known that the longitudinal spherical aberration of the third embodiment is less than the longitudinal spherical aberration of the first embodiment. The field curvature of the third embodiment is less than the field curvature of the first embodiment.

FIG. 19 is a schematic view illustrating an optical lens assembly according to a fourth embodiment of the invention, and FIG. 20A to FIG. 20D are graphs showing a longitudinal spherical aberration and other aberrations of the optical lens assembly according to the fourth embodiment. With reference to FIG. 19, the fourth embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. In addition, the light input surface 52 of the third lens element 5 has a convex portion 521 in a vicinity of the optical axis I and a convex portion 523 in a vicinity of a periphery of the third lens element 5. It should be noted that, in order to show the view clearly, the reference numbers of the concave portions and the convex portions identical to those in the first embodiment are omitted in FIG. 19.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the fourth embodiment of the optical lens assembly 10 are shown in FIG. 21, in which the optical lens assembly 10 of the fourth embodiment has an overall effective focal length (EFL) being 2.544 millimeter (mm), a half field of view (HFOV) being 9.900°, an f-number (Fno) being 2.273, a system length being 2.857 mm and a light circle radius being 0.467 mm.

FIG. 22 shows the aspheric coefficients of the light output surface 31 of the first lens element 3 to the light input surface 62 of the fourth lens element 6 in Formula (1) according to the fourth embodiment.

In addition, the relationship among the important parameters in the optical lens assembly 10 of the fourth embodiment is shown in FIG. 75 and FIG. 76.

In the graph of FIG. 20A which illustrates the longitudinal spherical aberration when the pupil radius is 0.5596 mm according to the fourth embodiment, the imaging point deviation of the off-axis ray at different heights is controlled within a range of ±3.0 μm. In the two graphs of the field curvature aberrations of FIG. 20B and FIG. 20C, the focal length variation of the three representative wavelengths in the entire field of view falls within a range of ±3.5 μm. In FIG. 20D, the graph of distortion aberration shows that the distortion aberration in the fourth embodiment is maintained within a range of ±5%.

In view of the above description, it can be known that the longitudinal spherical aberration of the fourth embodiment is less than the longitudinal spherical aberration of the first embodiment. The field curvature of the fourth embodiment is less than the field curvature of the first embodiment.

Figure 23:
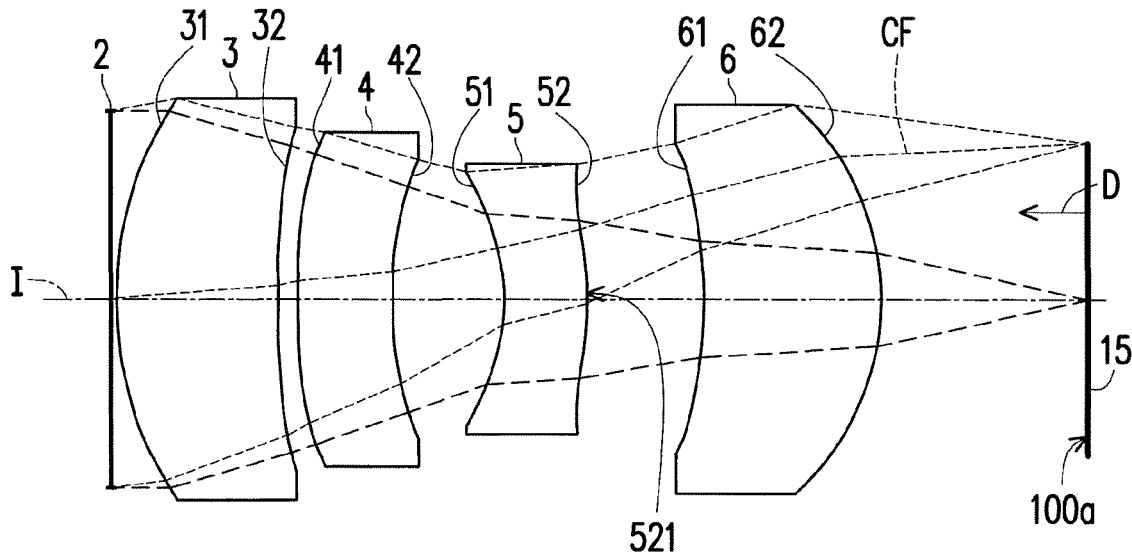
FIG. 23 is a schematic view illustrating an optical lens assembly according to a fifth embodiment of the invention.

FIG. 23 is a schematic view illustrating an optical lens assembly according to a fifth embodiment of the invention, and FIG. 24A to FIG. 24D are graphs showing a longitudinal spherical aberration and other aberrations of the optical lens assembly according to the fifth embodiment. With reference to FIG. 19, the fifth embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. In addition, the light input surface 52 of the third lens element 5 has a convex portion 521 in a vicinity of the optical axis I. It should be noted that, in order to show the view clearly, the reference numbers of the concave portions and the convex portions identical to those in the first embodiment are omitted in FIG. 23.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the fifth embodiment of the optical lens assembly 10 are shown in FIG. 25, in which the optical lens assembly 10 of the fifth embodiment has an overall effective focal length (EFL) being 2.616 millimeter (mm), a half field of view (HFOV) being 9.893°, an f-number (Fno) being 2.273, a system length being 2.940 mm and a light circle radius being 0.476 mm.

FIG. 26 shows the aspheric coefficients of the light output surface 31 of the first lens element 3 to the light input surface 62 of the fourth lens element 6 in Formula (1) according to the fifth embodiment.

In addition, the relationship among the important parameters in the optical lens assembly 10 of the fifth embodiment is shown in FIG. 75 and FIG. 76.

Figures 24A, 24B, 24C, 24D:
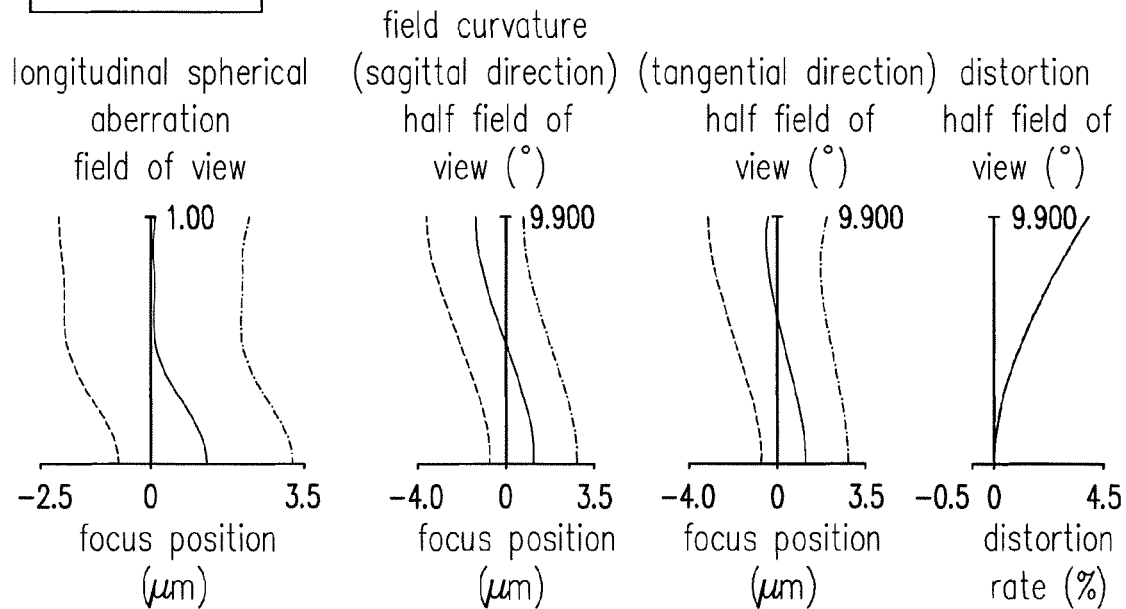
FIG. 24A to FIG. 24D are graphs showing a longitudinal spherical aberration and other aberrations of the optical lens assembly according to the fifth embodiment.

In the graph of FIG. 24A which illustrates the longitudinal spherical aberration when the pupil radius is 0.5756 mm according to the fifth embodiment, the imaging point deviation of the off-axis ray at different heights is controlled within a range of ±3.3 μm. In the two graphs of the field curvature aberrations of FIG. 24B and FIG. 24C, the focal length variation of the three representative wavelengths in the entire field of view falls within a range of ±4.0 μm. In FIG. 24D, the graph of distortion aberration shows that the distortion aberration in the fifth embodiment is maintained within a range of ±4.5%.

In view of the above description, it can be known that the longitudinal spherical aberration of the fifth embodiment is less than the longitudinal spherical aberration of the first embodiment. The field curvature of the fifth embodiment is less than the field curvature of the first embodiment.

FIG. 27 is a schematic view illustrating an optical lens assembly according to a sixth embodiment of the invention, and FIG. 28A to FIG. 28D are graphs showing a longitudinal spherical aberration and other aberrations of the optical lens assembly according to the sixth embodiment. With reference to FIG. 27, the sixth embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. In addition, the light output surface 41 of the second lens element 4 has a concave portion 412 in a vicinity of the optical axis I. The light input surface 52 of the third lens element 5 has a convex portion 521 in a vicinity of the optical axis I. The light output surface 61 of the fourth lens element 6 has a convex portion 613 in a vicinity of a periphery of the fourth lens element 6. It should be noted that, in order to show the view clearly, the reference numbers of the concave portions and the convex portions identical to those in the first embodiment are omitted in FIG. 27.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the sixth embodiment of the optical lens assembly 10 are shown in FIG. 29, in which the optical lens assembly 10 of the sixth embodiment has an overall effective focal length (EFL) being 3.022 millimeter (mm), a half field of view (HFOV) being 9.895°, an f-number (Fno) being 2.273, a system length being 2.861 mm and a light circle radius being 0.587 mm.

FIG. 30 shows the aspheric coefficients of the light output surface 31 of the first lens element 3 to the light input surface 62 of the fourth lens element 6 in Formula (1) according to the sixth embodiment.

In addition, the relationship among the important parameters in the optical lens assembly 10 of the sixth embodiment is shown in FIG. 75 and FIG. 76.

In graph of FIG. 28A which illustrates the longitudinal spherical aberration when the pupil radius is 0.6648 mm according to the sixth embodiment, the imaging point deviation of the off-axis ray at different heights is controlled within a range of ±5.5 μm. In the two graphs of the field curvature aberrations of FIG. 28B and FIG. 28C, the focal length variation of the three representative wavelengths in the entire field of view falls within a range of ±25 μm. In graph of FIG. 28D, the graph of distortion aberration shows that the distortion aberration in the sixth embodiment is maintained within a range of ±12%.

In view of the above description, it can be known that the longitudinal spherical aberration of the sixth embodiment is less than the longitudinal spherical aberration of the first embodiment.

Figure 31:
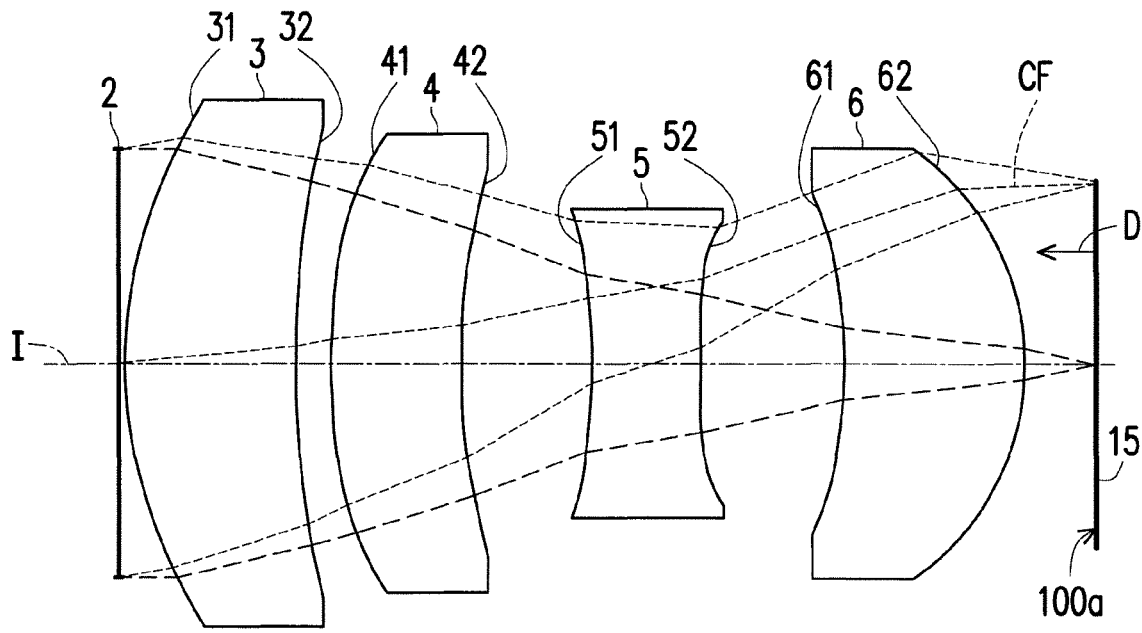
FIG. 31 is a schematic view illustrating an optical lens assembly according to a seventh embodiment of the invention.

FIG. 31 is a schematic view illustrating an optical lens assembly according to a seventh embodiment of the invention, and FIG. 32A to FIG. 32D are graphs showing a longitudinal spherical aberration and other aberrations of the optical lens assembly according to the seventh embodiment. With reference to FIG. 31, the seventh embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. Further, the second lens element 4 has positive refracting power. The light input surface 32 of the first lens element 3 is a spherical surface. It should be noted that, in order to show the view clearly, the reference numbers of the concave portions and the convex portions identical to those in the first embodiment are omitted in FIG. 31.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the seventh embodiment of the optical lens assembly 10 are shown in FIG. 33, in which the optical lens assembly 10 of the seventh embodiment has an overall effective focal length (EFL) being 2.696 millimeter (mm), a half field of view (HFOV) being 10.490°, an f-number (Fno) being 2.273, a system length being 2.697 mm and a light circle radius being 0.500 mm.

FIG. 34 shows the aspheric coefficients of the light output surface 31 of the first lens element 3 to the light input surface 62 of the fourth lens element 6 in Formula (1) according to the seventh embodiment.

In addition, relationship among the important parameters in the optical lens assembly 10 of the seventh embodiment is shown in FIG. 77 and FIG. 78, where the unit for each parameter in FIG. 77 is millimeter (mm).

Figures 32A, 32B, 32C, 32D:
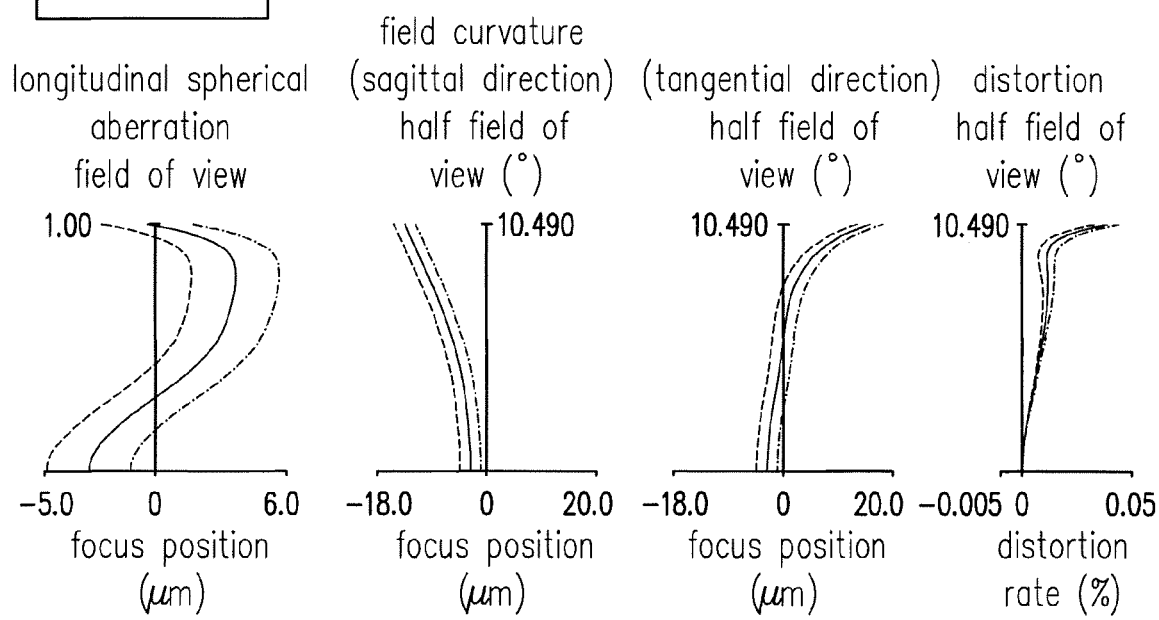
FIG. 32A to FIG. 32D are graphs showing a longitudinal spherical aberration and other aberrations of the optical lens assembly according to the seventh embodiment.

In the graph of FIG. 32A which illustrates the longitudinal spherical aberration when the pupil radius is 0.5932 mm according to the seventh embodiment, the imaging point deviation of the off-axis ray at different heights is controlled within a range of ±6.0 µm. In the two graphs of the field curvature aberrations of FIG. 32B and FIG. 32C, the focal length variation of the three representative wavelengths in the entire field of view falls within a range of ±18 µm. In FIG. 32D, the graph of distortion aberration shows that the distortion aberration in the seventh embodiment is maintained within a range of ±0.045%.

In view of the above description, it can be known that the system length of the seventh embodiment is shorter than the system length of the first embodiment. The half field of view of the seventh embodiment is greater than the half field of view of the first embodiment. The longitudinal spherical aberration of the seventh embodiment is less than the longitudinal spherical aberration of the first embodiment.

FIG. 35 is a schematic view illustrating an optical lens assembly according to an eighth embodiment of the invention, and FIG. 36A to FIG. 36D are graphs showing a longitudinal spherical aberration and other aberrations of the optical lens assembly according to the eighth embodiment. With reference to FIG. 35, the eighth embodiment of the optical lens assembly 10 is substantially similar to the first embodiment, and the difference between the two is that, the optical data, the aspheric coefficients, and the parameters of the lens elements 3, 4, 5 and 6 in these embodiments are different to some extent. In addition, the light input surface 52 of the third lens element 5 has a convex portion 521 in a vicinity of the optical axis I. It should be noted that, in order to show the view clearly, the reference numbers of the concave portions and the convex portions identical to those in the first embodiment are omitted in FIG. 35.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the eighth embodiment of the optical lens assembly 10 are shown in FIG. 37, in which the optical lens assembly 10 of the eighth embodiment has an overall effective focal length (EFL) being 2.883 millimeter (mm), a half field of view (HFOV) being 9.898°, an f-number (Fno) being 2.273, a system length being 3.039 mm and a light circle radius being 0.525 mm.

FIG. 38 shows the aspheric coefficients of the light output surface 31 of the first lens element 3 to the light input surface 62 of the fourth lens element 6 in Formula (1) according to the eighth embodiment.

In addition, the relationship among the important parameters in the optical lens assembly 10 of the eighth embodiment is shown in FIG. 77 and FIG. 78.

In the graph of FIG. 36A which illustrates the longitudinal spherical aberration when the pupil radius is 0.6343 mm according to the eighth embodiment, the imaging point deviation of the off-axis ray at different heights is controlled within a range of ±3 µm. In the two graphs of the field curvature aberrations of FIG. 36B and FIG. 36C, the focal length variation of the three representative wavelengths in the entire field of view falls within a range of ±4.0 µm. In FIG. 36D, the graph of distortion aberration shows that the distortion aberration in the eighth embodiment is maintained within a range of ±4.5%.

In view of the above description, it can be known that the longitudinal spherical aberration of the eighth embodiment is less than the longitudinal spherical aberration of the first embodiment. The field curvature of the eighth embodiment is less than the field curvature of the first embodiment.

FIG. 39 is a schematic view illustrating an optical lens assembly according to a ninth embodiment of the invention, and FIG. 40A to FIG. 40D are graphs showing a longitudinal spherical aberration and other aberrations of the optical lens assembly according to the ninth embodiment. With reference to FIG. 42, the ninth embodiment of the optical lens assembly 10 is substantially similar to the first embodiment, and the difference between the two is provided as follows. In the optical lens assembly 10 according to the ninth embodiment of the invention, the aperture stop 2, a fifth lens element 7, the first lens element 3, the second lens element 4, the third lens element 5 and the fourth lens element 6 are arranged in a sequence from the light output side to the light input side along the optical axis I of the optical lens assembly 10. When a plurality of near infrared light beams are emitted by the light emitting surface 100a of the structured light generating unit 15 having the light sources, the near infrared light beams enter the optical lens assembly 10 and sequentially pass through the fourth lens element 6, the third lens element 5, the second lens element 4, the first lens element 3, the fifth lens element 7 and the aperture stop 2 to generate a plurality of light beams to be outputted from the optical lens assembly 10.

Each of the fifth lens element 7, the first lens element 3, the second lens element 4, the third lens element 5 and the fourth lens element 6 has a light output surface 71, 31, 41, 51, 61 facing the light output side for allowing the near infrared light beams to pass through, and a light input surface 72, 32, 42, 52, 62 facing the light input side for allowing the near infrared light beams to pass through.

The fifth lens element 7 is disposed in front of the first lens element 3. The fifth lens element 7 has positive refracting power. The light output surface 71 of the fifth lens element 7 has a convex portion 711 in a vicinity of the optical axis I and a convex portion 713 in a vicinity of a periphery of the fifth lens element 7. The light input surface 72 of the fifth lens element 7 has a concave portion 722 in a vicinity of the optical axis I and a concave portion 724 in a vicinity of a periphery of the fifth lens element 7. The light output surface 71 and the light input surface 72 of the fifth lens element 7 are aspheric surfaces. The fifth lens element 7 is made of a plastic material.

The light input surface 32 of the first lens element 3 is a spherical surface.

The fourth lens element 6 has negative refracting power. The light input surface 62 of the fourth lens element 6 has a concave portion 622 in a vicinity of the optical axis I. It should be noted that, in order to show the view clearly, the reference numbers of the concave portions and the convex portions identical to those in the first embodiment are omitted in FIG. 39.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the ninth embodiment are shown in FIG. 41, in which the ninth embodiment has an overall effective focal length (EFL) being 3.930 mm, a half field of view (HFOV) being 7.694°, an f-number (Fno) being 2.273, a system length being 2.948 mm and a light circle radius being 0.500 mm. Here, the system length refers to a distance from the light output surface 71 of the fifth lens element 7 to the light emitting surface 100 along the optical axis I.

Further, in the ninth embodiment, all of the light output surfaces 71, 31, 41, 51 and 61 and the light input surfaces 72, 42, 52 and 62 of the fifth lens element 7, the first lens element 3, the second lens element 4, the third lens element 5 and the fourth lens element 6 (9 surfaces in total) are aspheric surfaces. These aspheric surfaces are defined by Formula (1), which is not repeated hereinafter. The aspheric coefficients of the light output surface 31 of the first lens element 3 to the light input surface 72 of the fifth lens element 7 in Formula (1) are shown in FIG. 42. In FIG. 42, a field number "31" indicates that the respective row includes the aspheric coefficients of the light output surface 31 of the first lens element 3, and the same applies to the rest of fields.

In addition, the relationship among the important parameters in the optical lens assembly 10 of the ninth embodiment is shown in FIG. 77 and FIG. 78.

Parameter definition for the first lens element 3, the second lens element 4, the third lens element 5 and the fourth lens element 6 mentioned in the ninth embodiment are substantially similar to the parameter definition mentioned in the first embodiment, and their differences are:

T5 is a thickness of the fifth lens element 7 along the optical axis I;

G51 is an air gap from the fifth lens element 7 to the first lens element 3 along the optical axis I;

f5 is a focal length of the fifth lens element 7;

n5 is a refractive index of the fifth lens element 7; and u5 is an Abbe number of the fifth lens element 7.

With reference to FIG. 40A and FIG. 40D, the graph of FIG. 40A illustrates a longitudinal spherical aberration of the light emitting surface 100a when the pupil radius is 0.7836 mm and wavelengths are 930 nm, 940 nm and 950 nm in the first embodiment. The graphs of FIG. 40B and FIG. 40C respectively illustrate a field curvature aberration in a sagittal direction and a field curvature aberration in a tangential direction on the lights emitting surface 100a when wavelengths are 930 nm, 940 nm and 950 nm in the first embodiment. The graph of FIG. 40D illustrates a distortion aberration on the light emitting surface 100a when wavelengths are 930 nm, 940 nm and 950 nm in the first embodiment. In the graph of FIG. 40A which illustrates the longitudinal spherical aberration in the ninth embodiment, the curve of each wavelength is close to one another and approaches the center position, which indicates that the off-axis ray of each wavelength at different heights is focused around the imaging point. The skew margin of the curve of each wavelength indicates that the imaging point deviation of the off-axis ray at different heights is controlled within a range of ±58 µm. Hence, it is evident that the spherical aberration of the same wavelength can be significantly improved according to the ninth embodiment. In addition, the curves of the three representative wavelengths are close to one another, which indicate that the imaging positions of the rays with different wavelengths are rather focused; therefore, the chromatic aberration can be significantly improved as well.

In the two graphs of the field curvatures of FIG. 40B and FIG. 40C, the focal length variation of the three representative wavelengths in the entire field of view falls within a range of ±6 µm, and indicates that the field curvature aberration of the optical system provided by the ninth embodiment can be effectively eliminated. In FIG. 40D, the graph of distortion shows that the distortion aberration in the ninth embodiment is maintained within a range of ±8.0%, which indicates that the distortion aberration in the ninth embodiment can comply with the imaging quality requirement of the optical lens assembly. Accordingly, compared to the existing optical lens assembly, with the system length shortened to approximately 2.948 mm, the ninth embodiment can still provide a more preferable imaging quality. As a result, according to the ninth embodiment, the length of the optical lens assembly can be shortened without sacrificing the favorable optical properties.

FIG. 43 is a schematic view illustrating an optical lens assembly according to a tenth embodiment of the invention, and FIG. 44A to FIG. 44D are graphs showing a longitudinal spherical aberration and other aberrations of the optical lens assembly according to the tenth embodiment. With reference to FIG. 43, the tenth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the second lens element 4 has positive refracting power. The third lens element 5 has positive refracting power. The light input surface 52 of the third lens element 5 has a convex portion 521 in a vicinity of the optical axis I. The light output surface 61 of the fourth lens element 6 has a convex portion 611 in a vicinity of the optical axis I and a convex portion 613 in a vicinity of a periphery of the fourth lens element 6. The light input surface 62 of the fourth lens element 6 has a concave portion 624 in a vicinity of a periphery of the fourth lens element 6. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 43.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the tenth embodiment of the optical lens assembly 10 are shown in FIG. 45, in which the optical lens assembly 10 of the tenth embodiment has an overall effective focal length (EFL) being 2.825 millimeter (mm), a half field of view (HFOV) being 9.863°, an f-number (Fno) being 2.273, a system length being 3.881 mm and a light circle radius being 0.500 mm.

FIG. 46 shows the aspheric coefficients of the light output surface 71 of the fifth lens element 7 to the light input surface 62 of the fourth lens element 6 in Formula (1) according to the tenth embodiment.

In addition, the relationship among the important parameters in the optical lens assembly 10 of the tenth embodiment is shown in FIG. 77 and FIG. 78.

In the graph of FIG. 44A which illustrates the longitudinal spherical aberration when the pupil radius is 0.6215 mm according to the tenth embodiment, the imaging point deviation of the off-axis ray at different heights is controlled within a range of ±3.0 µm. In the two graphs of the field curvature aberrations of FIG. 44B and FIG. 44C, the focal length variation of the three representative wavelengths in the entire field of view falls within a range of ±12 µm. In FIG. 44D, the graph of distortion aberration shows that the distortion aberration in the tenth embodiment is maintained within a range of ±1.4%.

In view of the above description, it can be known that the half field of view of the tenth embodiment is greater than the half field of view of the ninth embodiment. The longitudinal spherical aberration of the tenth embodiment is less than the longitudinal spherical aberration of the ninth embodiment. The field curvature of the tenth embodiment is less than the field curvature of the ninth embodiment. The distortion aberration of the tenth embodiment is less than the distortion aberration of the ninth embodiment.

FIG. 47 is a schematic view illustrating an optical lens assembly according to an eleventh embodiment of the invention, and FIG. 48A to FIG. 48D are graphs showing a longitudinal spherical aberration and other aberrations of the optical lens assembly according to the eleventh embodiment. With reference to FIG. 47, the eleventh embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the fourth lens element 6 has positive refracting power. The light input surface 52 of the third lens element 5 has a convex portion 521 in a vicinity of the optical axis I and a convex portion 523 in a vicinity of a periphery of the third lens element 5. The light input surface 62 of the fourth lens element 6 has a convex portion 621 in a vicinity of the optical axis I. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 47.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the eleventh embodiment of the optical lens assembly 10 are shown in FIG. 49, in which the optical lens assembly 10 of the eleventh embodiment has an overall effective focal length (EFL) being 2.672 millimeter (mm), a half field of view (HFOV) being 9.942°, an f-number (Fno) being 2.273, a system length being 2.814 mm and a light circle radius being 0.500 mm.

FIG. 50 shows the aspheric coefficients of the light output surface 71 of the fifth lens element 7 to the light input surface 62 of the fourth lens element 6 in Formula (1) according to the eleventh embodiment.

In addition, the relationship among the important parameters in the optical lens assembly 10 of the eleventh embodiment is shown in FIG. 77 and FIG. 78.

In the graph of FIG. 48A which illustrates the longitudinal spherical aberration when the pupil radius is 0.5879 mm according to the eleventh embodiment, the imaging point deviation of the off-axis ray at different heights is controlled within a range of ±1.6 µm. In the two graphs of the field curvature aberrations of FIG. 48B and FIG. 48C, the focal length variation of the three representative wavelengths in the entire field of view falls within a range of ±3.0 µm. In FIG. 48D, the graph of distortion aberration shows that the distortion aberration in the eleventh embodiment is maintained within a range of ±6.0%.

In view of the above description, it can be known that the system length of the eleventh embodiment is shorter than the system length of the ninth embodiment. The half field of view of the eleventh embodiment is greater than the half field of view of the ninth embodiment. The longitudinal spherical aberration of the eleventh embodiment is less than the longitudinal spherical aberration of the ninth embodiment. The field curvature of the eleventh embodiment is less than the field curvature of the ninth embodiment. The distortion aberration of the eleventh embodiment is less than the distortion aberration of the ninth embodiment.

FIG. 51 is a schematic view illustrating an optical lens assembly according to a twelfth embodiment of the invention, and FIG. 52A to FIG. 52D are graphs showing a longitudinal spherical aberration and other aberrations of the optical lens assembly according to the twelfth embodiment. With reference to FIG. 51, the twelfth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. In addition, the light input surface 62 of the fourth lens element 6 has a convex portion 621 in a vicinity of the optical axis I. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 51.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the twelfth embodiment of the optical lens assembly 10 are shown in FIG. 53, in which the optical lens assembly 10 of the twelfth embodiment has an overall effective focal length (EFL) being 2.899 millimeter (mm), a half field of view (HFOV) being 9.943°, an f-number (Fno) being 2.273, a system length being 3.113 mm and a light circle radius being 0.500 mm.

FIG. 54 shows the aspheric coefficients of the light output surface 71 of the fifth lens element 7 to the light input surface 62 of the fourth lens element 6 in Formula (1) according to the twelfth embodiment.

In addition, the relationship among the important parameters in the optical lens assembly 10 of the twelfth embodiment is shown in FIG. 77 and FIG. 78.

In the graph of FIG. 52A which illustrates the longitudinal spherical aberration when the pupil radius is 0.6377 mm according to the twelfth embodiment, the imaging point deviation of the off-axis ray at different heights is controlled within a range of ±25 µm. In the two graphs of the field curvature aberrations of FIG. 52B and FIG. 52C, the focal length variation of the three representative wavelengths in the entire field of view falls within a range of ±30.0 µm. In FIG. 52D, the graph of distortion aberration shows that the distortion aberration in the twelfth embodiment is maintained within a range of ±1.4%.

In view of the above description, it can be known that the half field of view of the twelfth embodiment is greater than the half field of view of the ninth embodiment. The longitudinal spherical aberration of the twelfth embodiment is less than the longitudinal spherical aberration of the ninth embodiment. The field curvature of the twelfth embodiment is less than the field curvature of the ninth embodiment. The distortion aberration of the twelfth embodiment is less than the distortion aberration of the ninth embodiment.

FIG. 55 is a schematic view illustrating an optical lens assembly according to a thirteenth embodiment of the invention, and FIG. 56A to FIG. 56D are graphs showing a longitudinal spherical aberration and other aberrations of the optical lens assembly according to the thirteenth embodiment. With reference to FIG. 55, the thirteenth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the fifth lens element 7 has negative refracting power. The second lens element 4 has positive refracting power. The fourth lens element 6 has positive refracting power. The light input surface 62 of the fourth lens element 6 has a convex portion 621 in a vicinity of the optical axis I. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 55.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the thirteenth embodiment of the optical lens assembly 10 are shown in FIG. 57, in which the optical lens assembly 10 of the thirteenth embodiment has an overall effective focal length (EFL) being 2.797 millimeter (mm), a half field of view (HFOV) being 9.939°, an f-number (Fno) being 2.273, a system length being 2.748 mm and a light circle radius being 0.500 mm.

FIG. 58 shows the aspheric coefficients of the light output surface 71 of the fifth lens element 7 to the light input surface 62 of the fourth lens element 6 in Formula (1) according to the thirteenth embodiment.

In addition, relationship among the important parameters in the optical lens assembly 10 of the thirteenth embodiment is shown in FIG. 79 and FIG. 80, where the unit for each parameter in FIG. 79 is millimeter (mm).

In the graph of FIG. 56A which illustrates the longitudinal spherical aberration when the pupil radius is 0.6154 mm according to the thirteenth embodiment, the imaging point deviation of the off-axis ray at different heights is controlled within a range of ±2.5 µm. In the two graphs of the field curvature aberrations of FIG. 56B and FIG. 56C, the focal length variation of the three representative wavelengths in the entire field of view falls within a range of ±5.0 µm. In FIG. 56D, the graph of distortion aberration shows that the distortion aberration in the thirteenth embodiment is maintained within a range of ±2.0%.

Figure 59:
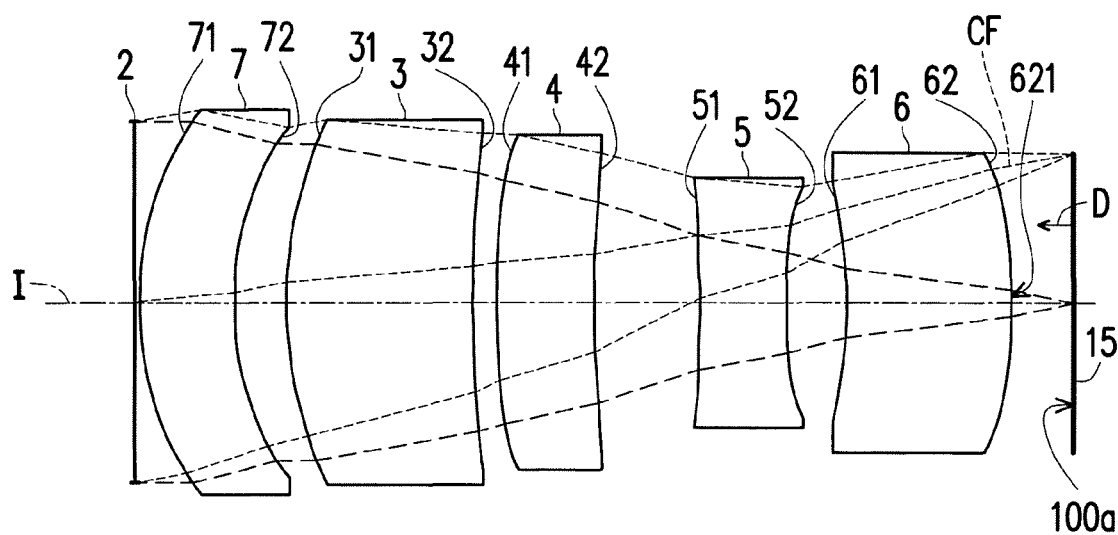
FIG. 59 is a schematic view illustrating an optical lens assembly according to a fourteenth embodiment of the invention.

FIG. 59 is a schematic view illustrating an optical lens assembly according to a fourteenth embodiment of the invention, and FIG. 60A to FIG. 60D are graphs showing a longitudinal spherical aberration and other aberrations of the optical lens assembly according to the fourteenth embodiment. With reference to FIG. 59, the fourteenth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the second lens element 4 has positive refracting power. The light input surface 62 of the fourth lens element 6 has a convex portion 621 in a vicinity of the optical axis I. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 59.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the fourteenth embodiment of the optical lens assembly 10 are shown in FIG. 61, in which the optical lens assembly 10 of the fourteenth embodiment has an overall effective focal length (EFL) being 2.765 millimeter (mm), a half field of view (HFOV) being 9.941°, an f-number (Fno) being 2.273, a system length being 3.157 mm and a light circle radius being 0.500 mm.

FIG. 62 shows the aspheric coefficients of the light output surface 71 of the fifth lens element 7 to the light input surface 62 of the fourth lens element 6 in Formula (1) according to the fourteenth embodiment.

In addition, the relationship among the important parameters in the optical lens assembly 10 of the fourteenth embodiment is shown in FIG. 79 and FIG. 80.

Figures 60A, 60B, 60C, 60D:
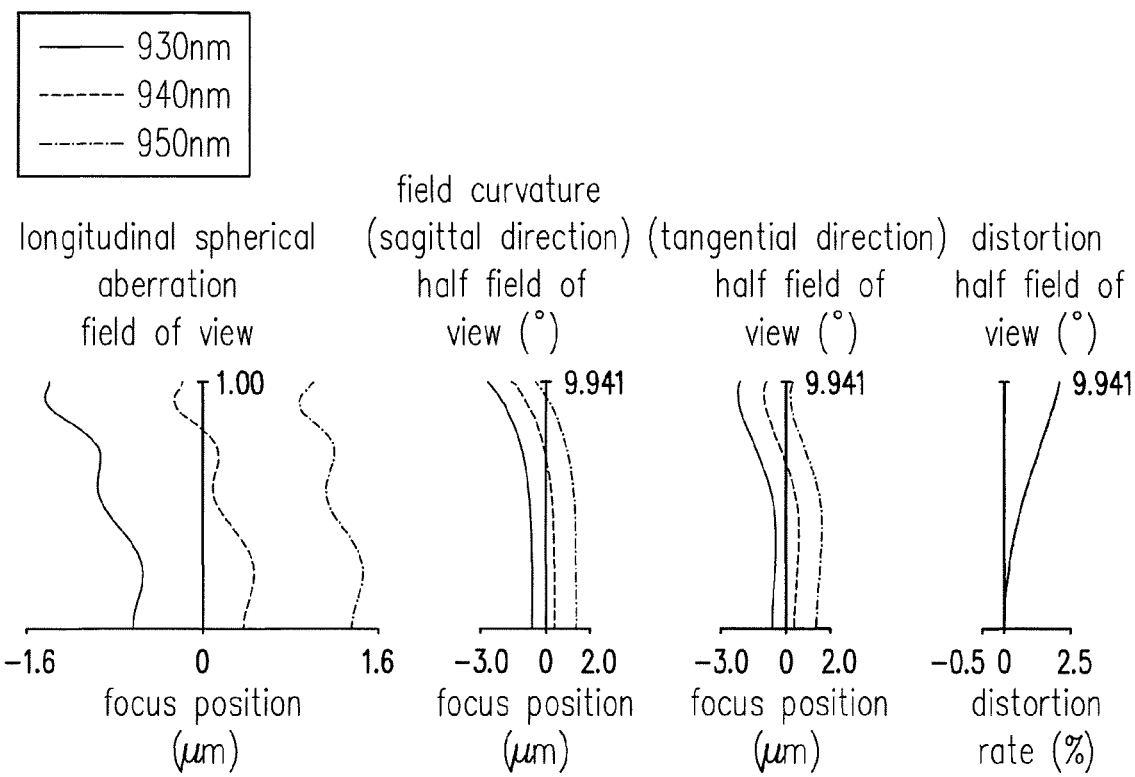
FIG. 60A to FIG. 60D are graphs showing a longitudinal spherical aberration and other aberrations of the optical lens assembly according to the fourteenth embodiment.

In the graph of FIG. 60A which illustrates the longitudinal spherical aberration when the pupil radius is 0.6083 mm according to the fourteenth embodiment, the imaging point deviation of the off-axis ray at different heights is controlled within a range of ±1.5 μm. In the two graphs of the field curvature aberrations of FIG. 60B and FIG. 60C, the focal length variation of the three representative wavelengths in the entire field of view falls within a range of ±3.0 μm. In FIG. 60D, the graph of distortion aberration shows that the distortion aberration in the fourteenth embodiment is maintained within a range of ±2.5%.

In view of the above description, it can be known that the half field of view of the fourteenth embodiment is greater than the half field of view of the ninth embodiment. The longitudinal spherical aberration of the fourteenth embodiment is less than the longitudinal spherical aberration of the ninth embodiment. The field curvature of the fourteenth embodiment is less than the field curvature of the ninth embodiment. The distortion aberration of the fourteenth embodiment is less than the distortion aberration of the ninth embodiment.

FIG. 63 is a schematic view illustrating an optical lens assembly according to a fifteenth embodiment of the invention, and FIG. 64A to FIG. 64D are graphs showing a longitudinal spherical aberration and other aberrations of the optical lens assembly according to the fifteenth embodiment. With reference to FIG. 63, the fifteenth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the fourth lens element 6 has positive refracting power. The light input surface 42 of the second lens element 4 has a convex portion 423 in a vicinity of a periphery of the second lens element 4. The light input surface 52 of the third lens element 5 has a convex portion 521 in a vicinity of the optical axis I and a convex portion 523 in a vicinity of a periphery of the third lens element 5. The light output surface 61 of the fourth lens element 6 has a convex portion 611 in a vicinity of the optical axis I and a convex portion 613 in a vicinity of a periphery of the fourth lens element 6. The light input surface 62 of the fourth lens element 6 has a concave portion 624 in a vicinity of the optical axis I. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 63.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the fifteenth embodiment of the optical lens assembly 10 are shown in FIG. 65, in which the optical lens assembly 10 of the fifteenth embodiment has an overall effective focal length (EFL) being 2.754 millimeter (mm), a half field of view (HFOV) being 9.941°, an f-number (Fno) being 2.273, a system length being 3.433 mm and a light circle radius being 0.500 mm.

FIG. 66 shows the aspheric coefficients of the light output surface 71 of the fifth lens element 7 to the light input surface 62 of the fourth lens element 6 in Formula (1) according to the fifteenth embodiment.

In addition, the relationship among the important parameters in the optical lens assembly 10 of the fifteenth embodiment is shown in FIG. 79 and FIG. 80.

In the graph of FIG. 64A which illustrates the longitudinal spherical aberration when the pupil radius is 0.6058 mm according to the fifteenth embodiment, the imaging point deviation of the off-axis ray at different heights is controlled within a range of ±4.5 μm. In the two graphs of the field curvature aberrations of FIG. 64B and FIG. 64C, the focal length variation of the three representative wavelengths in the entire field of view falls within a range of ±5.0 μm. In FIG. 64D, the graph of distortion aberration shows that the distortion aberration in the fifth embodiment is maintained within a range of ±3.0%.

In view of the above description, it can be known that the half field of view of the fifteenth embodiment is greater than the half field of view of the ninth embodiment. The longitudinal spherical aberration of the fifteenth embodiment is less than the longitudinal spherical aberration of the ninth embodiment. The field curvature of the fifteenth embodiment is less than the field curvature of the ninth embodiment. The distortion aberration of the fifteenth embodiment is less than the distortion aberration of the ninth embodiment.

FIG. 67 is a schematic view illustrating an optical lens assembly according to a sixteenth embodiment of the invention, and FIG. 68A to FIG. 68D are graphs showing a longitudinal spherical aberration and other aberrations of the optical lens assembly according to the sixteenth embodiment. With reference to FIG. 67, the sixteenth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the fourth lens element 6 has positive refracting power. The light input surface 32 of the first lens element 3 has a convex portion 321 in a vicinity of the optical axis I and a convex portion 323 in a vicinity of a periphery of the first lens element 3. The light input surface 62 of the fourth lens element 6 has a convex portion 621 in a vicinity of the optical axis I. The first lens element 3 is made of a plastic material. The fifth lens element 7 is made of a glass with refractive index greater than 1.8. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 67.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the sixteenth embodiment of the optical lens assembly 10 are shown in FIG. 69, in which the optical lens assembly 10 of the sixteenth embodiment has an overall effective focal length (EFL) being 2.700 millimeter (mm), a half field of view (HFOV) being 10.491°, an f-number (Fno) being 2.273, a system length being 3.110 mm and a light circle radius being 0.500 mm.

FIG. 70 shows the aspheric coefficients of the light output surface 71 of the fifth lens element 7 to the light input surface 62 of the fourth lens element 6 in Formula (1) according to the sixteenth embodiment.

In addition, the relationship among the important parameters in the optical lens assembly 10 of the sixteenth embodiment is shown in FIG. 79 and FIG. 80.

In the graph of FIG. 68A which illustrates the longitudinal spherical aberration when the pupil radius is 0.5939 mm according to the sixteenth embodiment, the imaging point deviation of the off-axis ray at different heights is controlled within a range of ±4.5 µm. In the two graphs of the field curvature aberrations of FIG. 68B and FIG. 68C, the focal length variation of the three representative wavelengths in the entire field of view falls within a range of ±25 µm. In FIG. 68D, the graph of distortion aberration shows that the distortion aberration in the sixteenth embodiment is maintained within a range of ±0.03%.

In view of the above description, it can be known that the half field of view of the sixteenth embodiment is greater than the half field of view of the ninth embodiment. The longitudinal spherical aberration of the sixteenth embodiment is less than the longitudinal spherical aberration of the ninth embodiment. The field curvature of the sixteenth embodiment is less than the field curvature of the ninth embodiment. The distortion aberration of the sixteenth embodiment is less than the distortion aberration of the ninth embodiment.

FIG. 71 is a schematic view illustrating an optical lens assembly according to a seventeenth embodiment of the invention, and FIG. 72A to FIG. 72D are graphs showing a longitudinal spherical aberration and other aberrations of the optical lens assembly according to the seventeenth embodiment. With reference to FIG. 71, the seventeenth embodiment of the optical lens assembly 10 is substantially similar to the ninth embodiment, and the difference between the two is that, the optical data, the aspheric coefficients, and the parameters of the lens elements 3, 4, 5, 6 and 7 in these embodiments are different to some extent. Further, the second lens element 4 has positive refracting power. The third lens element 5 has positive refracting power. The light input surface 52 of the third lens element 5 has a convex portion 521 in a vicinity of the optical axis I and a convex portion 523 in a vicinity of a periphery of the third lens element 5. The light output surface 61 of the fourth lens element 6 has a convex portion 611 in a vicinity of the optical axis I and a convex portion 613 in a vicinity of a periphery of the fourth lens element 6. The light input surface 62 of the fourth lens element 6 has a concave portion 624 in a vicinity of a periphery of the fourth lens element 6. Moreover, an included angle between a chief ray CF of the near infrared light beams emitted from the structured light generating unit 15 having the light sources and a normal direction D of the light emitting surface 100a is less than 5°. It should be noted that, in order to show the view clearly, the reference numbers of the concave portions and the convex portions identical to those in the ninth embodiment are omitted in FIG. 71.

In the present embodiment, an included angle between an emission direction of a chief ray CF of the near infrared light beams emitted from the light emitting surface 100a of the structured light generating unit 15 having the light sources and a normal direction D of the light emitting surface 100a is less than 5°.

Other detailed optical data of the seventeenth embodiment of the optical lens assembly 10 are shown in FIG. 73, in which the optical lens assembly 10 of the seventeenth embodiment has an overall effective focal length (EFL) being 2.742 millimeter (mm), a half field of view (HFOV) being 9.937°, an f-number (Fno) being 2.273, a system length being 3.978 mm and a light circle radius being 0.500 mm.

FIG. 74 shows the aspheric coefficients of the light output surface 71 of the fifth lens element 7 to the light input surface 62 of the fourth lens element 6 in Formula (1) according to the seventeenth embodiment.

In addition, the relationship among the important parameters in the optical lens assembly 10 of the seventeenth embodiment is shown in FIG. 79 and FIG. 80.

In the graph of FIG. 72A which illustrates the longitudinal spherical aberration when the pupil radius is 0.6032 mm according to the seventeenth embodiment, the imaging point deviation of the off-axis ray at different heights is controlled within a range of ±2.0 µm. In the two graphs of the field curvature aberrations of FIG. 72B and FIG. 72C, the focal length variation of the three representative wavelengths in the entire field of view falls within a range of ±4.5 µm. In FIG. 72D, the graph of distortion aberration shows that the distortion aberration in the seventeenth embodiment is maintained within a range of ±4%.

In view of the above description, it can be known that the half field of view of the seventeenth embodiment is greater than the half field of view of the ninth embodiment. The longitudinal spherical aberration of the seventeenth embodiment is less than the longitudinal spherical aberration of the ninth embodiment. The field curvature of the seventeenth embodiment is less than the field curvature of the ninth embodiment. The distortion aberration of the seventeenth embodiment is less than the distortion aberration of the ninth embodiment.

At least one of the purposes of satisfying a condition EFL/ALT≤52.500 aims to maintain the effective focal length and each optical parameter at appropriate values, so as to prevent the overall aberration correction of the optical lens assembly 10 from being affected by any overly large parameter, or prevent the assembly from being affected or the manufacturing difficulty from increased by any overly small parameter. A more preferable limitation is 1.200≤EFL/ALT≤2.500.

For satisfying conditions (G23+G34+T4)/(T2+T3)≤3.800, (T1−G23+G34+T4)/(T2+T3)≤4.000, (LCR+T1)/(T3+T4)≤1.900, (AAG+BFL)/(T2+T4)≤1.800, LCR/T2≤2.500, TTL/(T2+T3)≤7.400, TTL/(T2+T3)≤7.400, TL/ALT≤1.900, (T1+G23)/(G12+G34)≤3.500, (T1+G23)/T2≤3.000, (T1+G34)/(G12+T2)≤2.500, (T1+G34)/T2≤3.500, (T1+T4)/(G12+T3)≤3.500, (T1+T4)/T2≤3.600, (T1+T4)/T3≤4.500, (G34+T4)/(T1+G12)≤2.500 and (G34+T4)/T2≤3.500, their more preferable limitations are 1.200≤(G23+G34+T4)/(T2+T3)≤3.800, 1.800≤(T1+G23+G34+T4)/(T2+T3)≤4.000, 0.600≤(LCR+T1)/(T3+T4)≤1.900, 0.700≤(AAG+BFL)/(T2+T4)≤1.800, 0.900≤LCR/T2≤2.500, 3.0005≤TTL/(T2+T3)≤7.400, 3.000≤TTL/(T2+T3)≤7.400, 1.100≤TL/ALT≤1.900, 0.700≤(T1+G23)/(G12+G34)≤3.500, 1.700≤(T1+G23)/T2≤3.000, 0.700≤(T1+G34)/(G12+T2)≤2.500, 1.300≤(T1+G34)/T2≤3.500, 1.300≤(T1+T4)/(G12+T3)≤3.500, 1.700≤(T1+T4)/T2≤3.600, 1.700≤(T1+T4)/T3≤4.500, 0.900≤(G34+T4)/(T1+G12)≤2.500 and 1.200≤(G34+T4)/T2≤3.500. At least one of the purposes of satisfying the above aims to maintain the thicknesses and the intervals of lens elements at appropriate values, so as to prevent the slimness of the optical lens assembly 10 in whole from being affected by any overly large parameter, or prevent the assembly from being affected or the manufacturing difficulty from increased by any overly small parameter.

In addition, lens limitations may be further added by using any combination relation of the parameters selected from the provided embodiments to implement the design for the optical lens assembly with the same framework set forth in the embodiments of the invention.

Due to the unpredictability in an optical system design, with the framework set forth in the invention, the shortened lens length, the enlarged available aperture, the improved optical quality, or the improved assembly yield can be achieved for the optical system of the invention to improve the shortcomings of the related art if aforementioned conditions are satisfied.

The aforementioned limitation relational expressions are provided in an exemplary sense and can be randomly and selectively combined and applied to the embodiments of the invention in different manners; the invention should not be limited to the above examples. In implementation of the invention, apart from the above-described relational expressions, it is also possible to design additional detailed structures such as lens concave and convex curvatures arrangements for the lens elements so as to enhance control of system property and/or resolution. For example, an additional concave portion 311 in a vicinity of the optical axis I may be selectively formed on the light output surface 31 the first lens element 3. It should be noted that the above-described details can be optionally combined and applied to the other embodiments of the invention under the condition where they are not in conflict with one another.

To sum up, the optical lens assembly 10 described in the embodiments of the invention can provide at least one of the following advantages and/or achieve at least one of the following effects.

1. The longitudinal spherical aberrations, the astigmatic aberrations, and the distortion aberrations provided in the embodiments of the invention all comply with usage specifications. Moreover, all of the off-axis rays of the three representative wavelengths 930 nm, 940 nm, and 950 nm at different heights are focused around the imaging point, and it can be observed that, in view of the skew margin of the curve for each wavelength, all of the imaging point deviations of the off-axis rays at different heights are under control and have the capability of suppressing spherical aberrations, image aberrations, and distortion. With further examination upon the imaging quality data, inter-distances between the three representative wavelengths 930 nm, 940 nm, and 950 nm are fairly close, indicating that rays with different wavelengths in the invention can be well focused under different circumstances to provide the capability of suppressing dispersion.

2. With the first lens element 3 having positive refracting power, the light output surface 31 of the first lens element 3 having the convex portion 313 in a vicinity of a periphery of the first lens element 3 and the light input surface 32 of the first lens element 3 having the concave portion 324 in a vicinity of a periphery of the first lens element 3, the light output surface 41 of the second lens element 4 having the convex portion 413 in a vicinity of a periphery of the second lens element 4, a scattering degree of the light beams may be effectively reduced.

3. With the light input surface 41 of the fourth lens element 4 having the convex portion 413 in a vicinity of a periphery of the fourth lens element 4, the system length (TTL) may be effectively reduced by the four lens elements under the premise that the spherical aberration and the distortion are reduced.

4. With the limitation of TTL≤6 mm, the yield rate may be improved for application in larger portable electronic products. A more preferable limitation is 4 mm or less for application in smaller portable electronic products.

5. With HFOV≤20°, the distortion may be further reduced. If the included angle between the chief ray CF of the near infrared light beams emitted from the structured light generating unit 15 having the light sources and a normal direction D of the light emitting surface 100$a$ is less than 5°, the scattering degree of the light beams may be reduced to enhance the 3D sensing effect.

6. If the conditions V1+V2+V3+V4≤141.0 or 2.550≤(n1+n2+n3+n4)−4 together with limitations on the surface shapes are satisfied, the material with high refraction index may be adopted to prevent the output light beams from being easily scattered with different distances, or to minimize the scattering degree and reduce the system length. A more preferable limitations is V1+V2+V3+V4≤120.0 or 2.550≤(n1+n2+n3+n4)−4≤3.500.

7. If one of the lens elements in the optical lens assembly 10 of the invention is made of the glass with the refractive index greater than 1.8, the structured light generating unit 15 having the light sources can maintain a certain optical quality in the thermal environment to reduce the impact on the output light beams caused by temperature. More preferably, the glass material is used on the first lens element 3 or the fifth lens element 7 having refracting power and closer the aperture stop 2.

All of the numerical ranges including the maximum and minimum values and the values therebetween which are obtained from the combining proportion relation of the optical parameters disclosed in each embodiment of the invention are implementable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical lens assembly, configured for a plurality of near infrared light beams emitted by a structured light generating unit having a plurality of light sources to pass through, a side facing the structured light generating unit having the light sources being a light input side, another side opposite thereto being a light output side, the optical lens assembly comprising a first lens element, a second lens element, a third lens element and a fourth lens element arranged along an optical axis in a sequence from the light output side to the light input side, each of the first lens element, the second lens element, the third lens element and the fourth lens element comprising a light output surface facing the light output side and a light input surface facing the light input side, the optical lens assembly generating a plurality of light beams with different angles as the plurality of near infrared light beams passed therethrough;

wherein the first lens element is arranged to be a lens element having refracting power in a fourth order from the light input side to the light output side, the second lens element is arranged to be a lens element having refracting power in a third order from the light input side to the light output side, the third lens element is arranged to be a lens element having refracting power in a second order from the light input side to the light output side, and the fourth lens element is arranged to be a lens element having refracting power in a first order from the light input side to the light output side.

2. The optical lens assembly according to claim 1, wherein the optical lens assembly further satisfies:

$$TTL \leq 6 \text{ mm};$$

$$HFOV \leq 20°; \text{ and}$$

an included angle between an emission direction of a chief ray of the near infrared light beams emitted from a light emitting surface of the structured light generating unit having the light sources and a normal direction of the light emitting surface being less than 5°, wherein TTL is a distance from the light output surface of a lens element being a first piece having refracting power counted from the light output side to the structured light generating unit having the light sources along the optical axis, and HFOV is a half field of view of the optical lens assembly.

3. The optical lens assembly according to claim 1, wherein the optical lens assembly further satisfies: $V1+V2+V3+V4 \leq 141$ and $2.550 \leq (n1+n2+n3+n4)-4 \leq 3.500$, wherein V1 is an Abbe number of the first lens element, V2 is an Abbe number of the second lens element, V3 is an Abbe number of the third lens element, V4 is an Abbe number of the fourth lens element, n1 is a refractive index of the first lens element, n2 is a refractive index of the second lens element, n3 is a refractive index of the third lens element, and n4 is a refractive index of the fourth lens element.

4. The optical lens assembly according to claim 1, wherein the optical lens assembly further satisfies: $EFL/ALT \leq 2.500$, wherein EFL is an effective focal length of the optical lens assembly, and ALT is a sum of thicknesses of all of the lens elements having refracting power of the optical lens assembly along the optical axis.

5. The optical lens assembly according to claim 1, wherein the optical lens assembly further satisfies: $(G23+G34+T4)/(T2+T3) \leq 3.800$, wherein T2 is thickness of the second lens element along the optical axis, T3 is a thickness of the third lens element along the optical axis, T4 is a thickness of the fourth lens element along the optical axis, G23 is an air gap from the second lens element to the third lens element along the optical axis, and G34 is an air gap from the third lens element to the fourth lens element along the optical axis.

6. The optical lens assembly according to claim 1, wherein the optical lens assembly further satisfies: $(T1+G23+G34+T4)/(T2+T3) \leq 4.000$, wherein T1 is a thickness of the first lens element along the optical axis, T2 is a thickness of the second lens element along the optical axis, T3 is a thickness of the third lens element along the optical axis, T4 is a thickness of the fourth lens element along the optical axis, G23 is an air gap from the second lens element to the third lens element along the optical axis, and G34 is an air gap from the third lens element to the fourth lens element along the optical axis.

7. The optical lens assembly according to claim 1, wherein the optical lens assembly further satisfies: $(LCR+T1)/(T3+T4) \leq 1.900$, wherein T1 is a thickness of the first lens element along the optical axis, T3 is a thickness of the third lens element along the optical axis, T4 is a thickness of the fourth lens element along the optical axis, and LCR is a radius of a smallest circumcircle of the light emitting surface of the structured light generating unit having the light sources.

8. The optical lens assembly according to claim 1, wherein the optical lens assembly further satisfies: $(AAG+BFL)/(T2+T4) \leq 1.800$, wherein T2 is a thickness of the second lens element along the optical axis, T4 is a thickness of the fourth lens element along the optical axis, AAG is a sum of air gaps among all of the lens elements having refracting power of the optical lens assembly along the optical axis, and BFL is a distance from the light input surface of the fourth lens element to the structured light generating unit having the light sources along the optical axis.

9. The optical lens assembly according to claim 1, wherein the optical lens assembly further satisfies: $LCR/T2 \leq 2.500$, T2 is a thickness of the second lens element along the optical axis, and LCR is a radius of a smallest circumcircle of the light emitting surface of the structured light generating unit having the light sources.

10. The optical lens assembly according to claim 1, wherein the optical lens assembly further satisfies: $TTL/(T2+T3) \leq 7.400$, wherein T2 is a thickness of the second lens element along the optical axis, T3 is a thickness of the third lens element along the optical axis, and TTL is a distance from the light output surface of a lens element being a first piece having refracting power counted from the light output side to the structured light generating unit having the light sources along the optical axis.

11. The optical lens assembly according to claim 1, wherein the optical lens assembly further satisfies: $TL/ALT \leq 1.900$, TL is a distance from the light output surface of the first lens element to the light input surface of the fourth lens element, and ALT is a sum of thicknesses of all of the lens elements having refracting power of the optical lens assembly along the optical axis.

12. The optical lens assembly according to claim 1, wherein the optical lens assembly further satisfies: $(T1+G23)/(G12+G34) \leq 3.500$, wherein T1 is a thickness of the first lens element along the optical axis, G12 is an air gap from the first lens element to the second lens element along the optical axis, G23 is an air gap from the second lens element to the third lens element along the optical axis, and G34 is an air gap from the third lens element to the fourth lens element along the optical axis.

13. The optical lens assembly according to claim 1, wherein the optical lens assembly further satisfies: $(T1+G23)/T2 \leq 3.000$, T1 is a thickness of the first lens element along the optical axis, T2 is a thickness of the second lens element along the optical axis, and G23 is an air gap from the second lens element to the third lens element along the optical axis.

14. The optical lens assembly according to claim 1, wherein the optical lens assembly further satisfies: $(T1+G34)/(G12+T2) \leq 2.500$, T1 is a thickness of the first lens element along the optical axis, T2 is a thickness of the second lens element along the optical axis, G12 is an air gap from the first lens element to the second lens element along the optical axis, and G34 is an air gap from the third lens element to the fourth lens element along the optical axis.

15. The optical lens assembly according to claim 1, wherein the optical lens assembly further satisfies: $(T1+G34)/T2 \leq 3.500$, wherein T1 is a thickness of the first lens element along the optical axis, G34 is an air gap from the third lens element to the fourth lens element along the optical axis, and T2 is a thickness of the second lens element along the optical axis.

16. The optical lens assembly according to claim 1, wherein the optical lens assembly further satisfies: $(T1+T4)/(G12+T3) \leq 3.500$, wherein T1 is a thickness of the first lens element along the optical axis, T3 is a thickness of the third lens element along the optical axis, T4 is a thickness of the fourth lens element along the optical axis, and G12 is an air gap from the first lens element to the second lens element along the optical axis.

17. The optical lens assembly according to claim 1, wherein the optical lens assembly further satisfies: $(T1+T4)/T2 \leq 3.600$, wherein T1 is a thickness of the first lens element along the optical axis, T2 is a thickness of the second lens element along the optical axis, and T4 is a thickness of the fourth lens element along the optical axis.

18. The optical lens assembly according to claim 1, wherein the optical lens assembly further satisfies: $(T1+T4)/T3 \leq 4.500$, wherein T1 is a thickness of the first lens element along the optical axis, T3 is a thickness of the third lens element along the optical axis, and T4 is a thickness of the fourth lens element along the optical axis.

19. The optical lens assembly according to claim 1, wherein the optical lens assembly further satisfies: $(G34+T4)/(T1+G12) \leq 2.500$, wherein T1 is a thickness of the first lens element along the optical axis, T4 is a thickness of the fourth lens element along the optical axis, G12 is an air gap from the first lens element to the second lens element along the optical axis, and G34 is an air gap from the third lens element to the fourth lens element along the optical axis.

20. The optical lens assembly according to claim 1, wherein the optical lens assembly further satisfies: $(G34+T4)/T2 \leq 3.500$, wherein T2 is a thickness of the second lens element along the optical axis, T4 is a thickness of the fourth lens element along the optical axis, and G34 is an air gap from the third lens element to the fourth lens element along the optical axis.

* * * * *